US012767081B2

(12) United States Patent
Phillips

(10) Patent No.: US 12,767,081 B2
(45) Date of Patent: Oct. 20, 2026

(54) COMPONENT FOR VEHICLE INTERIOR

(71) Applicant: Yanfeng International Automotive Technology Co., Ltd., Novi, MI (US)

(72) Inventor: Michael Edward Phillips, Holland, MI (US)

(73) Assignee: Yanfeng International Automotive Technology Co., Ltd., Novi, MI (US)

( * ) Notice: Subject to any disclaimer, the term of this patent is extended or adjusted under 35 U.S.C. 154(b) by 0 days.

(21) Appl. No.: 19/374,610

(22) Filed: Oct. 30, 2025

(65) Prior Publication Data

US 2026/0054676 A1 Feb. 26, 2026

Related U.S. Application Data

(63) Continuation of application No. PCT/US2024/027888, filed on May 3, 2024.
(Continued)

(51) Int. Cl.
*B60R 21/04* (2006.01)
*B29C 45/14* (2006.01)
(Continued)

(52) U.S. Cl.
CPC ............ *B60R 21/0428* (2013.01); *B32B 7/04* (2013.01); *B32B 27/12* (2013.01);
(Continued)

(58) Field of Classification Search
CPC ................ B60R 21/0428; B60R 21/04; B60R 2021/0414; B60R 2021/0006;
(Continued)

(56) References Cited

U.S. PATENT DOCUMENTS 3,141,811 A * 7/1964 Fox .......................... B32B 5/26 428/218
4,783,114 A 11/1988 Welch
(Continued)

FOREIGN PATENT DOCUMENTS

DE 19501292 C2 7/1996
DE 102008041908 B4 5/2010
(Continued)

OTHER PUBLICATIONS

International Search Report and Written Opinion for International Application No. PCT/US2024/027888 dated Jul. 26, 2024, 24 pages.

*Primary Examiner* — Keith J Frisby
(74) *Attorney, Agent, or Firm* — Amin, Turocy & Watson, LLP

(57) ABSTRACT

A component for a vehicle interior configured to deform in an event such as a side impact of the vehicle may comprise a composite structure comprising a structural substrate and a structure/frame. The structural substrate may comprise a fiber panel; the structure may comprise a molded structure with a feature provided on the structural substrate at an interface. The feature may comprise a reinforcement for the interface and/or a projection for assembly of the component. The interface may comprise resin material from the molded structure and resin material from the fiber panel. The structure may comprise a border formed at the edge along the thickness of the fiber panel. The interface may comprise intermixing of resin material from the molded structure and the fiber panel and intermingling of resin material from the molded structure and fibers from the fiber panel. A method of producing the component may comprise providing a structural substrate and forming a structure onto the structural substrate at an interface and providing a cover and/or
(Continued)

a pad for the composite structure. The component may comprise a trim panel, armrest, etc.

20 Claims, 31 Drawing Sheets

Related U.S. Application Data

(60) Provisional application No. 63/500,098, filed on May 4, 2023.

(51) Int. Cl.

| | |
|---|---|
| ***B32B 7/04*** | (2019.01) |
| ***B32B 27/12*** | (2006.01) |
| ***B60R 13/02*** | (2006.01) |
| *B29L 9/00* | (2006.01) |
| *B29L 31/30* | (2006.01) |
| *B60R 21/00* | (2006.01) |

(52) U.S. Cl.
CPC .... *B60R 13/0243* (2013.01); *B29C 45/14786* (2013.01); *B29L 2009/00* (2013.01); *B29L 2031/3026* (2013.01); *B32B 2605/003* (2013.01); *B60R 2021/0006* (2013.01); *B60R 2021/0414* (2013.01)

(58) Field of Classification Search
CPC ................ B60R 13/02; B60R 13/0243; B29C 45/14786; B29C 45/14; B62D 21/157; B62D 21/15; B62D 65/14; B62D 29/043; B62D 29/04; B60N 2/75; B60N 2/78; B60N 2/783; B60N 2/42; B60N 2/4207; B60N 2/4235; B29L 2031/3041; B29L 2031/3014; B29L 2031/3005; B29L 2031/302; B29L 2031/3008; B29L 2031/3026; B29L 2009/00; B32B 2605/003; B32B 27/12; B32B 27/06; B32B 7/04
USPC ........ 280/751; 296/146.7, 153, 187.05, 1.08, 296/1.09, 187.12
See application file for complete search history.

(56) References Cited

U.S. PATENT DOCUMENTS

| | | | | | |
|---|---|---|---|---|---|
| 4,882,002 | A | * | 11/1989 | Ando | B32B 27/08 156/332 |
| 4,890,877 | A | * | 1/1990 | Ashtiani-Zarandi | B32B 3/28 296/146.7 |
| 5,549,327 | A | | 8/1996 | Rusche et al. | |
| 7,503,621 | B2 | | 3/2009 | Mani | |
| 8,047,602 | B2 | | 11/2011 | Sielhorst et al. | |
| 8,827,354 | B2 | | 9/2014 | Wolff et al. | |
| 9,505,325 | B2 | | 11/2016 | Doan et al. | |
| 10,328,881 | B2 | | 6/2019 | Bozio et al. | |
| 2006/0138802 | A1 | | 6/2006 | Dreier et al. | |
| 2007/0036946 | A1 | | 2/2007 | Muller et al. | |
| 2009/0179454 | A1 | | 7/2009 | Saida et al. | |
| 2009/0256384 | A1 | | 10/2009 | Hughes, Jr. et al. | |
| 2010/0327646 | A1 | | 12/2010 | Hori et al. | |
| 2011/0281076 | A1 | | 11/2011 | Anderson et al. | |
| 2017/0182729 | A1 | * | 6/2017 | Fox | B29C 45/0005 |
| 2019/0389097 | A1 | * | 12/2019 | Heikkila | B29C 43/56 |
| 2020/0079312 | A1 | | 3/2020 | Stroebe et al. | |
| 2021/0370556 | A1 | * | 12/2021 | Klusmeier | B60H 1/2227 |
| 2023/0091672 | A1 | * | 3/2023 | Khan | B32B 27/32 428/315.7 |
| 2023/0256878 | A1 | * | 8/2023 | Wolff | B60R 21/02 296/153 |
| 2026/0054679 | A1 | * | 2/2026 | Stroebe | B60R 21/215 |

FOREIGN PATENT DOCUMENTS

| | | | | | |
|---|---|---|---|---|---|
| DE | 102011107293 | A1 | * | 1/2013 | B60N 2/7017 |
| DE | 102013220803 | A1 | | 7/2014 | |
| KR | 20020052602 | A | * | 7/2002 | |
| KR | 1020220055248 | A | | 5/2022 | |
| WO | 2019173747 | A2 | | 9/2019 | |
| WO | WO-2022265978 | A1 | * | 12/2022 | B60R 21/217 |

* cited by examiner

COMPONENT FOR VEHICLE INTERIOR

CROSS-REFERENCE TO RELATED APPLICATIONS

The present application is a continuation of PCT/International Patent Application No. PCT/US24/27888 titled "COMPONENT FOR VEHICLE INTERIOR" filed May 3, 2024 and U.S. Provisional Patent Application No. 63/500,098 titled "COMPONENT FOR VEHICLE INTERIOR" filed May 4, 2023.

The present application claims priority to and incorporates by reference in full the following patent applications: (1) PCT/International Patent Application No. PCT/US24/27888 titled "COMPONENT FOR VEHICLE INTERIOR" filed May 3, 2024; and (2) U.S. Provisional Patent Application No. 63/500,098 titled "COMPONENT FOR VEHICLE INTERIOR" filed May 4, 2023.

FIELD

The present invention relates to a component for a vehicle interior.

The present invention also relates to component for a vehicle interior configured for response in event of a side impact.

BACKGROUND

It is known to provide a component for a vehicle interior such as a door panel with an armrest configured for response in event of a side impact.

It would be advantageous to provide an improved component for a vehicle interior such as a door panel with an armrest configured for response in event of a side impact.

SUMMARY

The present invention relates to a component for a vehicle interior configured to deform in response to an event such as a side impact of the vehicle comprising a composite structure comprising a structural substrate and a structure; the structural substrate may comprise a fiber panel; the structure may comprise a molded structure with a feature; the molded structure may be provided on the structural substrate; the molded structure may comprise resin material; the fiber panel may comprise resin material; the molded structure may be provided on the structural substrate at an interface; the interface may comprise resin material from the molded structure and resin material from the fiber panel; the fiber panel of the composite structure may be configured to deform to absorb energy in response to the event; the structural substrate may comprise a shape; the structure may comprise a border of the structural substrate; the interface may be provided at a border of the structure at an edge of the fiber panel; the interface may comprise intermixing of resin material from the molded structure and fibers from the fiber panel; the molded structure may comprise a frame and/or a border formed on the edge of the fiber panel; the feature of the molded structure may comprise a molded feature and/or a set of features formed on the fiber panel; the fiber panel may comprise a compression-formed panel configured to provide the structural substrate for the composite structure; the fiber panel may comprise a feature; the feature of the fiber panel may comprise a recess and/or a notch and/or a projection; the feature may comprise a reinforcement; the reinforcement may be configured to strengthen the interface between the structure and the fiber panel; the reinforcement may be coupled to the fiber panel and coupled to the structure; material of the structure and material of the fiber panel may intermingle during formation of the reinforcement; the feature may comprise at least one of a gusset and/or a tab and/or a flange and/or a rib and/or a set of ribs and/or a reinforcement frame; the component may further comprise a cover formed on the composite structure; the composite structure may comprise a pad; the fiber panel may comprise a deformable region configured to deform in response in the event; the interface may be formed by molding the structure into and/or onto the fiber panel; the structure may comprise a frame for the fiber panel; the fiber panel may comprise a plurality of fibers and a resin configured to bind the fibers; the structure may comprise a molded resin; the component may be made by a method comprising the steps of providing a structural substrate and forming a structure onto the structural substrate at an interface; the structural substrate may comprise a fiber panel comprising a resin material; the structure may comprise a molded structure comprising a resin material; the interface may comprise the resin material of the fiber panel and the resin material of the molded structure; the structure may comprise a molded feature; the interface may be formed by molding of the resin material of the structure into the resin material of the structural substrate; the interface may be formed by molding of resin material of the structure into a fiber material of the structural substrate; the fiber panel may comprise an edge and a thickness; the structure may comprise a border; the interface may be provided at the border of the structure at of the edge of the fiber panel along the thickness of the fiber panel; the method may further comprise the step of providing a cover for the structural substrate; the step of forming the structure onto the structural substrate may comprise injection molding of the structure onto the structural substrate.

The present invention relates to a component for a vehicle interior configured to deform in response to an event such as a side impact of the vehicle comprising a fiber structure and a structure comprising a resin; the fiber structure may comprise an edge along a periphery and may provide a structural substrate having a shape and a thickness along the edge; the structure may comprise a border of the structural substrate along the thickness of the structural substrate; the fiber structure may be configured to deform in response in the event; the fiber structure may comprise a fiber panel configured to be formed into a compression formed structure; the feature may comprise a frame and/or an internal frame and/or a framework and/or a mounting feature and/or an attachment feature and/or a projection for mounting; the feature of the molded structure may comprise a set of features; the cover may be molded onto the structural substrate; the component may further comprise a cover; the cover may comprise at least one of cover stock and/or a woven fabric and/or a non-woven fabric and/or an applique and/or a vinyl layer and/or a foam layer and/or a foil layer and/or a leather covering; the cover may comprise at least one of a thermoplastic elastomer material and/or a thermoplastic vulcanizate material and/or a polyurethane material and/or rubber within a polypropylene matrix and/or a foam core with an integral skin and/or a skin material softer than the fiber panel; the component may comprise at least one of a panel and/or a trim panel and/or a door panel and/or an armrest assembly on the door panel and/or an armrest.

The present invention relates to a component for a vehicle interior configured to deform in response to an event such as a side impact of the vehicle comprising a composite structure comprising a structural substrate and a structure. The structural substrate may comprise a fiber panel. The structure may comprise a molded structure with a feature. The molded structure may be provided on the structural substrate. The molded structure may comprise resin material. The fiber panel may comprise resin material. The molded structure may be provided on the structural substrate at an interface. The interface may comprise resin material from the molded structure and resin material from the fiber panel. The fiber panel of the composite structure may be configured to deform to absorb energy in response to the event. The structural substrate may comprise a shape and a thickness at an edge; the fiber panel of the structural substrate may comprise the edge along a periphery; the structure may comprise a border formed at the edge of the fiber panel of the structural substrate. The fiber panel of the structural substrate may comprise the edge and the thickness along a periphery; the structure may comprise a border formed at the edge along the thickness of the fiber panel. The interface may be provided at a border formed at the edge along the thickness of the fiber panel. The interface may be provided at a border of the structure formed at the edge of the fiber panel. The fiber panel may comprise an edge and a thickness; the structure may comprise a border; the interface may be provided at the border of the structure. The fiber panel may comprise an edge and a thickness; the structure may comprise a border; the interface may be provided at the border of the structure at of the edge of the fiber panel along the thickness of the fiber panel. The interface may comprise mixing of resin material from the molded structure and resin material from the fiber panel. The interface may comprise intermingling of resin material from the molded structure and resin material from the fiber panel; the interface may comprise intermingling of resin material from the molded structure and fibers from the fiber panel. The molded structure may comprise an injection-molded structure. The molded structure may comprise a frame. The fiber panel may comprise an edge providing a periphery; the molded structure may be formed on the edge of the fiber panel. The molded structure may comprise a frame and/or a border formed on the edge of the fiber panel. The feature of the molded structure may comprise a molded feature formed on the fiber panel. The feature of the molded structure may comprise a set of features formed on the fiber panel. The composite structure may comprise a cover formed on the structural substrate. The structure may comprise a molded frame comprising the molded structure and a molded feature comprising the feature; the molded frame of the structure may be molded onto the fiber panel. The fiber panel may comprise a compression-formed panel configured to provide the structural substrate for the composite structure. The fiber panel may comprise an edge providing a thickness; the thickness of the edge of the fiber panel may comprise a variation of thickness along the periphery. The thickness of the edge of the fiber panel may comprise a first thickness and a second thickness; the molded structure may comprise an edge comprising the first thickness formed at the first thickness of the edge of the fiber panel and the second thickness formed at the second thickness of the edge of the fiber panel. The molded structure may be configured to be formed on the edge of the fiber panel. The fiber panel may comprise a feature. The feature of the fiber panel may comprise a recess. The feature of the fiber panel may comprise a notch. The feature of the fiber panel may comprise a projection. The feature of the fiber panel may comprise at least one of (a) a set of features; (b) a set of recesses; (c) a set of notches; (d) a set of projections. The feature of the fiber panel may comprise a set of recesses and a set of projections. The feature of the molded structure may be formed at the feature of the fiber panel. The feature of the molded structure may comprise a set of features; the set of features of the molded structure may be formed at the set of features of the fiber panel. The feature of the molded structure may comprise a set of features; the set of features of the molded structure may be formed at the set of recesses of the fiber panel. The feature of the structure may comprise a molded feature. The feature may comprise a reinforcement. The feature may comprise a reinforcement frame. The feature may comprise at least one of (a) a gusset; (b) a tab; (c) a flange; (d) a rib; (e) a set of ribs. The feature may comprise a projection. The feature may comprise a frame. The feature may comprise an internal frame. The feature may comprise a framework. The feature may comprise a mounting feature; an attachment feature; and/or a projection for mounting. The feature may be configured to facilitate attachment of the composite structure to a door structure. The feature of the molded structure may comprise a set of projections formed at the set of recesses of the fiber panel. The feature of the molded structure may comprise a projection comprising a base formed into a recess in the fiber panel. The feature of the molded structure may comprise a projection comprising a base formed into a recess at an edge of the fiber panel. The feature of the molded structure may comprise a set of projections formed along an edge of the fiber panel. The feature of the molded structure may comprise a set of projections with a base formed into an edge of the fiber panel. The feature of the molded structure may comprise at least one projection. The structure may comprise a frame. The structure may comprise a border for the fiber panel. The structure may comprise a frame and the feature. The structure may be molded on the structural substrate. The structure may be molded into the structural substrate. The structure may be bonded with the structural substrate. The structure may be pressed into the structural substrate. The structure may be configured to compress the structural substrate. The structure may be configured to retain a shape of the structural substrate. The structure may be configured to protect an edge of the structural substrate. The structure may be bonded with the structural substrate to provide a border. The composite structure may comprise a cover. A cover may be provided on the composite structure. The cover may be molded onto the structural substrate. The cover may comprise an injection-molded skin. The composite structure may comprise a pad. The composite structure may comprise a foam pad formed on the structural substrate. The composite structure may comprise a pad and a cover formed on the fiber panel. The fiber panel may comprise an edge along a periphery and provides a structural substrate having a shape and a thickness along the edge; the structure may comprise a border of the structural substrate along the thickness of the structural substrate. The fiber panel may comprise a compression-formed component; the compression-formed component may comprise an edge along a periphery; the compression-formed component may provide a shape and a thickness along the edge for the structural substrate. The structure may comprise a border of the structural substrate along the thickness of the structural substrate provided by the compression-formed component. The fiber panel may comprise a deformable region configured to deform in response in the event. The feature may comprise a reinforcement. The reinforcement may comprise a gusset. The reinforcement may be configured to strengthen an angle of the component. The reinforcement may be configured to strengthen the interface between the structure and the fiber panel. The reinforcement may be (a) coupled to the fiber panel and (b) coupled to the structure. The reinforcement may comprise the interface; the interface may comprise a composite material; the composite material may comprise material of the fiber panel and material of the structure. The interface may be formed by molding the structure into or onto the fiber panel. Material of the structure and material of the fiber panel intermingle during formation of the reinforcement. The fiber panel may comprise a first thickness and a second thickness greater than the first thickness; the second thickness may comprise the thickness along the edge; the second thickness may be configured for bonding of the fiber panel and the structure. The structure may comprise a tab configured to fit in a notch of the fiber panel and a protrusion coupled to the tab. The protrusion may be configured to facilitate assembly of the component to a door panel. The structure may comprise a frame for the fiber panel. The fiber panel may comprise a compression-formed component. The structure may be formed on the edge of the fiber panel. The fiber panel may comprise a plurality of fibers and a resin configured to bind the fibers; the structure may comprise a molded resin. The structure may be bonded to the fiber panel. The structure may be formed from a molded resin. The structure may be configured to accommodate at least one variation in at least one edge of the fiber panel. The component may comprise a cover; the cover may comprise at least one of (a) cover stock; (b) a woven fabric; (c) a non-woven fabric; (d) an applique; (e) a vinyl layer; (f) a foam layer; (g) a foil layer; (h) a leather covering. The component may comprise a cover; the cover may comprise at least one of (a) a thermoplastic elastomer material; (b) a thermoplastic vulcanizate material; (c) a polyurethane material; (d) rubber within a polypropylene matrix; (e) a foam core with an integral skin; (f) a skin material softer than the fiber panel. The component may be configured to be provided adjacent to a seat for a vehicle occupant. The component may comprise at least one of (a) a panel; (b) a trim panel; (c) a door panel; (d) an armrest assembly on the door panel; (e) an armrest.

The present invention relates to a method of producing a component for a vehicle interior configured to deform in response to an event such as a side impact of the vehicle comprising the steps of providing a structural substrate and forming a structure onto the structural substrate at an interface. The structural substrate may comprise a fiber panel comprising a resin material. The structure may comprise a molded structure comprising a resin material. The interface may comprise the resin material of the fiber panel and the resin material of the molded structure. The structure may comprise a molded feature. The fiber panel may comprise an edge and a thickness; the structure may comprise a border; the interface may be provided at the border of the structure at of the edge of the fiber panel along the thickness of the fiber panel. The method may comprise the step of providing a cover for the structural substrate. The step of forming the structure onto the structural substrate may comprise injection molding of the structure onto the structural substrate. The interface may be formed by molding of the resin material of the structure into the resin material of the structural substrate; the interface may be formed by molding of resin material of the structure into a fiber material of the structural substrate.

The present invention relates to a method of manufacturing a component for a vehicle interior in a mold providing a mold cavity comprising heating a fiber panel, placing the fiber panel into the mold cavity, compressing the fiber panel in the mold cavity to form a compression-formed component comprising a shape, an edge along a periphery, and a thickness along the edge, injecting resin into the mold cavity with the compression-formed component to form a structure, and forming an interface configured between the structure and the compression-formed component. A border of the compression-formed component may be formed along the thickness of the compression-formed component by the resin injected into the mold cavity. The interface may comprise a reinforcement (a) coupled to the compression-formed component and (b) coupled to the structure. The compression-formed component may comprise a structural substrate. The reinforcement may be configured to strengthen the component. The interface may comprise a composite material; the composite material may comprise material of the fiber panel and the resin. The step of forming the interface may comprise intermingling the resin and material of the fiber panel. The step of compressing the fiber panel in the mold cavity may comprise compressing a first portion of the fiber panel to a first thickness and compressing a second portion of the fiber panel to a second thickness greater than the first thickness; the second thickness may comprise the thickness along the edge of the compression-formed component; the second thickness may be configured for bonding of the compression-formed component and the structure. The method may comprise a step of injecting a material into the mold cavity with the compression-formed component and the structure to form a cover for the compression-formed component. The cover may comprise a foamed cover and/or a foam core with an integral skin on the foam core. The material may comprise at least one of (a) a mixture of polyurethane, (b) a combination of a reaction mixture, (c) foam material, (d) polyurethane foam, (e) urethane foam. The material may comprise at least one of (a) a thermoplastic elastomer material; (b) a thermoplastic vulcanizate material; (c) a polyurethane material; (d) rubber within a polypropylene matrix.

The present invention relates to a component for a vehicle interior configured to deform in response to an event such as a side impact of the vehicle comprising a fiber panel and a structure comprising a resin. The fiber panel may comprise an edge along a periphery and provide a structural substrate having a shape and a thickness along the edge. The structure may comprise a border of the structural substrate along the thickness of the structural substrate. The fiber panel may be configured to deform in response in the event.

The present invention relates to a component for a vehicle interior configured to deform in response to an event such as a side impact of the vehicle comprising a composite structure comprising a structural substrate and a structure. The structural substrate may comprise a fiber panel. The structure may comprise a molded structure with a feature. The molded structure may be provided on the structural substrate. The molded structure may comprise resin material. The fiber panel may comprise resin material. The molded structure may be provided on the structural substrate at an interface. The interface may comprise resin material from the molded structure and resin material from the fiber panel. The fiber panel of the composite structure may be configured to deform to absorb energy in response to the event. The structural substrate may comprise a shape and a thickness at an edge. The fiber panel of the structural substrate may comprise the edge along a periphery. The structure may comprise a border formed at the edge of the fiber panel of the structural substrate. The fiber panel of the structural substrate may comprise the edge and the thickness along a periphery. The structure may comprise a border formed at the edge along the thickness of the fiber panel. The interface may be provided at a border formed at the edge of the fiber panel. The interface may be provided at a border formed at the edge along the thickness of the fiber panel. The interface may be provided at a border of the structure formed at the edge of the fiber panel. The interface may be provided at a border of the structure formed at the edge along the thickness of the fiber panel. The fiber panel may comprise an edge and a thickness; the structure may comprise a border; the interface may be provided at the border of the structure. The fiber panel may comprise an edge and a thickness; the structure may comprise a border; the interface may be provided at the border of the structure at of the edge of the fiber panel. The fiber panel may comprise an edge and a thickness; the structure may comprise a border; the interface may be provided at the border of the structure at of the edge of the fiber panel along the thickness of the fiber panel. The interface may comprise mixing of resin material from the molded structure and resin material from the fiber panel. The interface may comprise intermixing of resin material from the molded structure and resin material from the fiber panel. The interface may comprise intermixing of resin material from the molded structure and resin material from the fiber panel; the interface may comprise intermingling of resin material from the molded structure and fibers from the fiber panel. The interface may comprise intermingling of resin material from the molded structure and resin material from the fiber panel. The interface may comprise intermingling of resin material from the molded structure and fibers from the fiber panel. The molded structure may comprise an injection-molded structure. The molded structure may comprise a frame. The molded structure may comprise an injection-molded frame. The fiber panel may comprise an edge providing a periphery. The molded structure may be formed on the edge of the fiber panel. The molded structure may comprise a frame formed on the edge of the fiber panel. The molded structure may comprise a border formed on the edge of the fiber panel. The feature of the molded structure may comprise a molded feature formed on the fiber panel. The feature of the molded structure may comprise a set of features formed on the fiber panel. The composite structure may comprise a cover for the structural substrate. The cover may be formed on the structural substrate. The structure may comprise a molded frame comprising the molded structure and a molded feature comprising the feature. The molded frame of the structure may be molded onto the fiber panel. The fiber panel may comprise a compression-formed panel. The fiber panel may comprise a compression-formed panel configured to provide the structural substrate for the composite structure. The fiber panel may comprise an edge providing a thickness. The thickness of the edge of the fiber panel may comprise a variation of thickness along the periphery. The thickness of the edge of the fiber panel may comprise a first thickness and a second thickness. The molded structure may comprise an edge comprising the first thickness and the second thickness. The molded structure may comprise an edge comprising the first thickness formed at the first thickness of the edge of the fiber panel and the second thickness formed at the second thickness of the edge of the fiber panel. The molded structure may be configured to be formed on the edge of the fiber panel. The fiber panel may comprise a feature. The feature of the fiber panel may comprise a recess. The feature of the fiber panel may comprise a notch. The feature of the fiber panel may comprise a projection. The feature of the fiber panel may comprise a set of features. The feature of the fiber panel may comprise a set of recesses. The feature of the fiber panel may comprise a set of notches. The feature of the fiber panel may comprise a set of projections. The feature of the fiber panel may comprise a set of recesses and a set of projections. The feature of the molded structure may be formed at the feature of the fiber panel. The feature of the molded structure may comprise a set of features; the set of features of the molded structure may be formed at the set of features of the fiber panel. The feature of the molded structure may be formed at the recess of the fiber panel. The feature of the molded structure may comprise a set of features; the set of features of the molded structure may be formed at the set of recesses of the fiber panel. The feature of the structure may comprise a molded feature. The feature may comprise a reinforcement. The feature may comprise a reinforcement feature. The feature may comprise a reinforcement frame. The feature may comprise a gusset. The feature may comprise a tab. The feature may comprise a flange. The feature may comprise a rib. The feature may comprise a set of ribs. The feature may comprise a projection. The feature may comprise a frame. The feature may comprise an internal frame. The feature may comprise a framework. The feature may comprise a mounting feature. The feature may comprise an attachment feature. The feature may comprise a projection for mounting. The feature may be configured to facilitate attachment of the composite structure to a door structure. The feature may be configured to facilitate attachment of the composite structure to a panel. The feature of the molded structure may comprise a set of projections formed at the set of recesses of the fiber panel. The feature of the molded structure may comprise a projection. The feature of the molded structure may comprise a set of projections. The feature of the molded structure may comprise a projection comprising a base formed into a recess in the fiber panel. The feature of the molded structure may comprise a projection comprising a triangle-shaped base formed into a triangle-shaped recess in the fiber panel. The feature of the molded structure may comprise a projection comprising a base formed into a recess at an edge of the fiber panel. The feature of the molded structure may comprise a set of projections formed along an edge of the fiber panel. The feature of the molded structure may comprise a set of projections with a base formed into an edge of the fiber panel. The feature of the molded structure may comprise at least one least one feature. The at least one feature may comprise a projection. The feature may comprise at least one projection. The structure may comprise a frame. The structure may comprise a border for the fiber panel. The structure may provide a housing for the fiber panel. The structure may comprise the frame and the feature. The structure may comprise a molded housing with the feature. The structure may be molded on the structural substrate. The structure may be molded into the structural substrate. The structure may be bonded with the structural substrate. The structure may be pressed into the structural substrate. The structure may be configured to compress the structural substrate. The structure may be configured to retain a shape of the structural substrate. The structure may protect an edge of the structural substrate. The structure may be bonded with the structural substrate to provide a border. The composite structure may comprise a cover. A cover may be provided on the composite structure. The cover may be molded onto the structural substrate. The cover may be overmolded onto the structural substrate. The cover may comprise an injection-molded skin. The composite structure may comprise a pad. The composite structure may comprise a foam pad. The composite structure may comprise a foam pad formed on the structural substrate. The composite structure may comprise a pad and a cover formed on the fiber panel. The fiber panel may comprise an edge along a periphery and may provide a structural substrate having a shape and a thickness along the edge; the structure may comprise a border of the structural substrate along the thickness of the structural substrate. The fiber panel may comprise a compression-formed component; the compression-formed component may comprise an edge along a periphery; the compression-formed component may provide a shape and a thickness along the edge for the structural substrate. The structure may comprise a border of the structural substrate along the thickness of the structural substrate provided by the compression-formed component. In response in the event the fiber panel may be configured to absorb force. In response in the event the fiber panel may be configured for movement relative to the structure. The fiber panel may comprise a deformable region configured to deform in response in the event. The feature may comprise a reinforcement. The reinforcement may comprise a gusset. The reinforcement may be configured to strengthen an angle of the component. The reinforcement may be configured to strengthen the interface between the structure and the fiber panel. The reinforcement may be configured to strengthen a joint between the structure and the fiber panel. The reinforcement may be (a) coupled to the fiber panel and (b) coupled to the structure. The reinforcement may comprise the interface; the interface may comprise a composite material; the composite material may comprise material of the fiber panel and material of the structure. The interface may be formed by molding the structure on the fiber panel. Material of the structure and material of the fiber panel may intermingle during formation of the reinforcement. The fiber panel may comprise a first thickness and a second thickness greater than the first thickness. The second thickness may comprise the thickness along the edge. The second thickness may be configured for bonding of the fiber panel and the structure. The structure may comprise a tab configured to fit in a notch of the fiber panel. The structure may comprise a protrusion coupled to the tab. The protrusion may be configured to facilitate assembly of the component to a door panel. The structure may comprise a frame for the fiber panel. The fiber panel may comprise a compression-formed component. The structure may be formed on the edge of the fiber panel. The fiber panel may comprise a plurality of fibers and a resin configured to bind the fibers; the structure may comprise a molded resin. The structure may be bonded to the fiber panel. The structure may be formed from a molded resin. The structure may be configured to accommodate at least one variation in at least one edge of the fiber panel. The component may comprise at least one of (a) a pad; (b) a cover. The cover may comprise at least one of (a) cover stock; (b) a woven fabric; (c) a non-woven fabric; (d) an applique; (e) a vinyl layer; (f) a foam layer; (g) a foil layer; (h) a leather covering. The component may comprise a cover; the cover may comprise a molded thermoplastic material. The component may comprise a cover; the cover may comprise at least one of (a) a thermoplastic elastomer material; (b) a thermoplastic vulcanizate material; (c) a polyurethane material; (d) rubber within a polypropylene matrix. The component may comprise a cover; the cover may comprise a foam core with an integral skin. The component may comprise a cover; the cover may comprise a skin material softer than the fiber panel. The component may be configured to be provided adjacent to a seat for a vehicle occupant. The component may comprise at least one of (a) door panel; (b) an armrest assembly on the door panel; (c) an armrest.

The present invention relates to a method of producing a component for a vehicle interior configured to deform in response to an event such as a side impact of the vehicle comprising the steps of (a) providing a structural substrate, and (b) forming a structure onto the structural substrate at an interface. The structural substrate may comprise a fiber panel comprising a resin material. The structure may comprise a molded structure comprising a resin material. The interface may comprise the resin material of the fiber panel and the resin material of the molded structure. The structure may comprise a feature. The structure may comprise a molded feature. The fiber panel may comprise an edge and a thickness; the structure may comprise a border; the interface may be provided at the border of the structure at of the edge of the fiber panel along the thickness of the fiber panel. The method may comprise the step of providing a cover for the structural substrate. The step of forming the structure onto the structural substrate may comprise injection molding of the structure onto the structural substrate. The interface may be formed by molding of the resin material of the structure into the resin material of the structural substrate. The interface may be formed by molding of resin material of the structure into a fiber material of the structural substrate.

The present invention relates to a method of manufacturing a component for a vehicle interior in a mold providing a mold cavity comprising heating a fiber panel, placing the fiber panel into the mold cavity; compressing the fiber panel in the mold cavity to form a compression-formed component comprising a shape, an edge along a periphery, and a thickness along the edge, injecting resin into the mold cavity with the compression-formed component to form a structure, and forming a reinforcement configured to strengthen a joint between the structure and the compression-formed component. A border of the compression-formed component may be formed along the thickness of the compression-formed component by the resin injected into the mold cavity. The reinforcement may be (a) coupled to the compression-formed component and (b) coupled to the structure. The compression-formed component may comprise a structural substrate. The reinforcement may comprise a gusset. The reinforcement may be configured to strengthen an angle of the component. The reinforcement may comprise an interface; the interface may comprise a composite material; the composite material may comprise material of the fiber panel and the resin. The step of forming the reinforcement may comprise intermingling the resin and material of the fiber panel. The step of compressing the fiber panel in the mold cavity may comprise compressing a first portion of the fiber panel to a first thickness and compressing a second portion of the fiber panel to a second thickness greater than the first thickness; the second thickness may comprise the thickness along the edge of the compression-formed component; the second thickness may be configured for bonding of the compression-formed component and the structure. The method may comprise a step of cutting a notch in the fiber panel; the step of injecting resin into the mold cavity with the structure may comprise forming a tab of the structure; the notch may be configured to couple the compression-formed component to the tab of the structure. The step of injecting resin into the mold cavity with the structure may comprise forming a protrusion coupled to the tab. The method may comprise a step of injecting a material into the mold cavity with the compression-formed component and the structure to form a cover for the compression-formed component. The cover may comprise a foamed cover. The cover may comprise a foam core with an integral skin on the foam core. The material may comprise at least one of (a) a mixture of polyurethane, (b) a combination of a reaction mixture, (c) foam material, (d) polyurethane foam, (e)

urethane foam. The material may comprise at least one of (a) a thermoplastic elastomer material; (b) a thermoplastic vulcanizate material; (c) a polyurethane material; (d) rubber within a polypropylene matrix. The method may comprise a step of assembling a cover to the compression-formed component and the structure.

The present invention relates to a component for a vehicle interior configured to deform in response to an event such as a side impact of the vehicle comprising a fiber panel and a structure comprising a resin. The fiber panel may comprise an edge along a periphery and may provide a structural substrate having a shape and a thickness along the edge. The structure may comprise a border of the structural substrate along the thickness of the structural substrate. The fiber panel may be configured to deform in response in the event.

The present invention relates to a component for a vehicle interior for response in an event such as a side impact of the vehicle comprising a fiber panel and a structure comprising a resin. The fiber panel may comprise an edge along a periphery and provides a structural substrate having a shape and a thickness along the edge. The structure may comprise a border of the structural substrate along the thickness of the structural substrate. The fiber panel may be configured to deform in response in the event. The fiber panel may be configured to absorb force in response in the event. The event the fiber panel may be configured for movement relative to the structure in response in the event. The fiber panel may comprise a deformable region configured to deform in response in the event. The component may comprise a reinforcement. The reinforcement may comprise a gusset. The reinforcement may be configured to strengthen an angle of the component. The reinforcement may be configured to strengthen a joint between the structure and fiber panel. The reinforcement may be (a) coupled to the fiber panel and (b) coupled to the structure. The reinforcement may comprise an interface; the interface may comprise a composite material; the composite material may comprise material of the fiber panel and material of the structure. The interface may be formed by molding the structure on the fiber panel. Material of the structure and material of the fiber panel may intermingle during formation of the reinforcement. The fiber panel may comprise a first thickness and a second thickness greater than the first thickness. The second thickness may comprise the thickness along the edge. The second thickness may be configured for bonding of the fiber panel and the structure. The structure may comprise a tab configured to fit in a notch of the fiber panel. The structure may comprise a protrusion coupled to the tab. The protrusion may be configured to facilitate assembly of the component to a door panel. The structure may comprise a frame for the fiber panel. The fiber panel may comprise a compression-formed component. The structure may be formed on the edge of the fiber panel. The fiber panel may comprise a plurality of fibers and a resin configured to bind the fibers; the structure may comprise a molded resin. The structure may be bonded to the fiber panel. The structure may be formed from a molded resin. The structure may be configured to accommodate at least one variation in at least one edge of the fiber panel. The component may comprise at least one of (a) a pad; (b) a cover. The cover may comprise at least one of (a) cover stock; (b) a woven fabric; (c) a non-woven fabric; (d) an applique; (e) a vinyl layer; (f) a foam layer; (g) a foil layer; (h) a leather covering. The component may be configured to be provided adjacent to a seat for a vehicle occupant. The component may comprise at least one of (a) door panel; (b) an armrest assembly on the door panel; (c) an armrest.

The present invention relates to a method of manufacturing a component for a vehicle interior in a mold providing a mold cavity comprising heating a fiber panel; placing the fiber panel into the mold cavity; compressing the fiber panel in the mold cavity to form a compression-formed component comprising a shape, an edge along a periphery, and a thickness along the edge; injecting resin into the mold cavity with the compression-formed component to form a structure; and forming a reinforcement configured to strengthen a joint between the structure and the compression-formed component. A border of the compression-formed component may be formed along the thickness of the compression-formed component by the resin injected into the mold cavity. The reinforcement may be (a) coupled to the compression-formed component and (b) coupled to the structure. The compression-formed component may comprise a structural substrate. The reinforcement may comprise a gusset. The reinforcement may be configured to strengthen an angle of the component. The reinforcement may comprise an interface; the interface may comprise a composite material; the composite material may comprise material of the fiber panel and the resin. The step of forming the reinforcement may comprise intermingling the resin and material of the fiber panel. The step of compressing the fiber panel in the mold cavity may comprise compressing a first portion of the fiber panel to a first thickness and compressing a second portion of the fiber panel to a second thickness greater than the first thickness; the second thickness may comprise the thickness along the edge of the compression-formed component; the second thickness may be configured for bonding of the compression-formed component and the structure. The method may comprise a step of cutting a notch in the fiber panel; the step of injecting resin into the mold cavity with the structure may comprise forming a tab of the structure; the notch may be configured to couple the compression-formed component to the tab of the structure. The step of injecting resin into the mold cavity with the structure may comprise forming a protrusion coupled to the tab.

FIGURES

DESCRIPTION

Referring to FIGS. 1A-1B and 2A-2B, a vehicle V with an interior may comprise interior components C such as doors D with door panels DP and armrest AR and an instrument panel IP, etc. As shown schematically according to an exemplary embodiment in FIGS. 1B, 2A and 2B, door D may provide the door panel DP; door panel DP may provide an armrest AR configured to facilitate comfort for vehicle occupants and/or to facilitate energy absorption (e.g. to collapse, deform or crumple) if the vehicle is involved in an event such as impact in a side collision. See also FIGS. 4A-4B, 5A-5B, 6A-6B, 7A-7B, 8A-8B and 9.

According to an exemplary embodiment as shown schematically in FIGS. 1B, 2A-1B, 3A-3C, 8A-8B, 9, 10A-10B, 11A-11B and 12A-12B, a component C shown as armrest AR may be configured to deform in an event such as a side impact; the component C/AR may comprise may comprise a composite structure comprising a structural substrate CF/SB and a structure/frame ST/FR. See also FIGS. 4A-4B, 5A-5B, 6A-6B and 7A-7B.

Figure 1A:
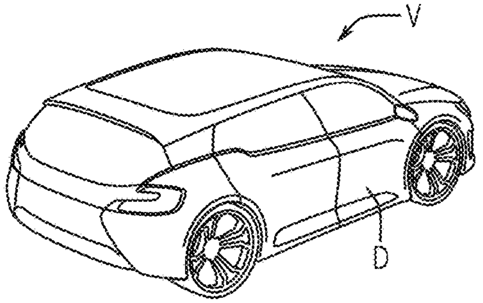
FIG. 1A is a schematic perspective view of a vehicle according to an exemplary embodiment.
Figure 1B:
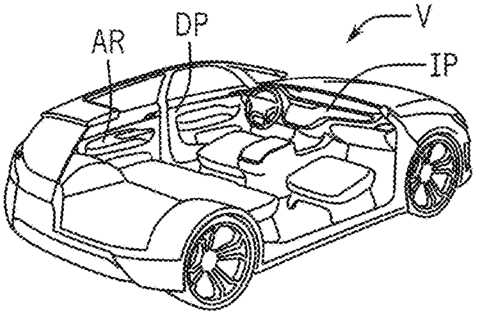
FIG. 1B is a schematic perspective view of a vehicle showing a vehicle interior according to an exemplary embodiment.
Figure 2A:
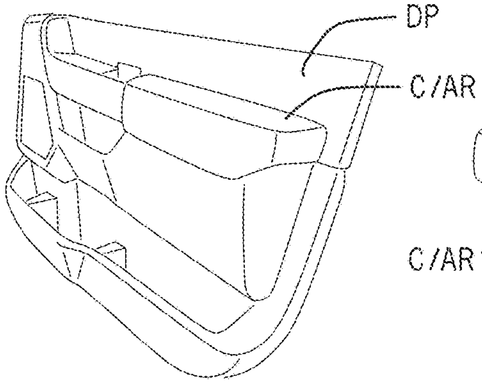
FIG. 2A is a schematic perspective view of a door panel according to an exemplary embodiment.
Figure 2B:
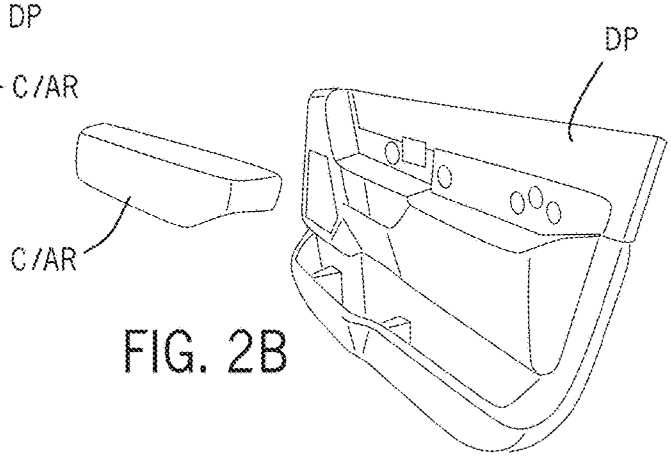
FIG. 2B is a schematic exploded perspective view of a door panel according to an exemplary embodiment.
Figure 3A:
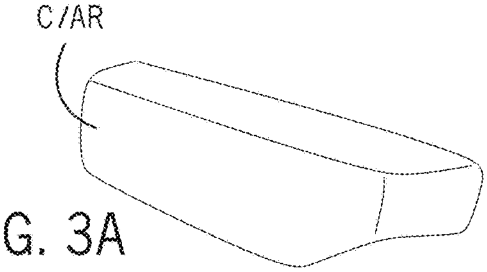
FIG. 3A is a schematic perspective view of a component for a vehicle interior shown as an armrest according to an exemplary embodiment.
Figure 3B:
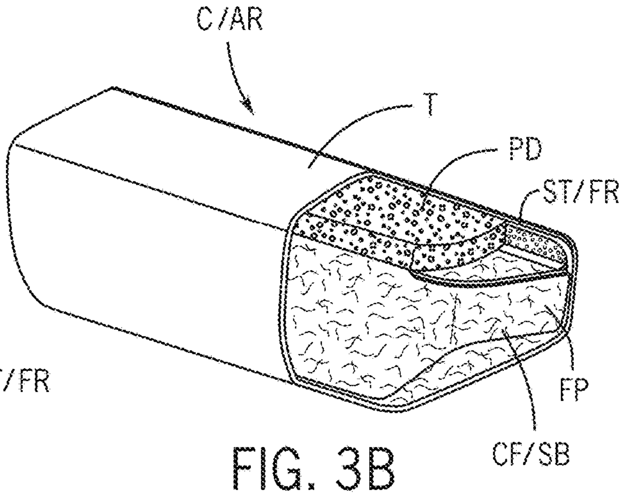
FIG. 3B is a schematic perspective cutaway view of a component for a vehicle interior shown as an armrest according to an exemplary embodiment.
Figure 3C:
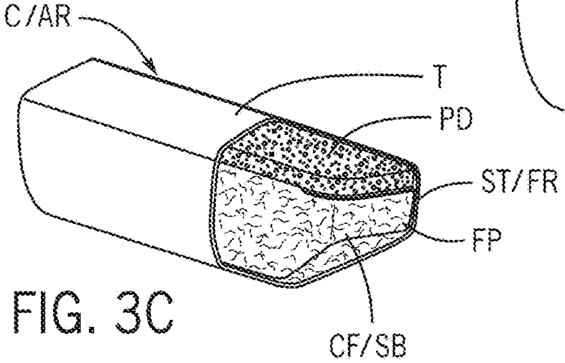
FIG. 3C is a schematic cutaway view of a component for a vehicle interior shown as an armrest according to an exemplary embodiment.
Figure 4A:
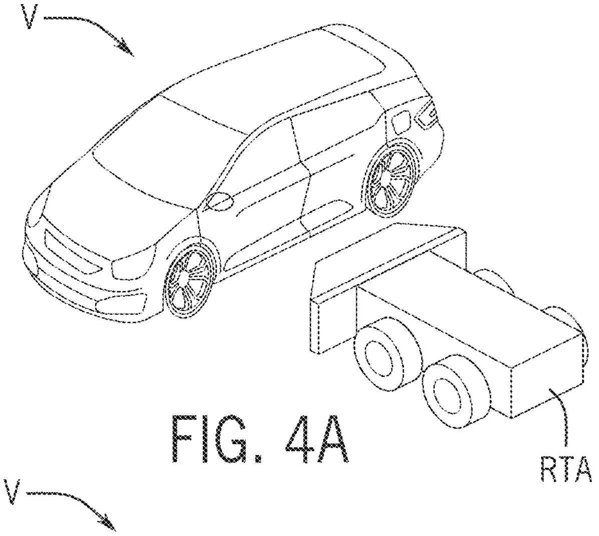
FIGS. 4A to 4B are schematic perspective views of a vehicle according to an exemplary embodiment.
Figure 4B:
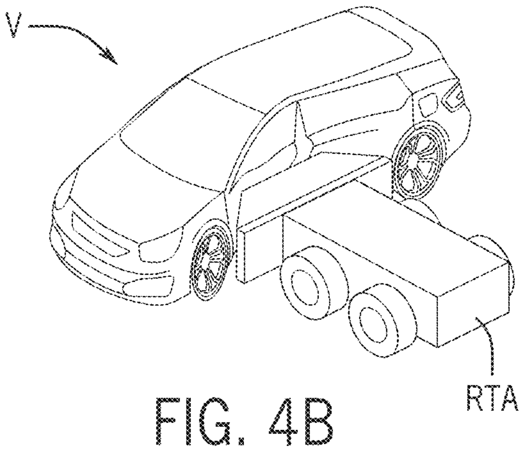
Figure 5A:
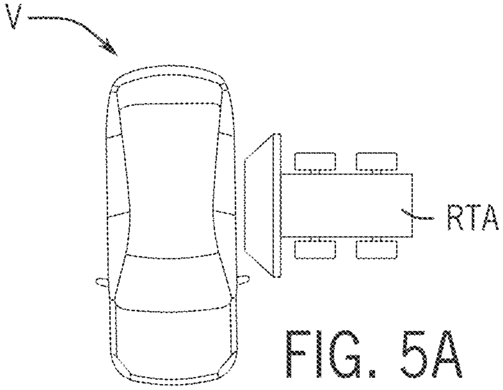
FIGS. 5A to 5B are schematic plan views of a vehicle according to an exemplary embodiment.
Figure 5B:
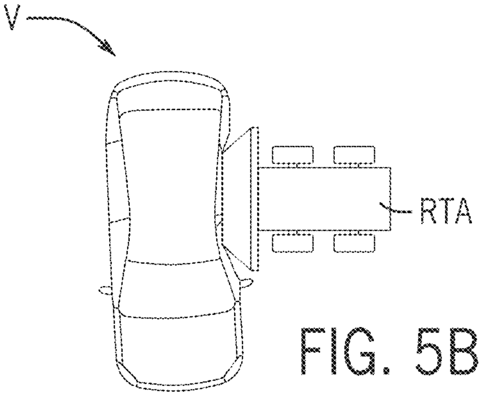
Figure 6A:
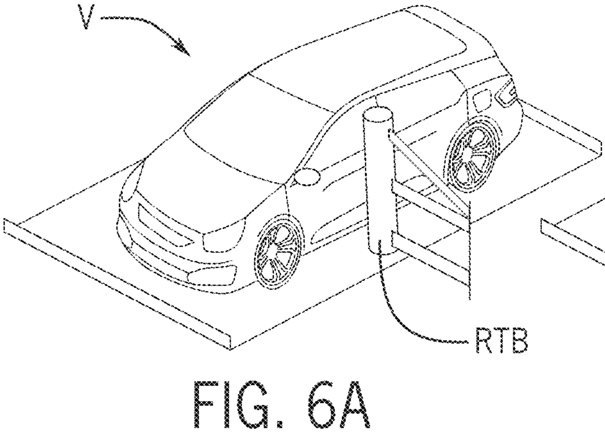
FIGS. 6A to 6B are schematic perspective views of a component for a vehicle interior according to an exemplary embodiment.
Figure 6B:
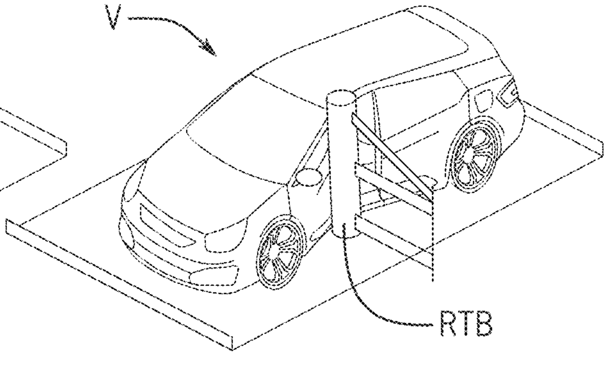
Figure 7A:
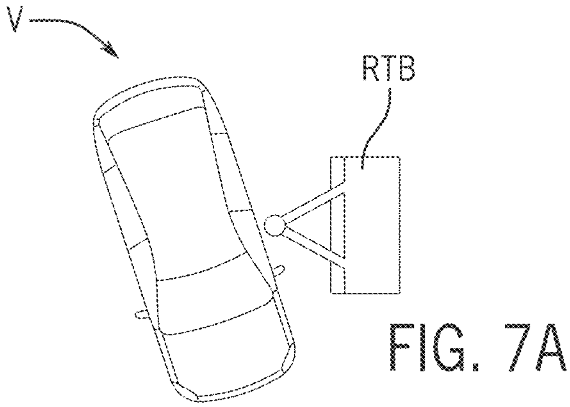
FIGS. 7A to 7B are schematic perspective views of a vehicle according to an exemplary embodiment.
Figure 7B:
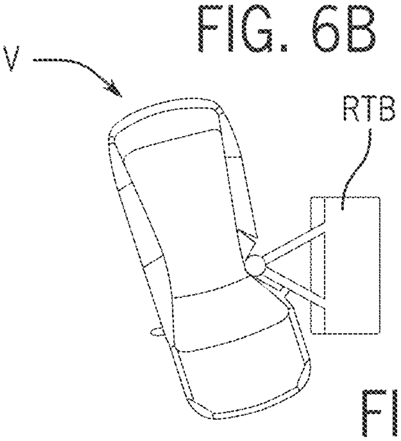
Figure 8A:
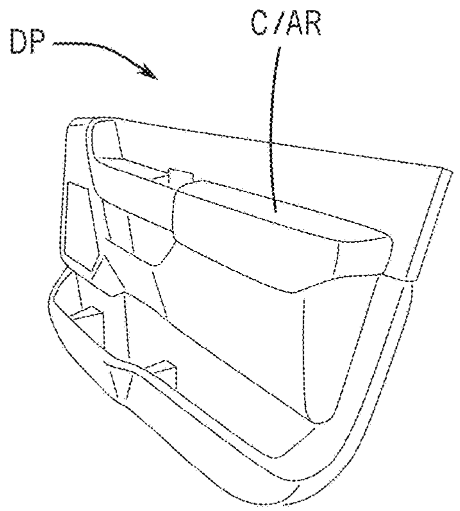
FIGS. 8A to 8B are schematic perspective views of a component for a vehicle interior according to an exemplary embodiment.
Figure 8B:
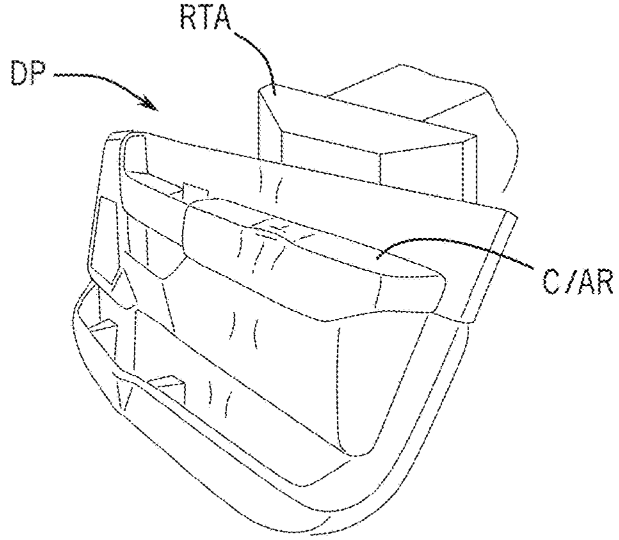
Figure 9:
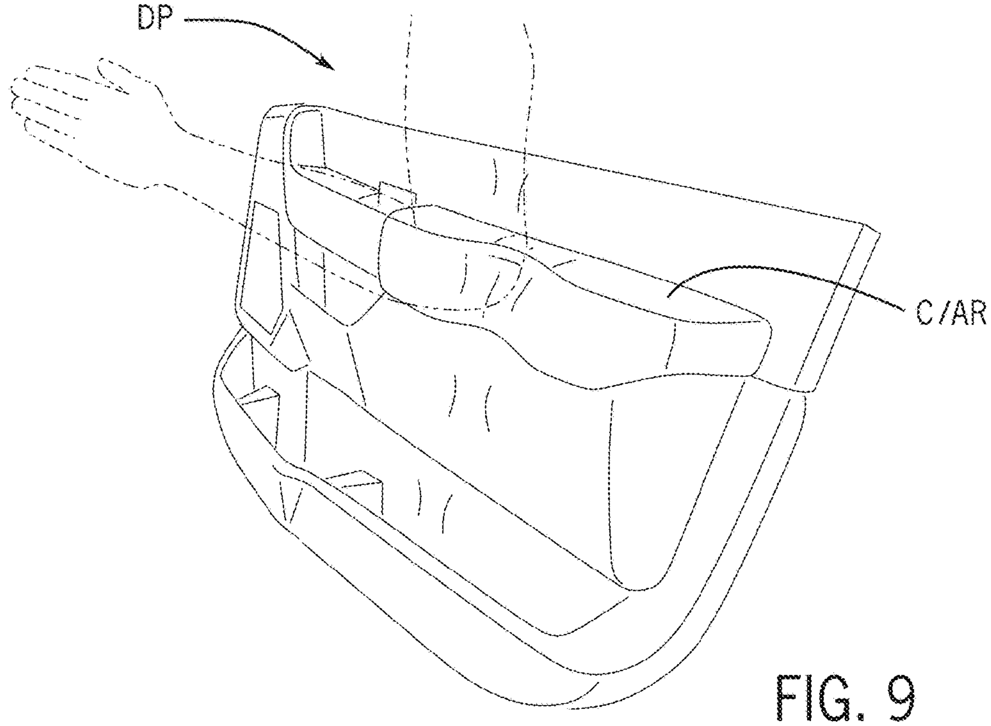
FIG. 9 is a schematic perspective view of a component for a vehicle interior according to an exemplary embodiment.
Figure 10A:
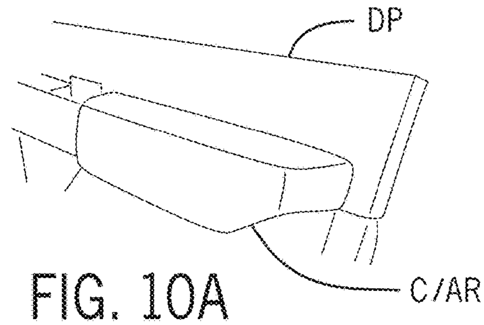
FIGS. 10A to 10B are schematic perspective views of a component for a vehicle interior according to an exemplary embodiment.
Figure 10B:
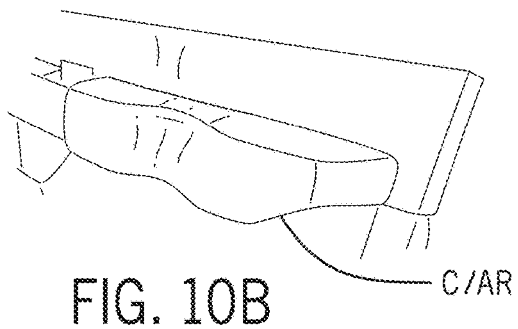
Figure 11A:
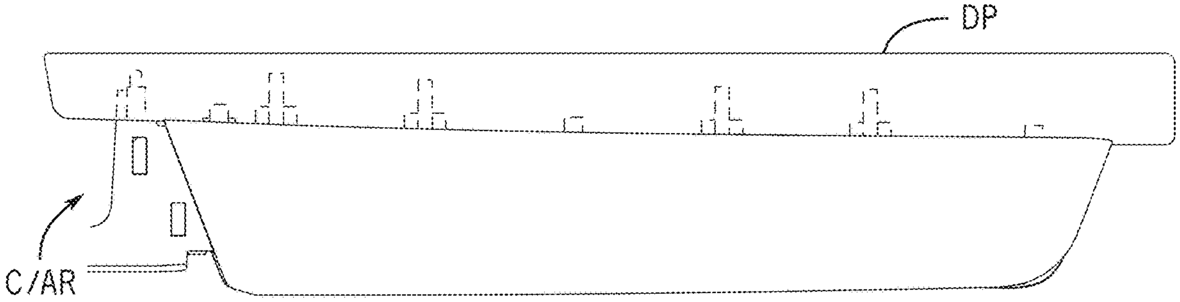
FIG. 11A is a partial top view of a component for a vehicle interior according to an exemplary embodiment.
Figure 11B:
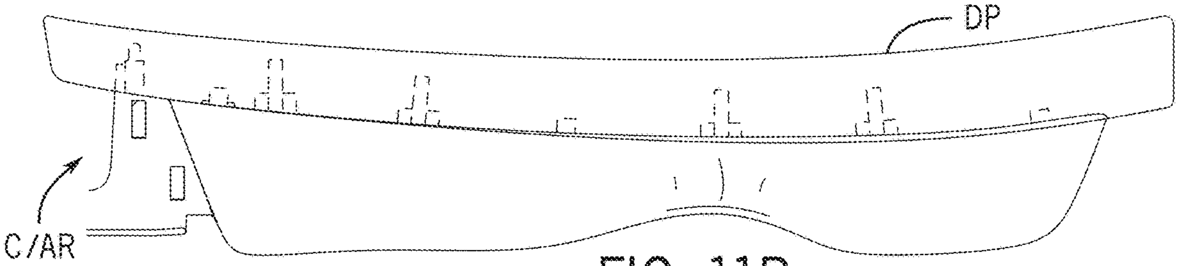
FIG. 11B is a partial top view of a component for a vehicle interior according to an exemplary embodiment.
Figure 12A:
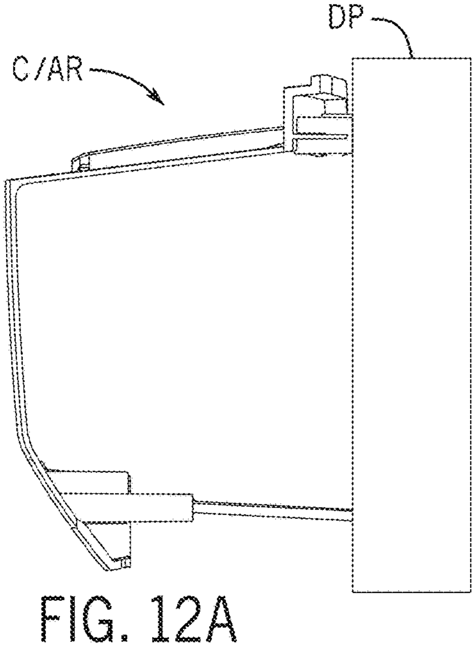
FIG. 12A is a section perspective view of a component for a vehicle interior according to an exemplary embodiment.
Figure 12B:
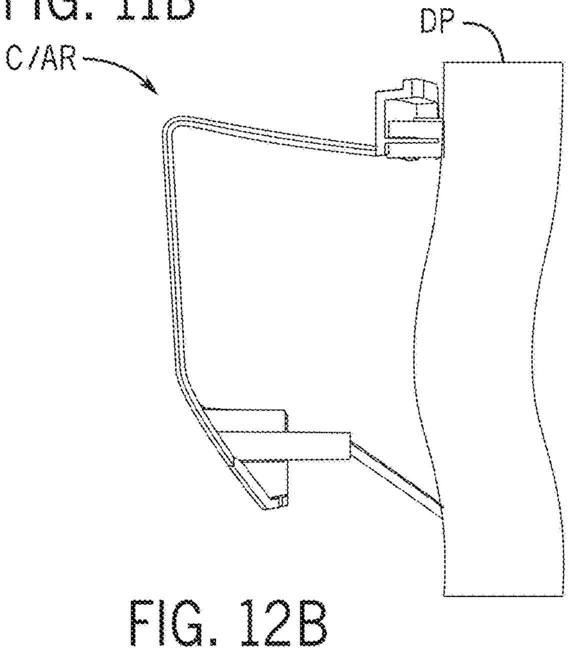
FIG. 12B is a section perspective view of a component for a vehicle interior according to an exemplary embodiment.
Figure 13A:
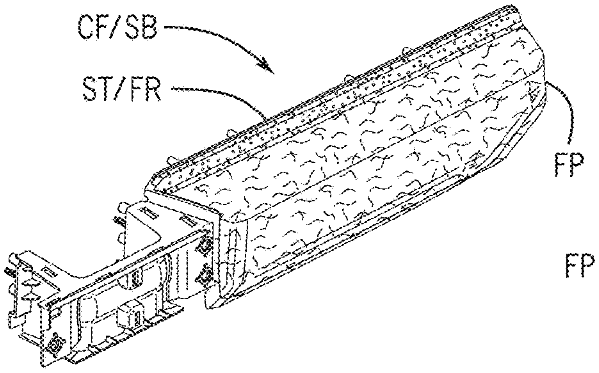
FIG. 13A is a perspective view of a substrate of a component for a vehicle interior according to an exemplary embodiment.
Figure 13B:
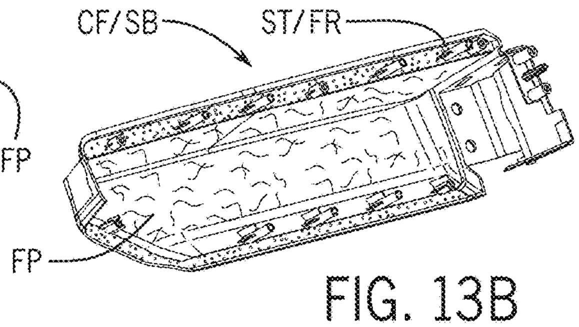
FIG. 13B is a partial perspective view of a substrate of a component for a vehicle interior according to an exemplary embodiment.
Figure 14A:
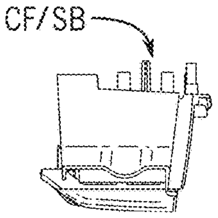
FIG. 14A is an end view of a substrate of a component for a vehicle interior according to an exemplary embodiment.
Figure 14B:
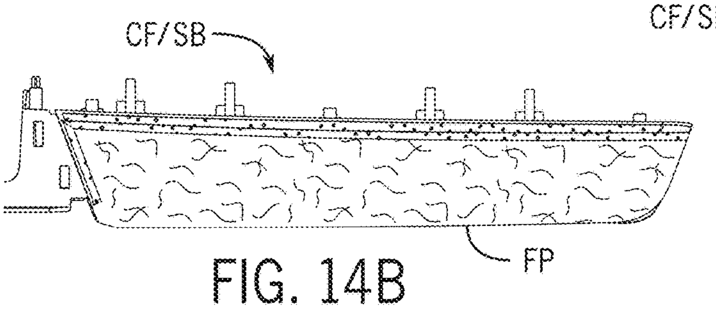
FIG. 14B is a partial top view of a substrate of a component for a vehicle interior according to an exemplary embodiment.
Figure 14C:
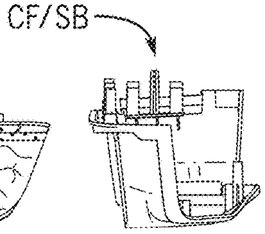
FIG. 14C is an end view of a substrate of a component for a vehicle interior according to an exemplary embodiment.
Figure 15A:
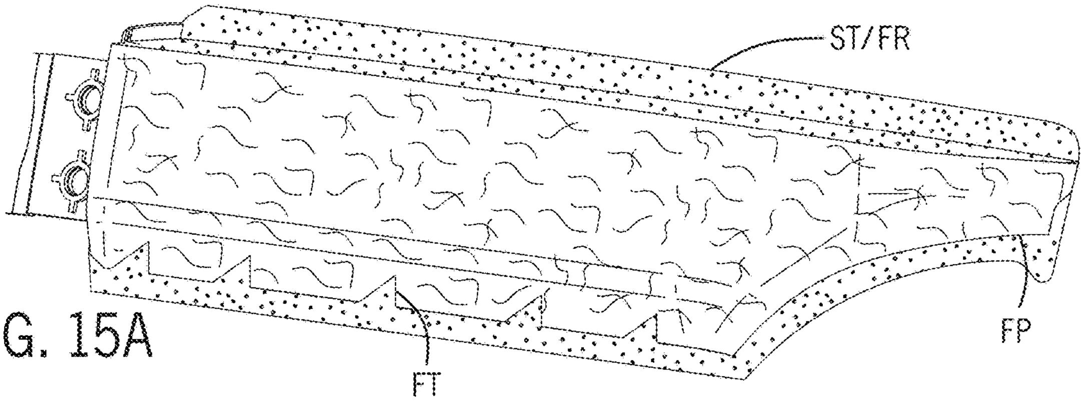
FIG. 15A is a partial perspective view of a substrate of a component for a vehicle interior according to an exemplary embodiment.
Figure 15B:
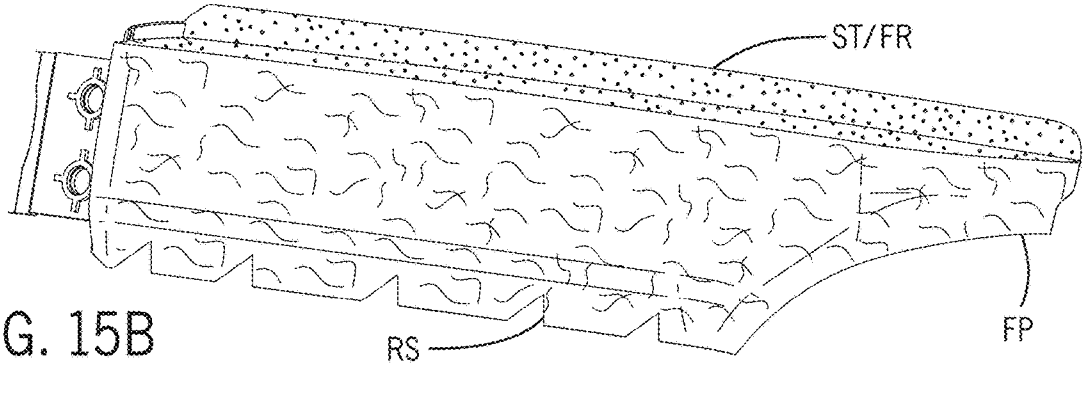
FIG. 15B is a partial perspective view of a substrate of a component for a vehicle interior according to an exemplary embodiment.
Figure 16A:
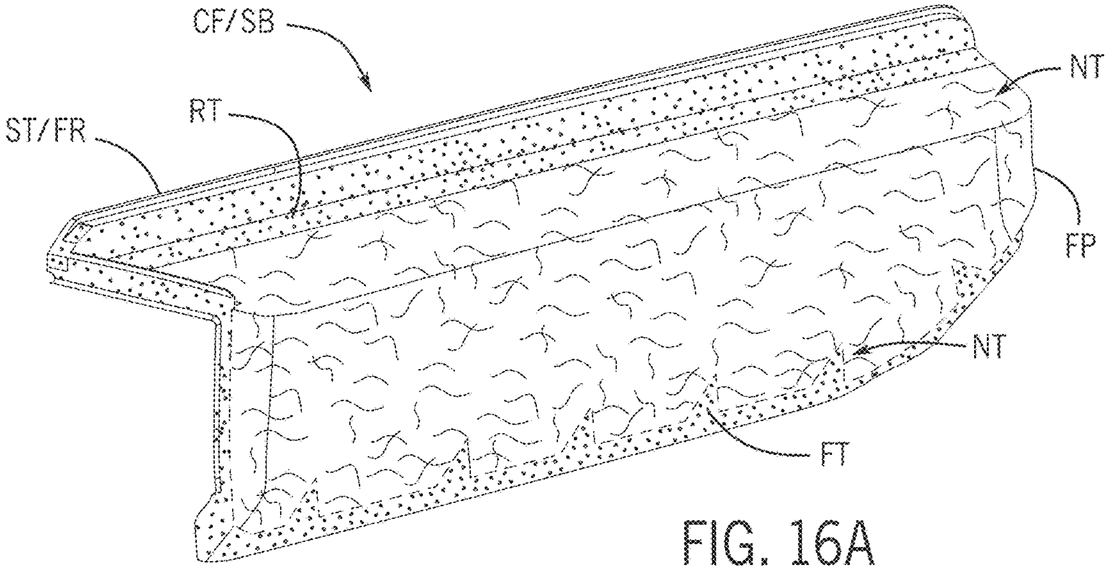
FIG. 16A is a perspective view of a substrate of a component for a vehicle interior according to an exemplary embodiment.
Figure 16B:
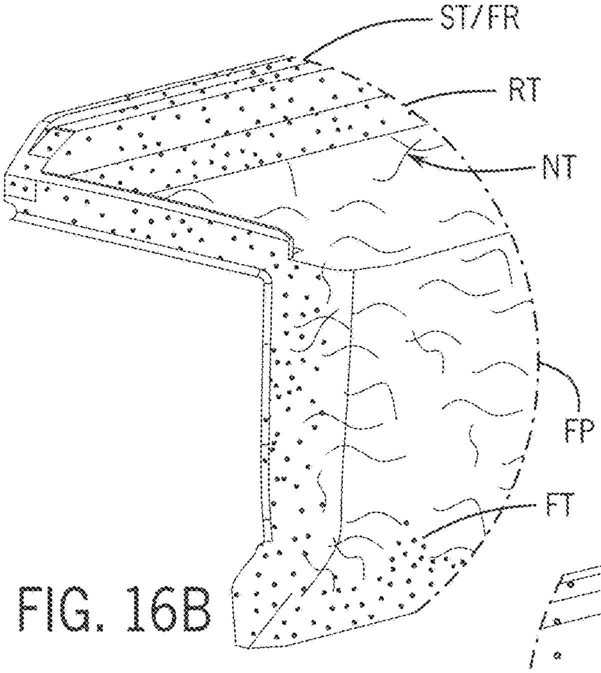
FIG. 16B is a cutaway view of a substrate of a component for a vehicle interior according to an exemplary embodiment.
Figure 16D:
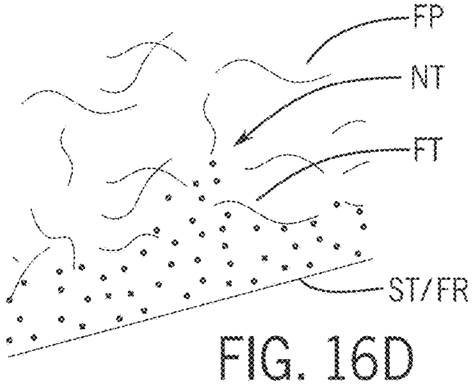
FIG. 16D is a cutaway view of a substrate of a component for a vehicle interior according to an exemplary embodiment.
Figure 16C:
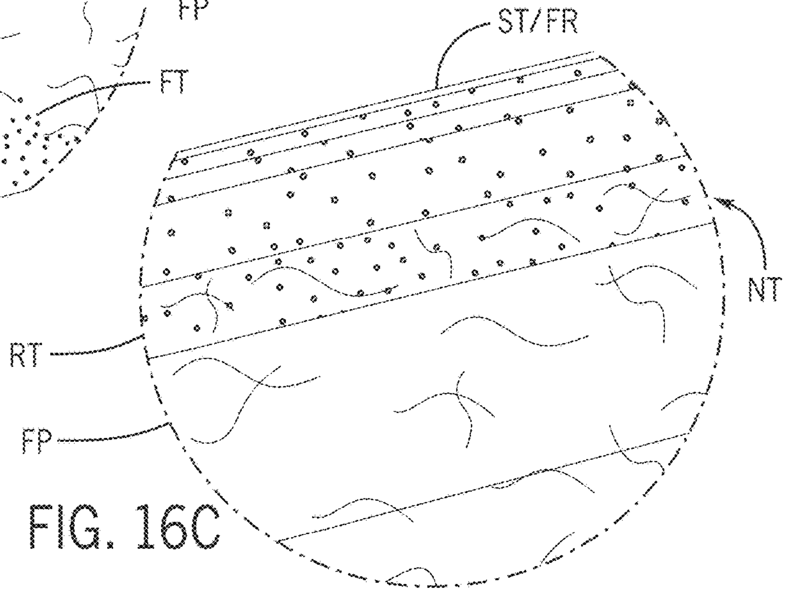
FIG. 16C is a cutaway view of a substrate of a component for a vehicle interior according to an exemplary embodiment.
Figure 17:
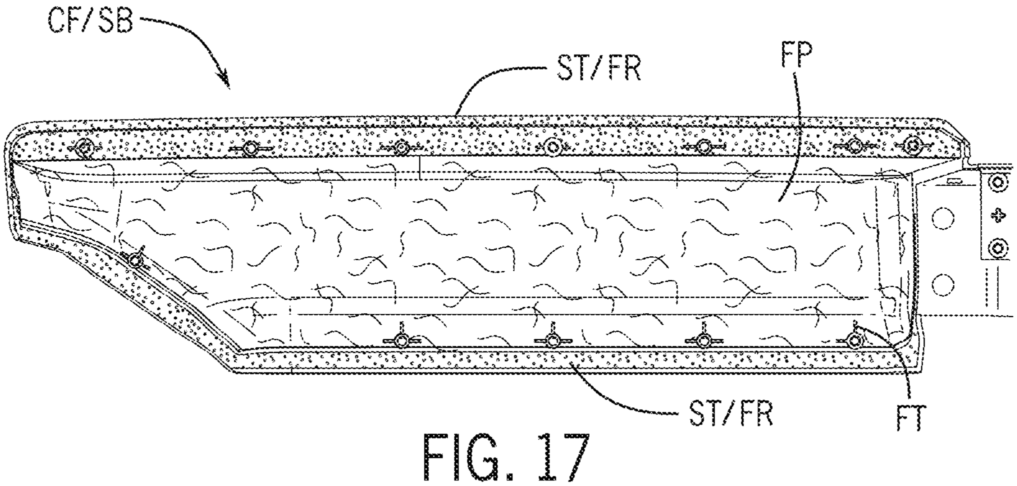
FIG. 17 is a partial perspective view of a substrate of a component for a vehicle interior according to an exemplary embodiment.
Figure 18:
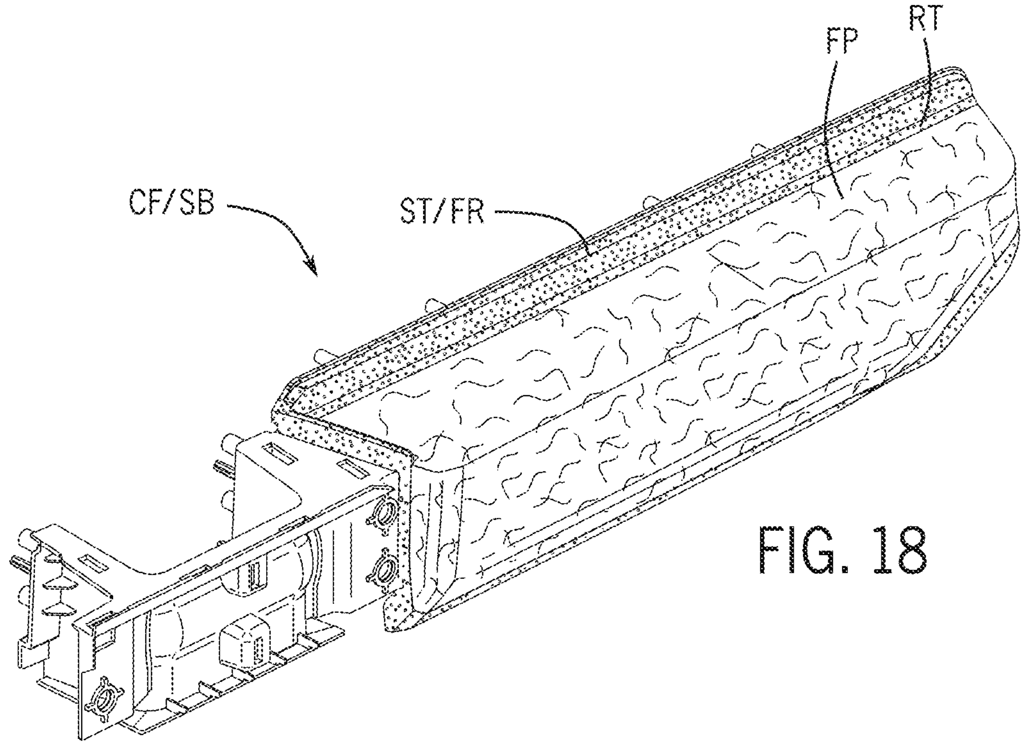
FIG. 18 is a perspective view of a substrate of a component for a vehicle interior according to an exemplary embodiment.
Figure 19A:
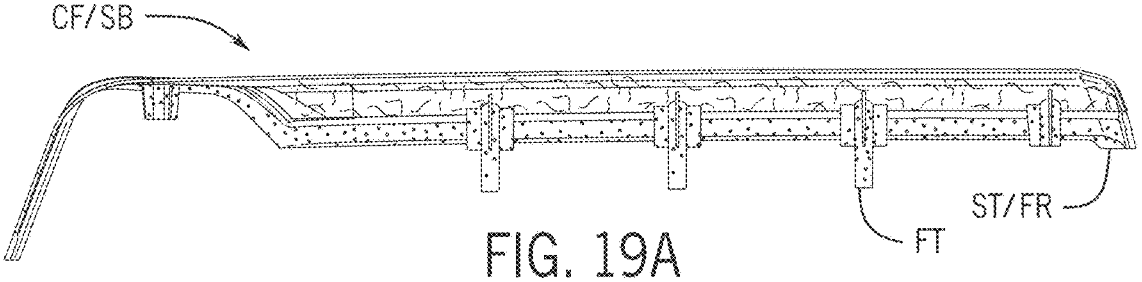
FIG. 19A is a section view of a substrate of a component for a vehicle interior according to an exemplary embodiment.
Figure 19B:
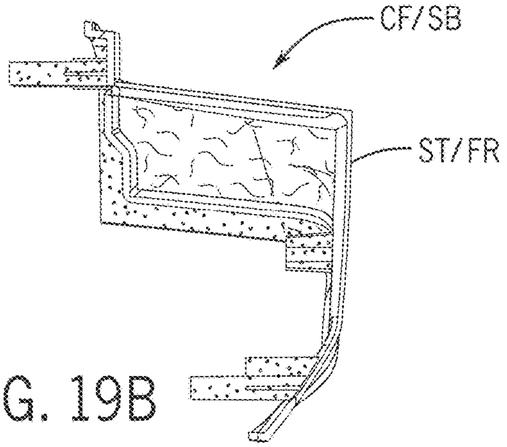
FIG. 19B is a section view of a substrate of a component for a vehicle interior according to an exemplary embodiment.
Figure 19C:
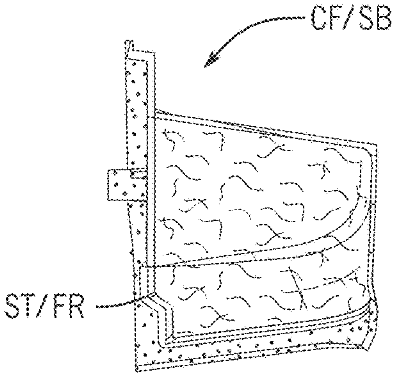
FIG. 19C is a section view of a substrate of a component for a vehicle interior according to an exemplary embodiment.
Figure 19D:
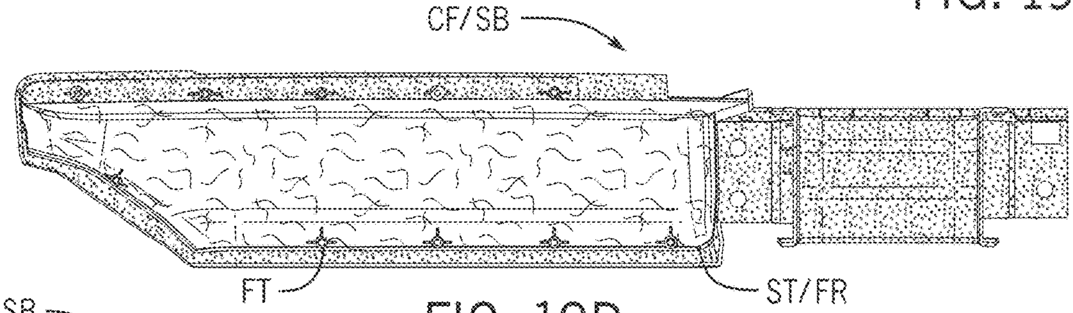
FIG. 19D is a perspective view of a substrate of a component for a vehicle interior according to an exemplary embodiment.
Figure 19E:
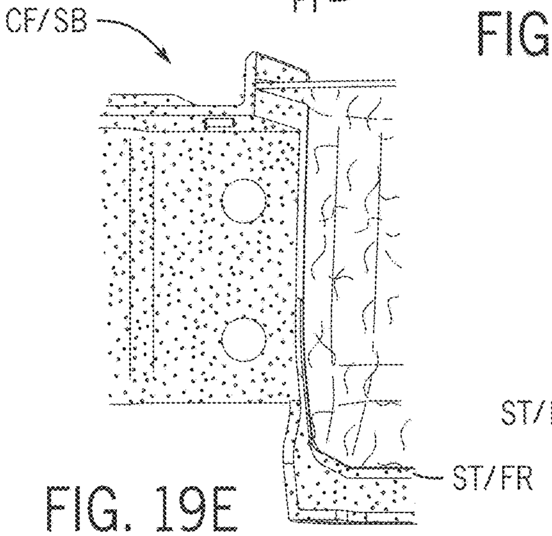
FIG. 19E is a cutaway view of a substrate of a component for a vehicle interior according to an exemplary embodiment.
Figure 19F:
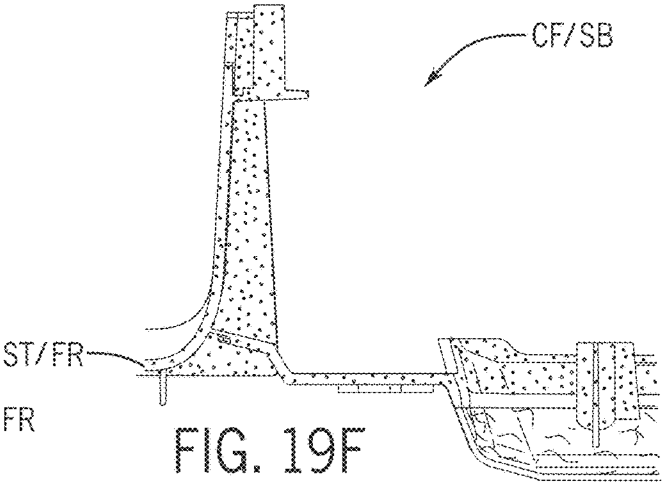
FIG. 19F is a cutaway view of a substrate of a component for a vehicle interior according to an exemplary embodiment.
Figure 20A:
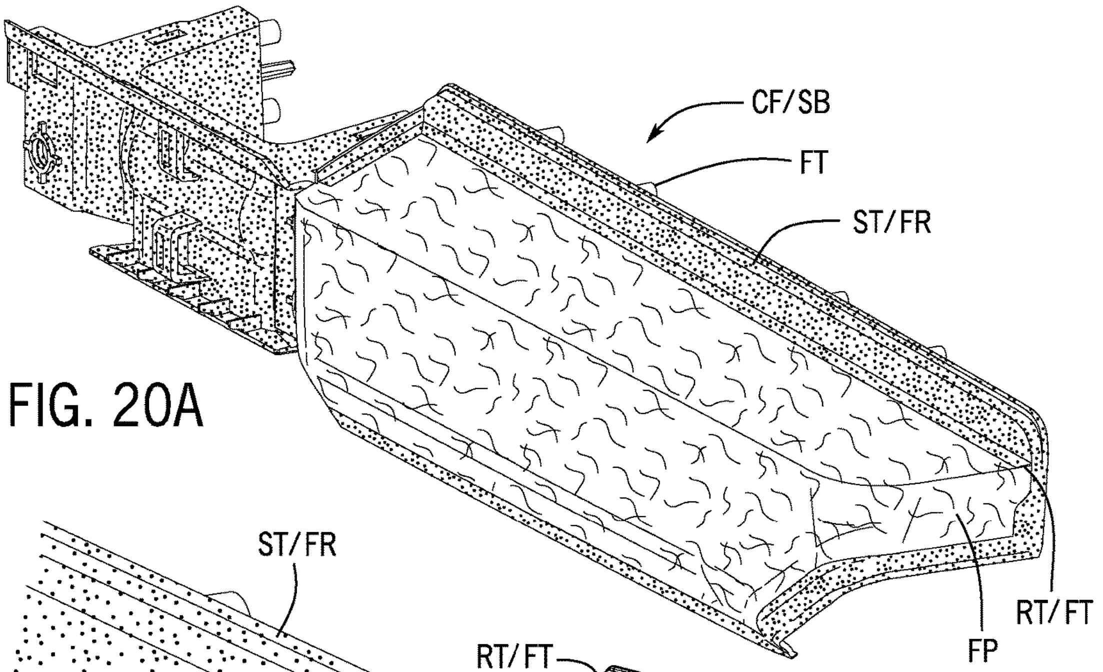
FIG. 20A is a perspective view of a substrate of a component for a vehicle interior according to an exemplary embodiment.
Figure 20B:
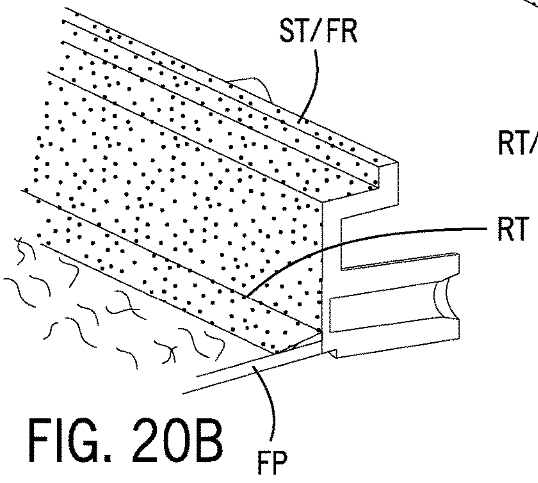
FIG. 20B is a cutaway view of a substrate of a component for a vehicle interior according to an exemplary embodiment.
Figure 20C:
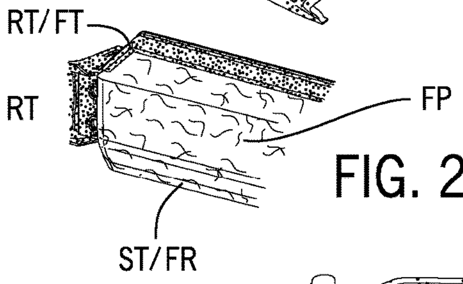
FIG. 20C is a cutaway view of a substrate of a component for a vehicle interior according to an exemplary embodiment.
Figure 20D:
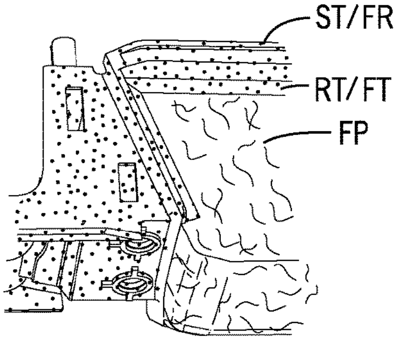
FIG. 20D is a cutaway view of a substrate of a component for a vehicle interior according to an exemplary embodiment.
Figure 20E:
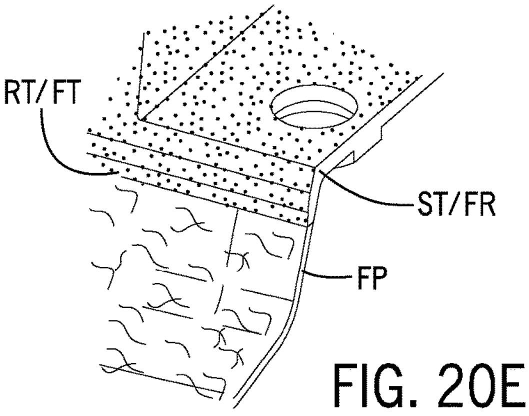
FIG. 20E is a cutaway view of a substrate of a component for a vehicle interior according to an exemplary embodiment.
Figure 20F:
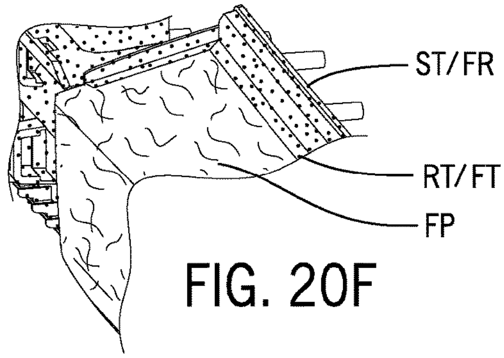
FIG. 20F is a cutaway view of a substrate of a component for a vehicle interior according to an exemplary embodiment.
Figure 21A:
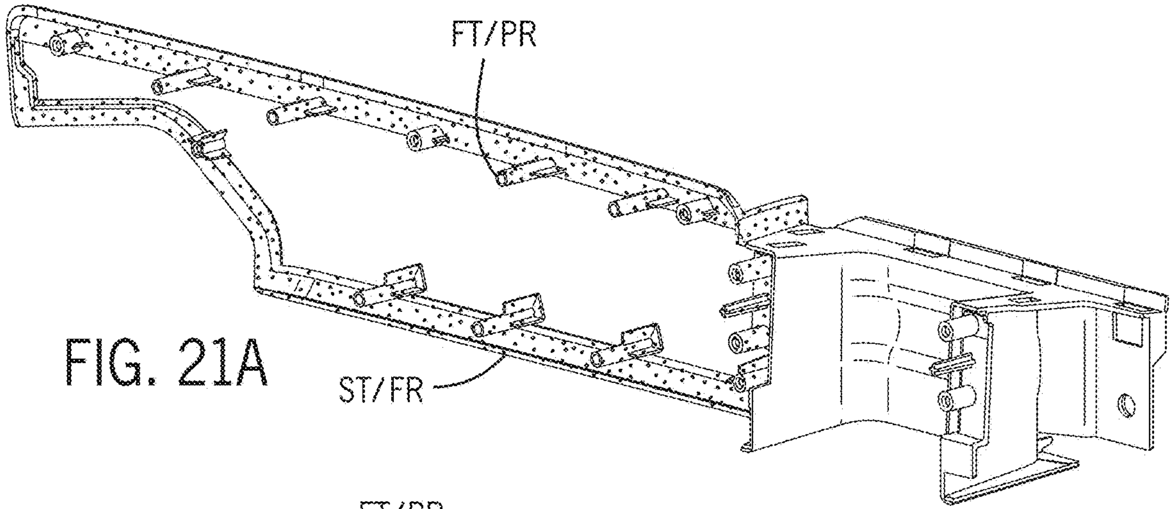
FIG. 21A is a perspective view of a structure of a component for a vehicle interior according to an exemplary embodiment.
Figure 21B:
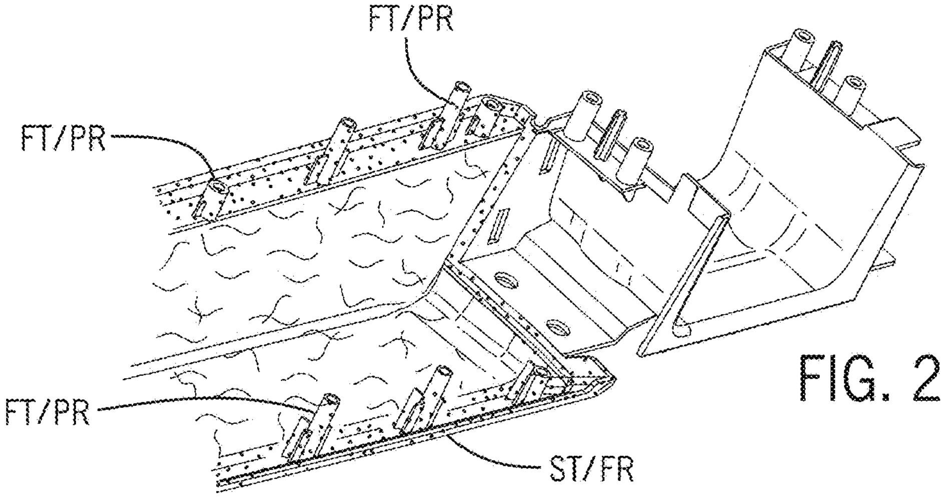
FIG. 21B is a partial perspective view of a structure of a component for a vehicle interior according to an exemplary embodiment.
Figure 22B:
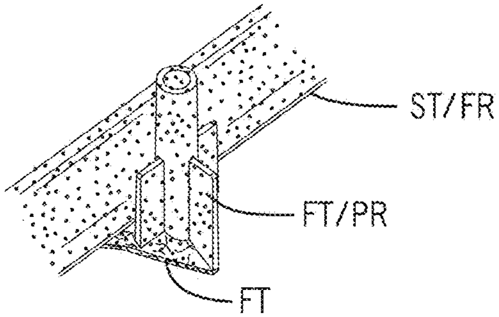
FIG. 22B is a cutaway view of a structure of a component for a vehicle interior according to an exemplary embodiment.
Figure 22C:
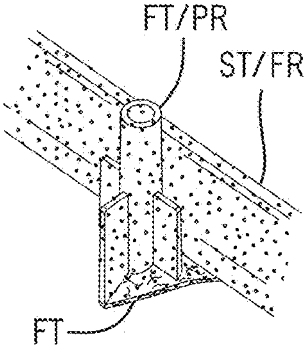
FIG. 22C is a cutaway view of a structure of a component for a vehicle interior according to an exemplary embodiment.
Figure 22A:
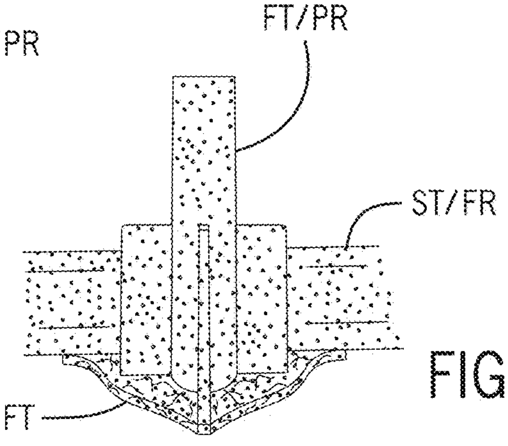
FIG. 22A is a cutaway view of a structure of a component for a vehicle interior according to an exemplary embodiment.
Figure 23:
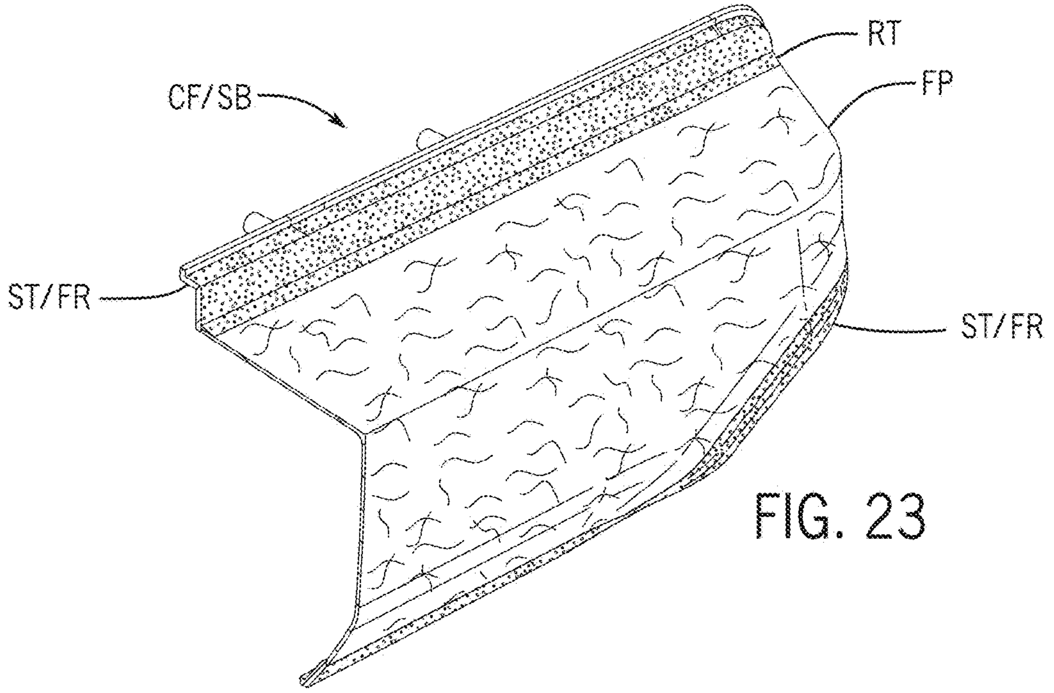
FIG. 23 is a partial perspective view of a substrate of a component for a vehicle interior according to an exemplary embodiment.
Figure 23A:
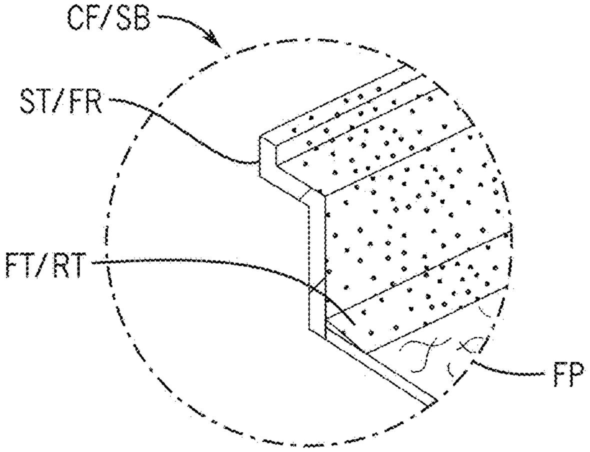
FIG. 23A is a cutaway view of a substrate of a component for a vehicle interior according to an exemplary embodiment.
Figure 23B:
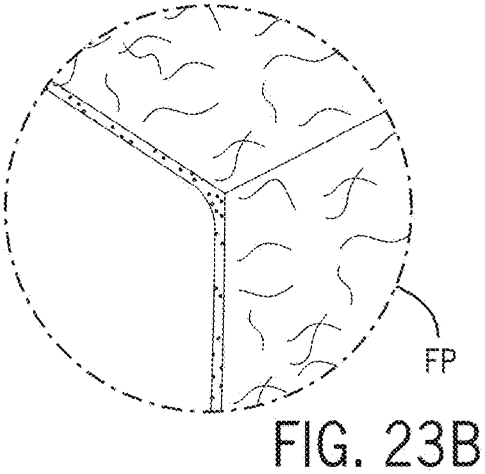
FIG. 23B is a cutaway view of a substrate of a component for a vehicle interior according to an exemplary embodiment.
Figure 23C:
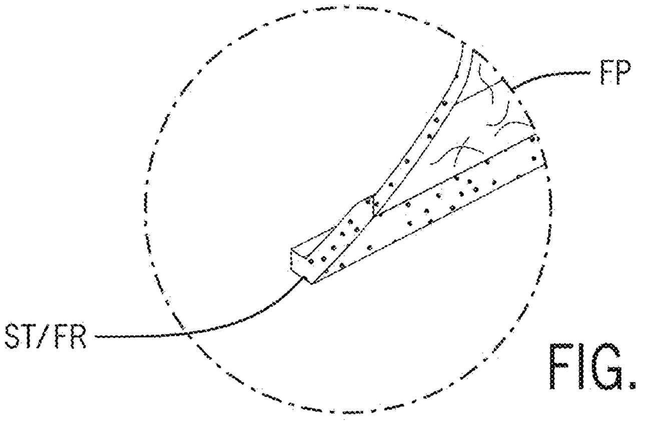
FIG. 23C is a cutaway view of a substrate of a component for a vehicle interior according to an exemplary embodiment.
Figure 24A:
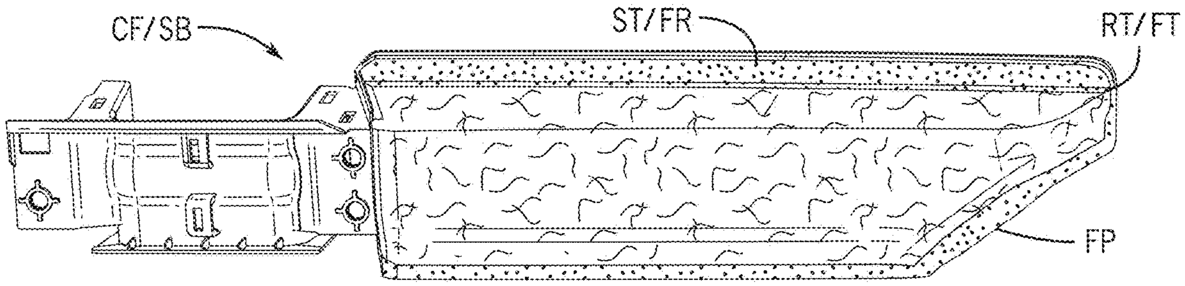
FIG. 24A is a perspective view of a substrate of a component for a vehicle interior according to an exemplary embodiment.
Figure 24B:
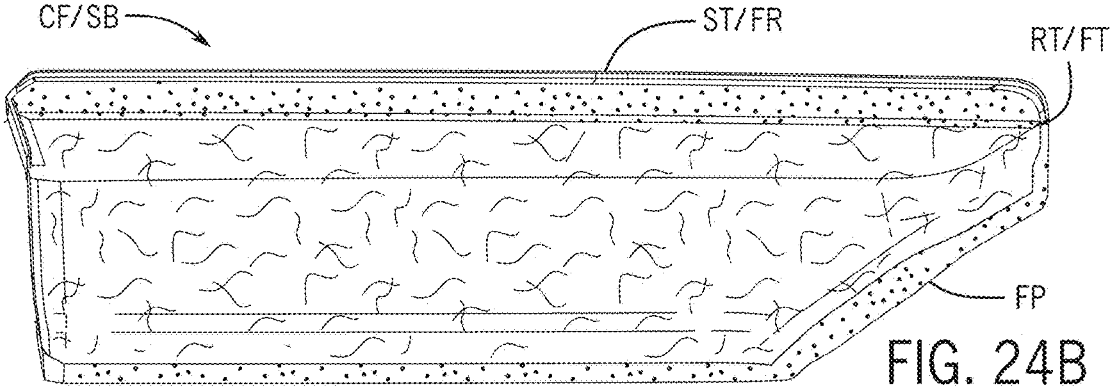
FIG. 24B is a partial perspective view of a substrate of a component for a vehicle interior according to an exemplary embodiment.
Figure 25A:
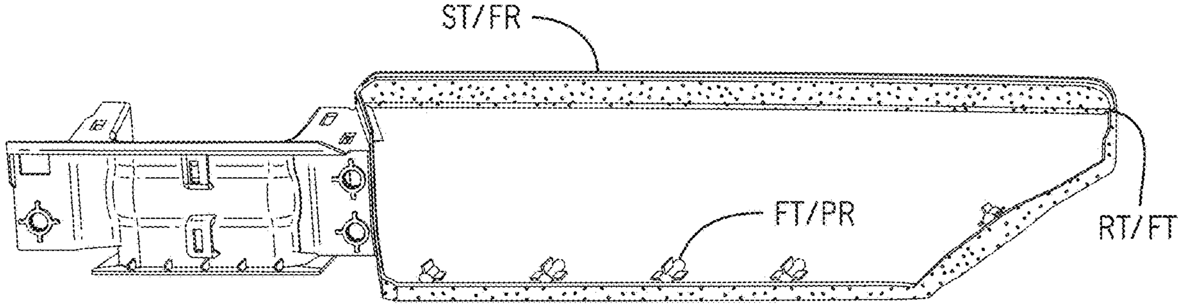
FIG. 25A is a perspective view of a structure of a component for a vehicle interior according to an exemplary embodiment.
Figure 25B:
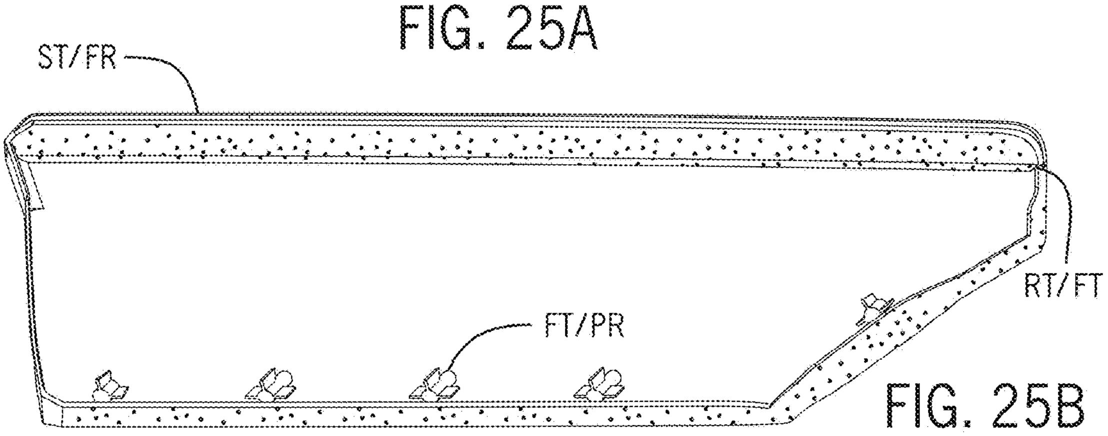
FIG. 25B is a partial perspective view of a structure of a component for a vehicle interior according to an exemplary embodiment.
Figure 26A:
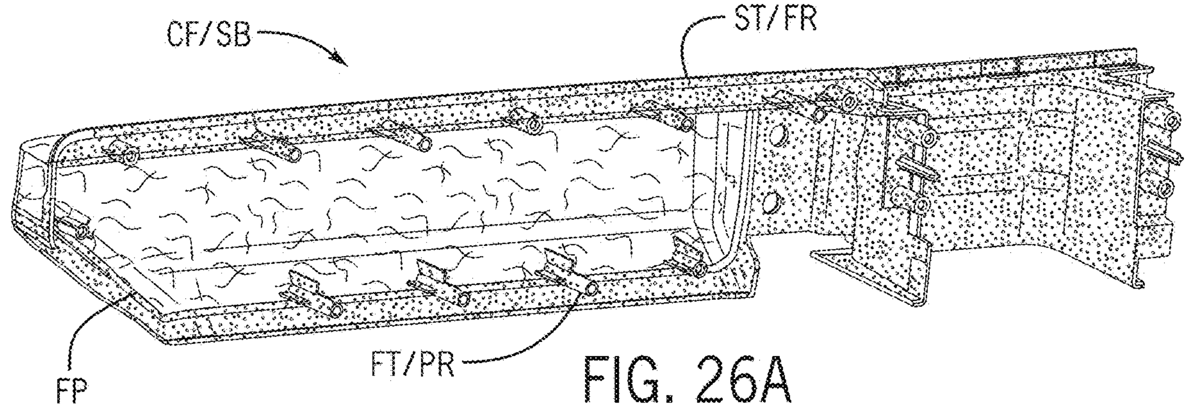
FIG. 26A is a perspective view of a substrate of a component for a vehicle interior according to an exemplary embodiment.
Figure 26B:
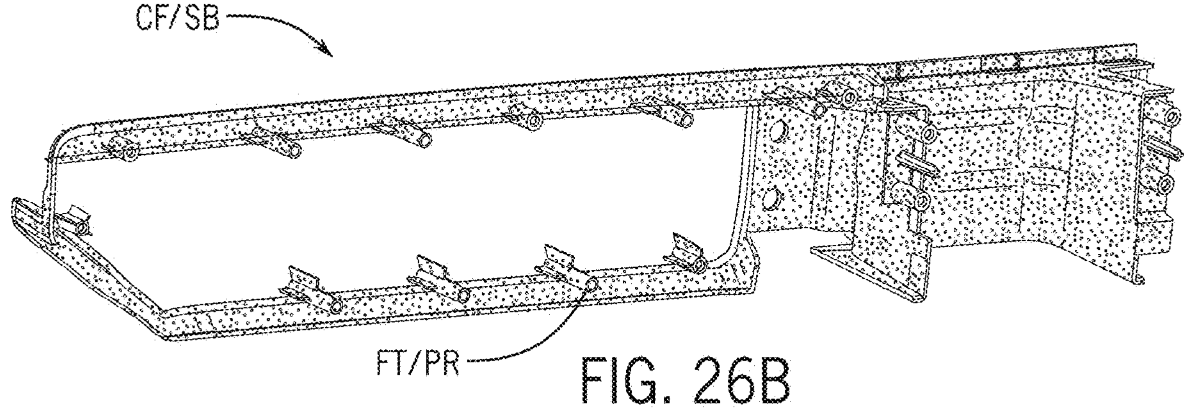
FIG. 26B is a perspective view of a structure of a component for a vehicle interior according to an exemplary embodiment.
Figure 26C:
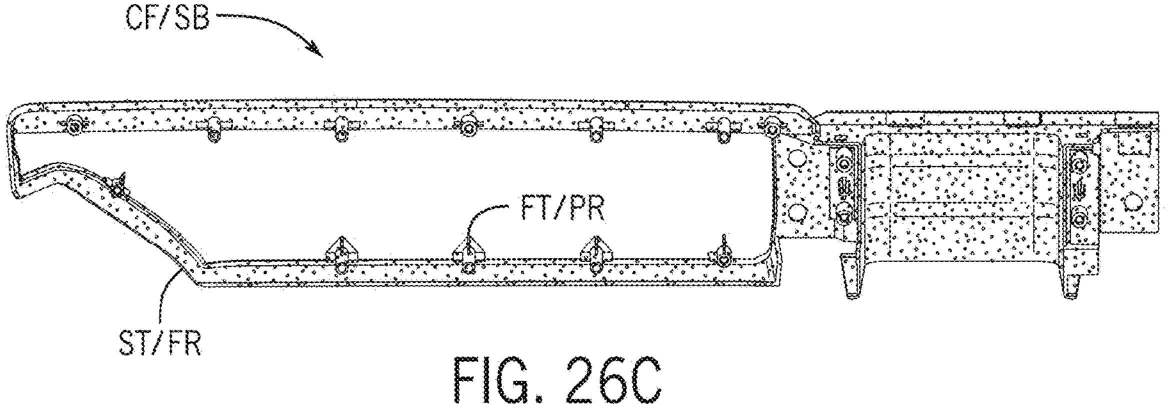
FIG. 26C is a perspective view of a structure of a component for a vehicle interior according to an exemplary embodiment.
Figure 27A:
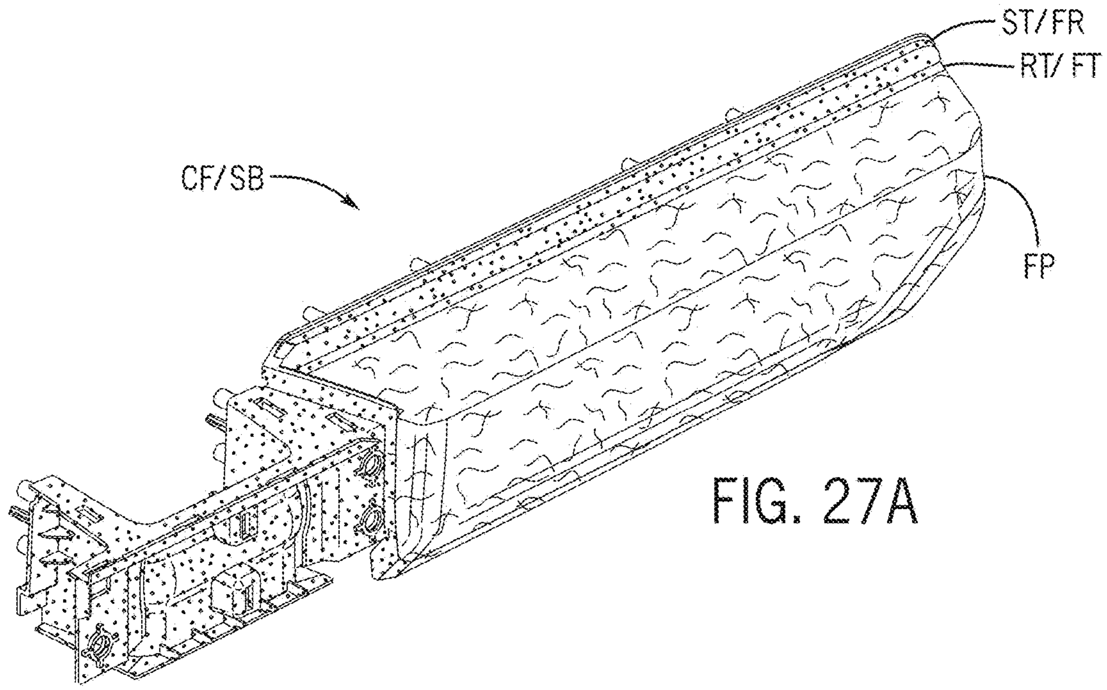
FIG. 27A is a perspective view of a substrate of a component for a vehicle interior according to an exemplary embodiment.
Figure 27B:
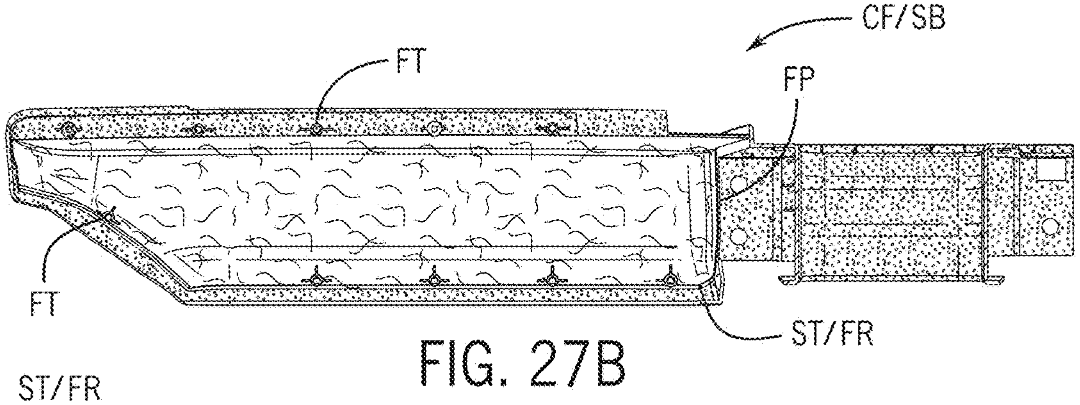
FIG. 27B is a perspective view of a substrate of a component for a vehicle interior according to an exemplary embodiment.
Figure 27C:
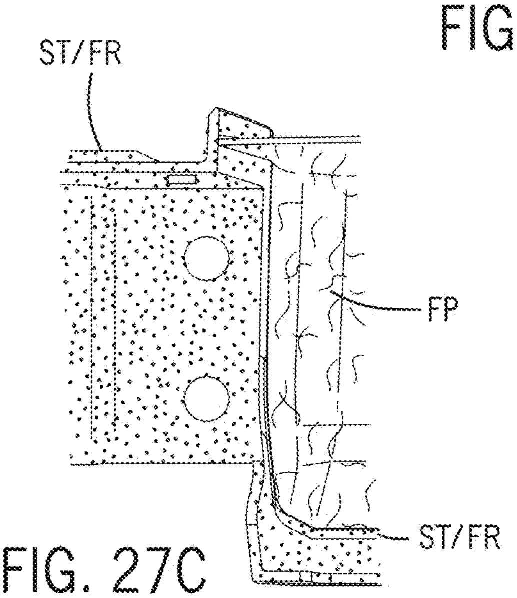
FIG. 27C is a cutaway view of a substrate of a component for a vehicle interior according to an exemplary embodiment.
Figure 27D:
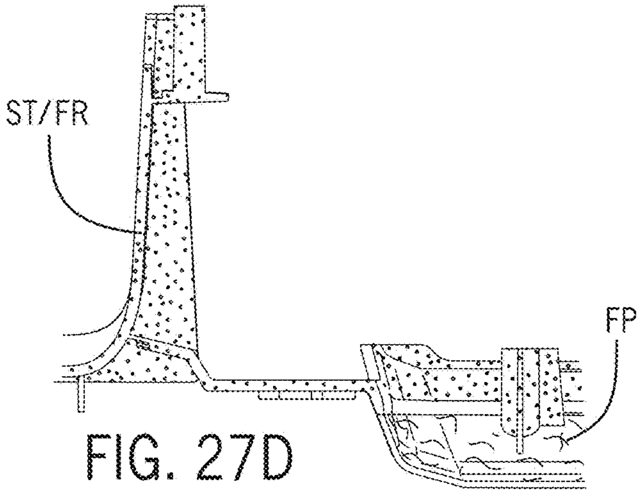
FIG. 27D is a cutaway view of a substrate of a component for a vehicle interior according to an exemplary embodiment.
Figure 28A:
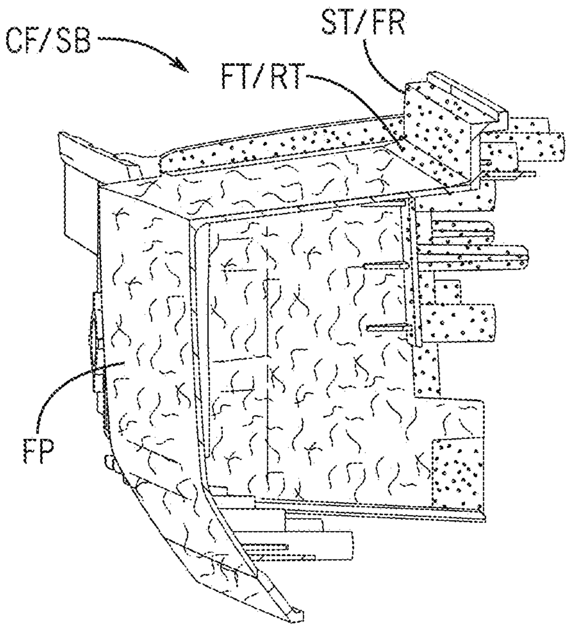
FIG. 28A is a section perspective view of a substrate of a component for a vehicle interior according to an exemplary embodiment.
Figure 28B:
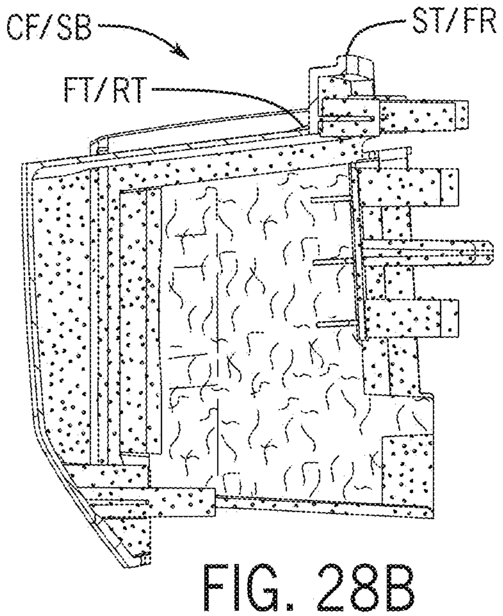
FIG. 28B is a section perspective view of a substrate of a component for a vehicle interior according to an exemplary embodiment.
Figure 28C:
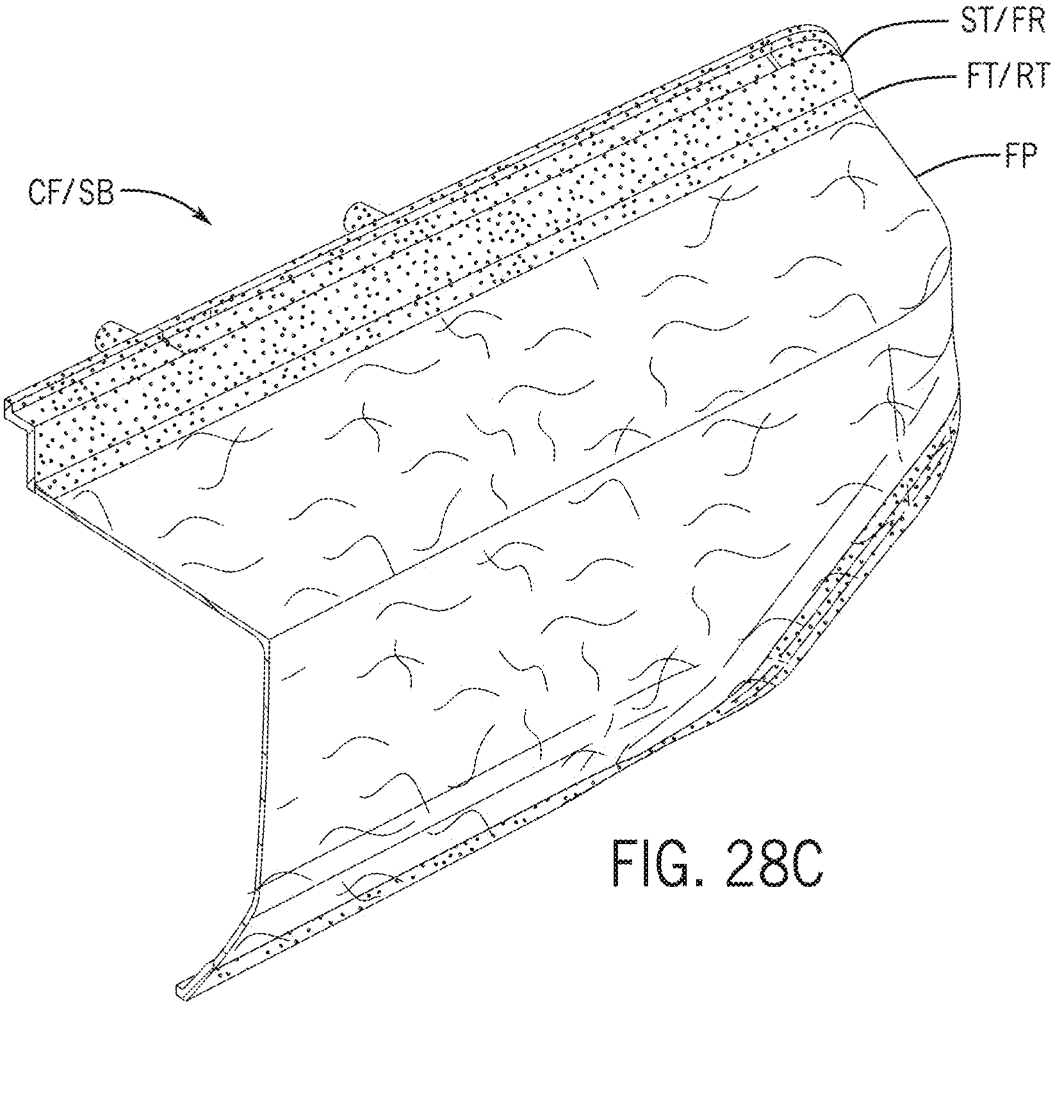
FIG. 28C is a partial perspective view of a substrate of a component for a vehicle interior according to an exemplary embodiment.
Figure 29A:
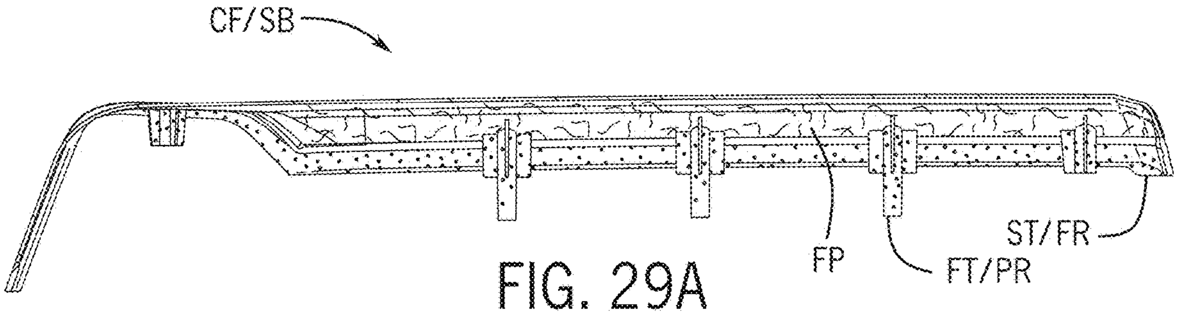
FIG. 29A is a section view of a substrate of a component for a vehicle interior according to an exemplary embodiment.
Figure 29B:
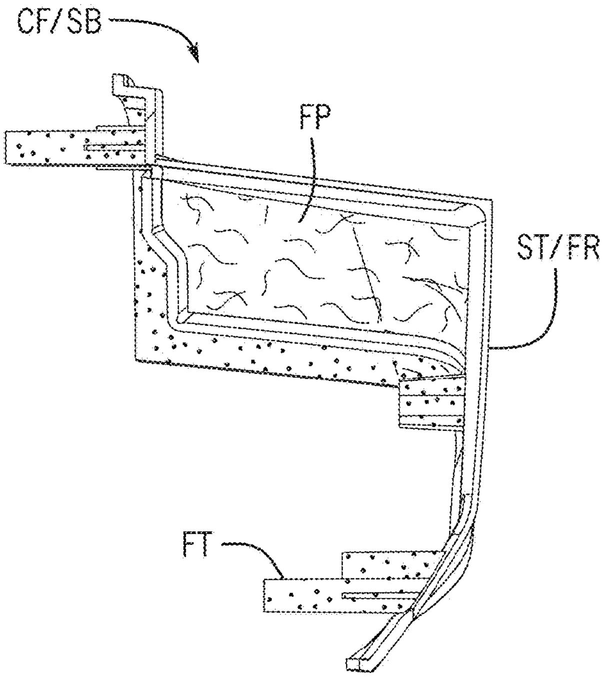
FIG. 29B is a section perspective view of a substrate of a component for a vehicle interior according to an exemplary embodiment.
Figure 29C:
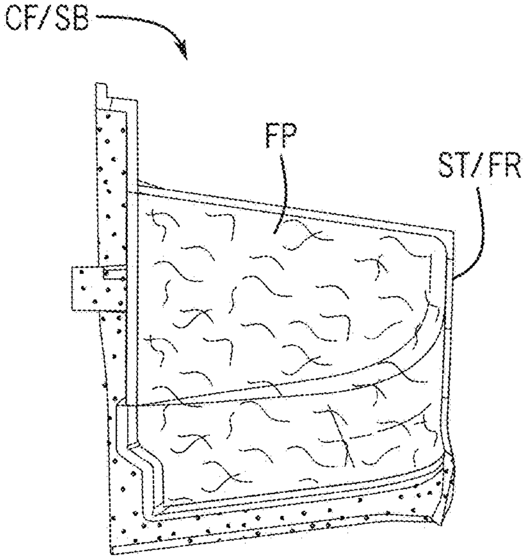
FIG. 29C is a section perspective view of a substrate of a component for a vehicle interior according to an exemplary embodiment.
Figure 30A:
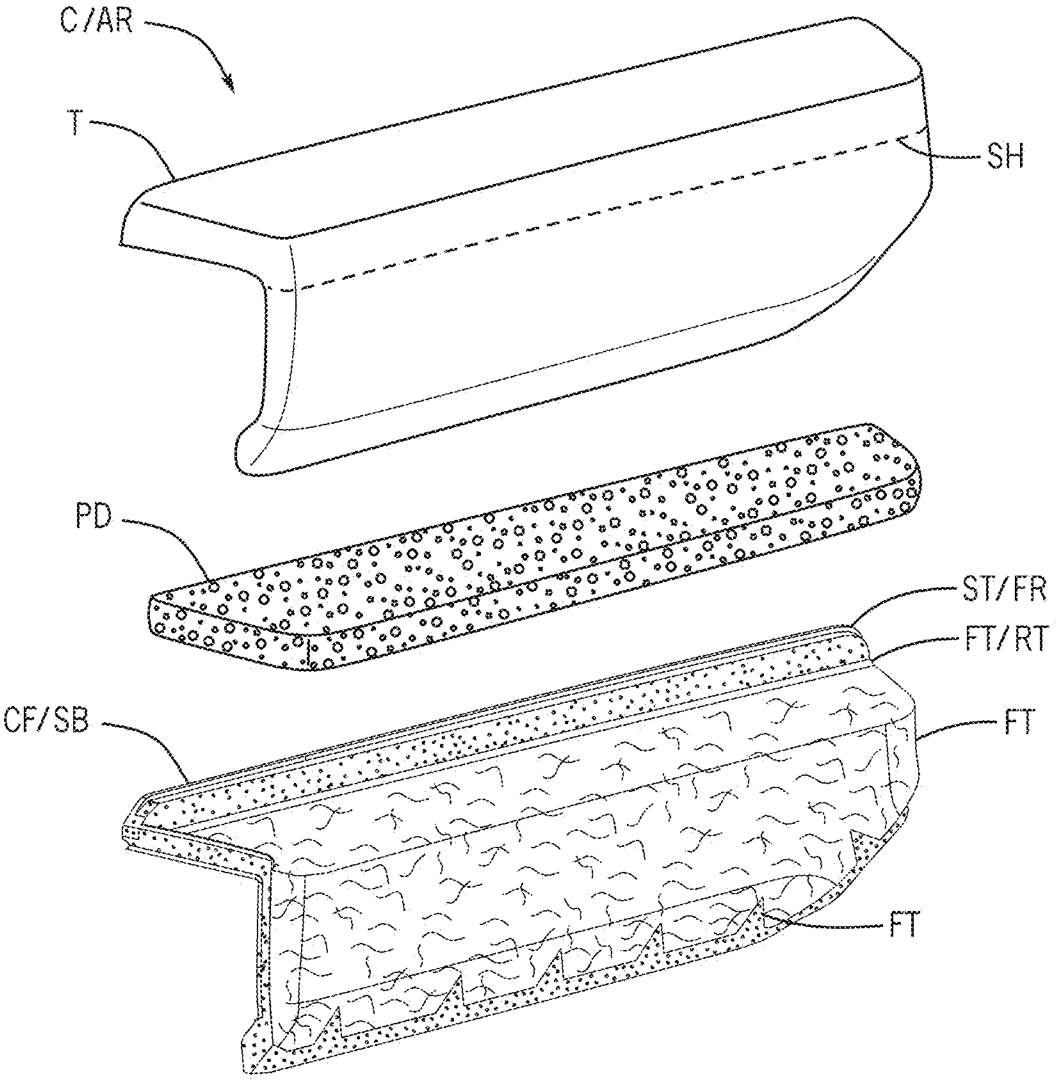
FIG. 30A is a schematic exploded perspective view of a component for a vehicle interior shown as an armrest according to an exemplary embodiment.
Figure 30B:
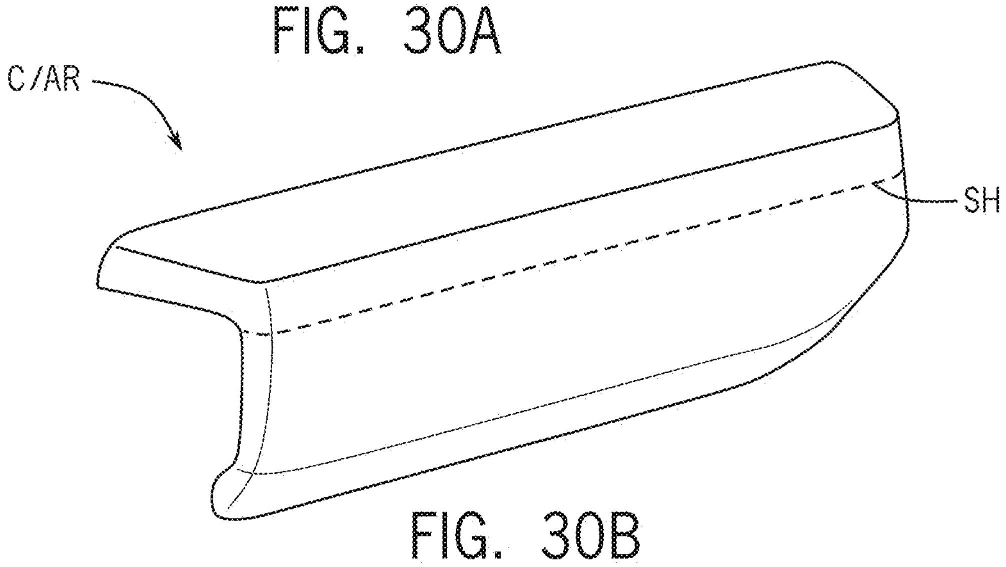
FIG. 30B is a schematic perspective view of a component for a vehicle interior shown as an armrest according to an exemplary embodiment.
Figure 31A:
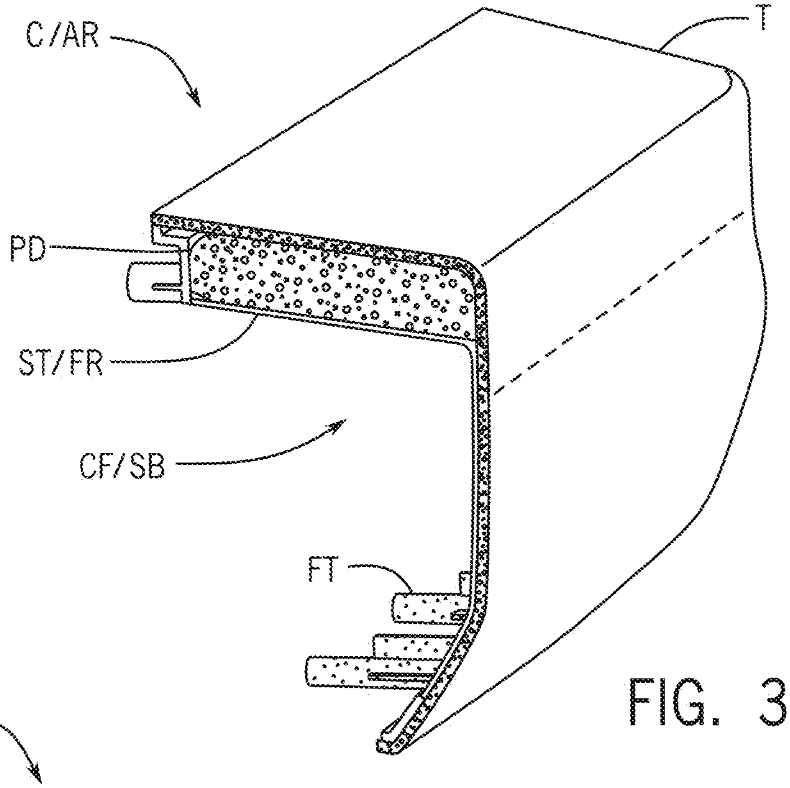
FIG. 31A is a schematic section perspective view of a component for a vehicle interior shown as an armrest according to an exemplary embodiment.
Figure 31B:
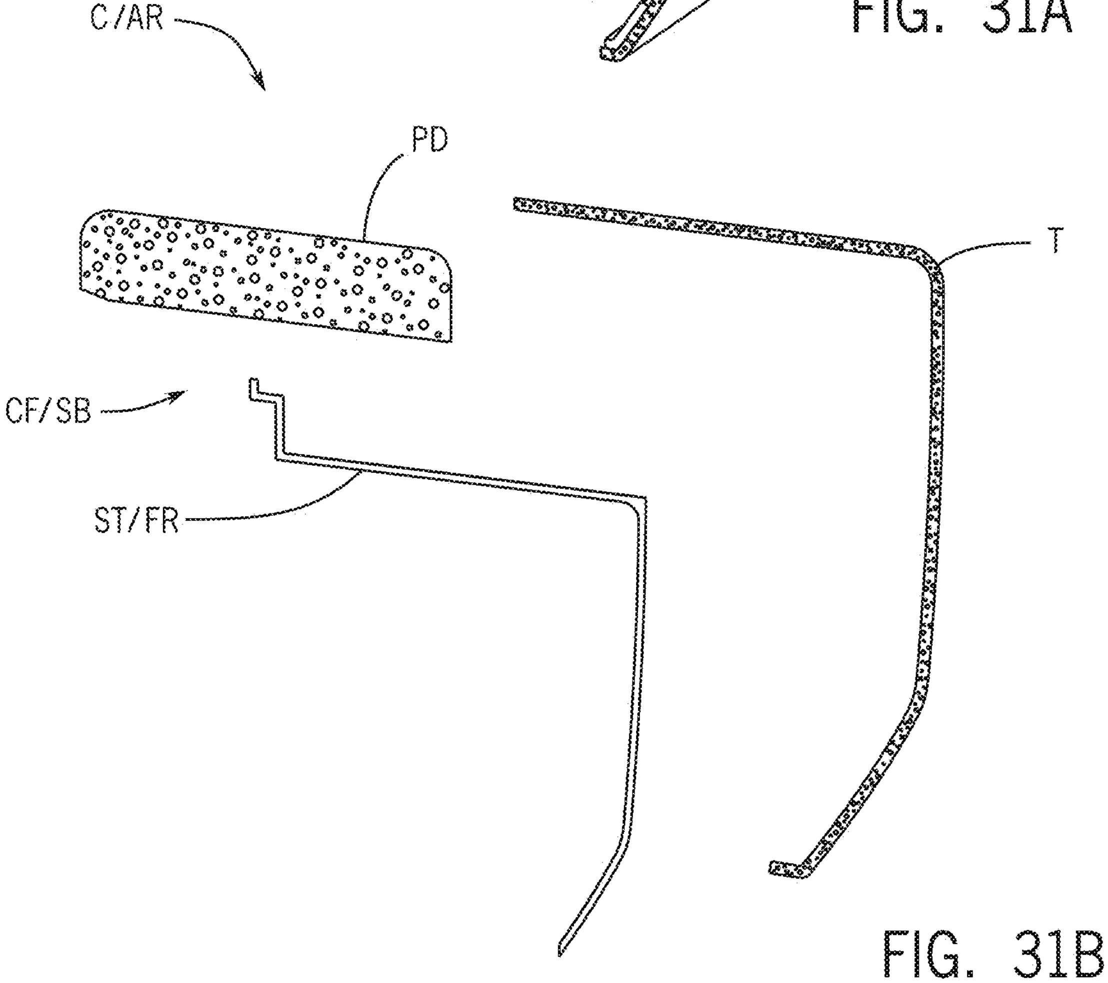
FIG. 31B is a schematic section view of a component for a vehicle interior shown as an armrest according to an exemplary embodiment.
Figure 32A:
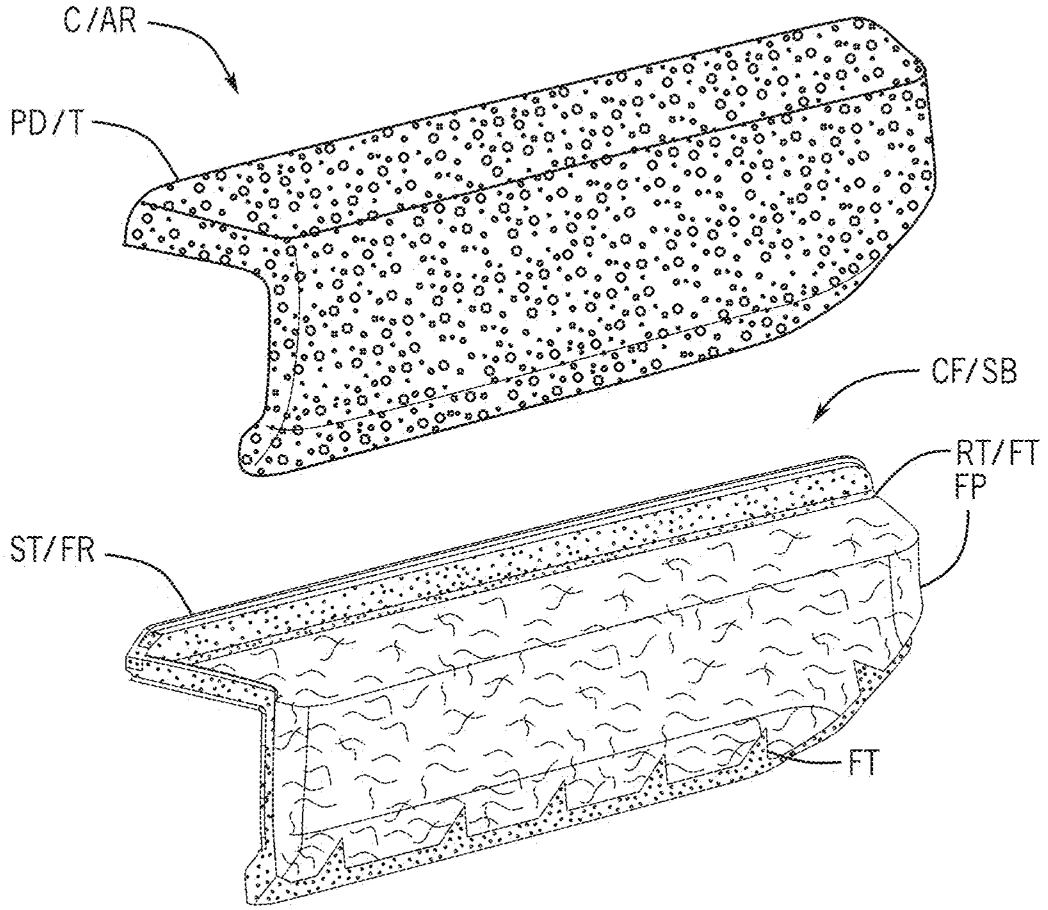
FIG. 32A is a schematic exploded perspective view of a component for a vehicle interior shown as an armrest according to an exemplary embodiment.
Figure 32B:
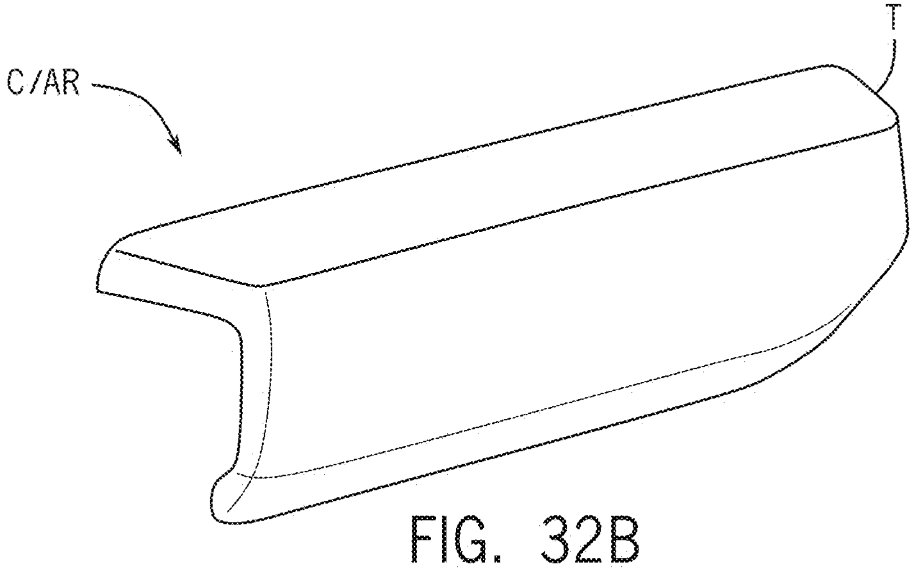
FIG. 32B is a schematic perspective view of a component for a vehicle interior shown as an armrest according to an exemplary embodiment.
Figure 33A:
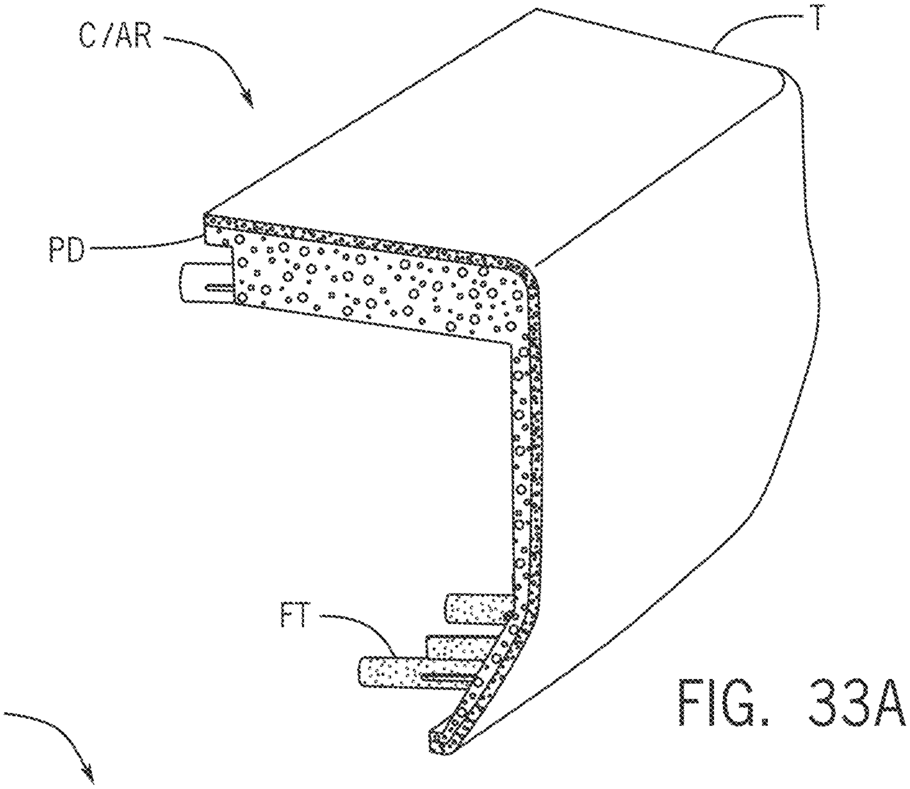
FIG. 33A is a schematic section perspective view of a component for a vehicle interior shown as an armrest according to an exemplary embodiment.
Figure 33B:
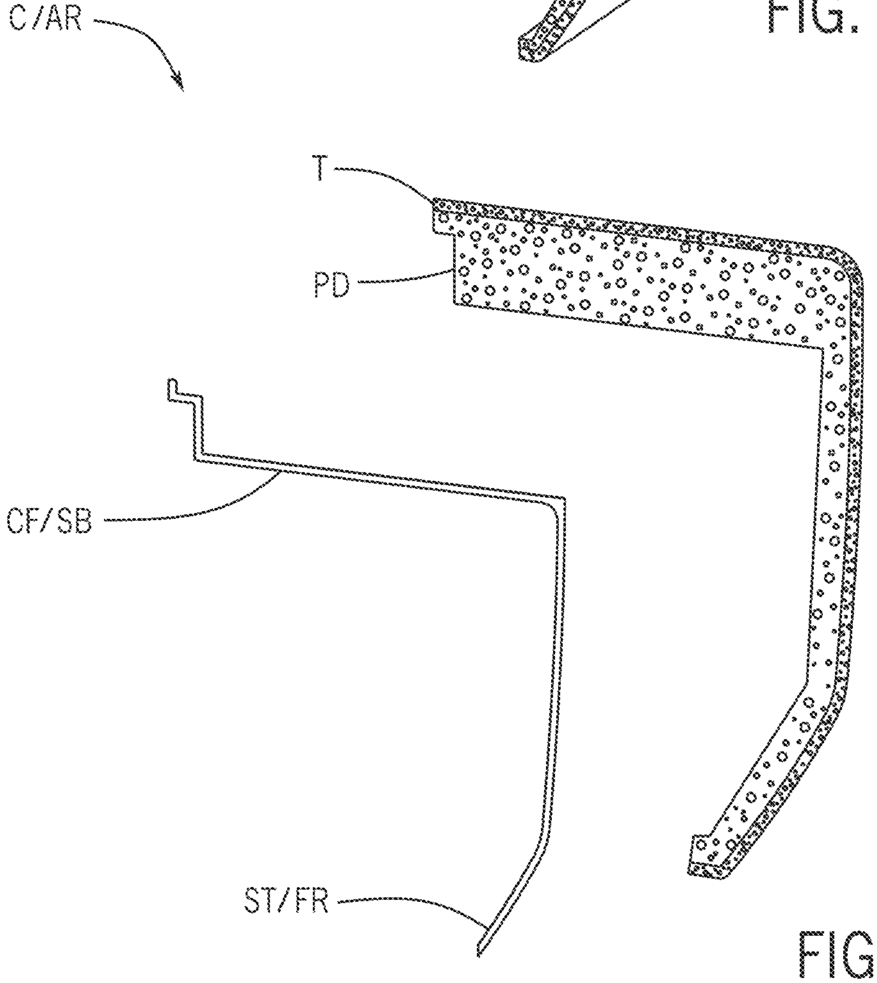
FIG. 33B is a schematic exploded section perspective view of a component for a vehicle interior shown as an armrest according to an exemplary embodiment.
Figure 34:
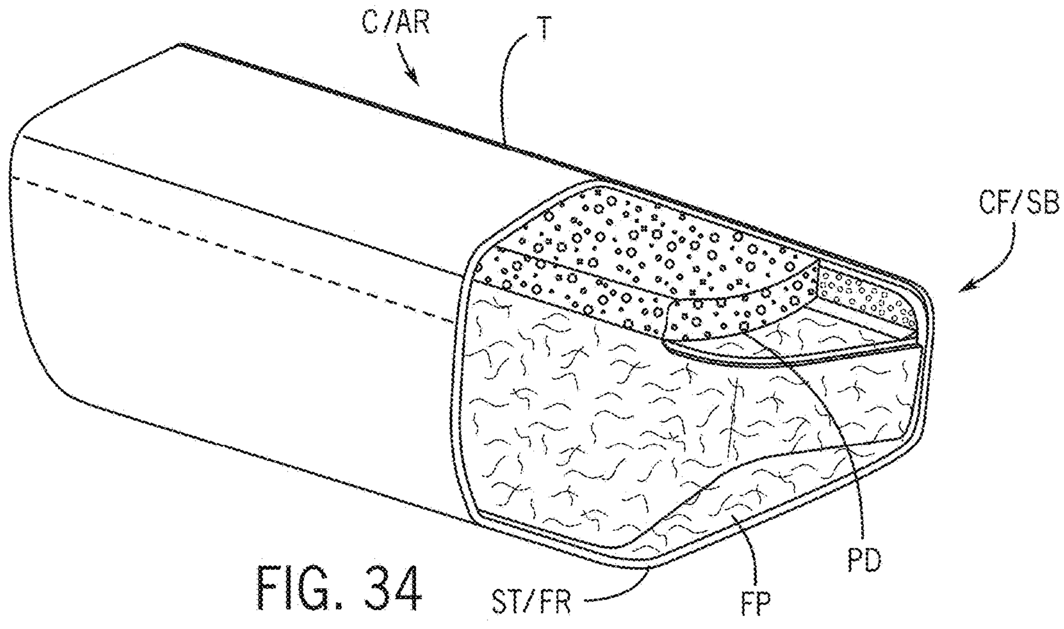
FIG. 34 is a schematic cutaway perspective view of a component for a vehicle interior shown as an armrest according to an exemplary embodiment.
Figure 35:
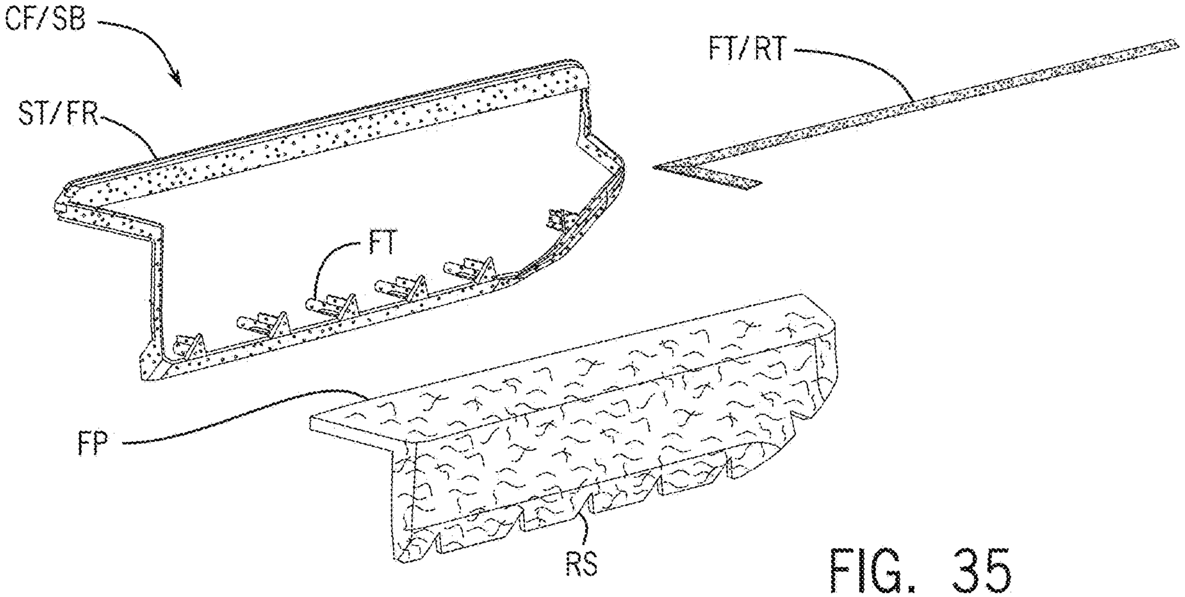
FIG. 35 is a schematic exploded perspective view of a component for a vehicle interior shown as an armrest according to an exemplary embodiment.
Figure 36A:
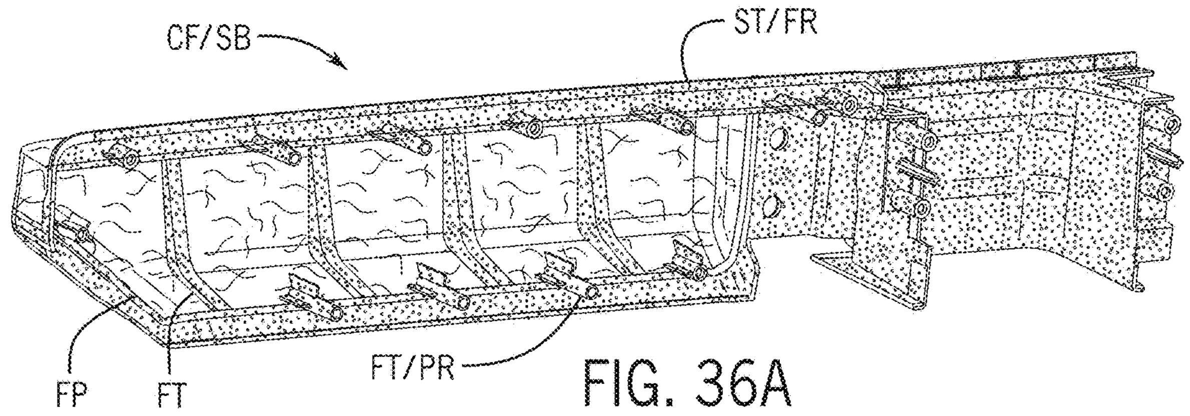
FIG. 36A is a perspective view of a substrate of a component for a vehicle interior according to an exemplary embodiment.
Figure 36B:
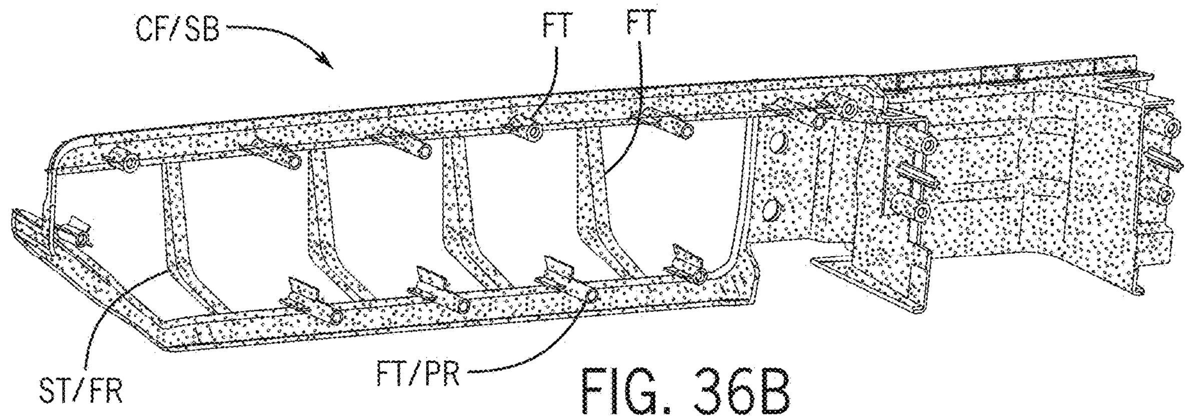
FIG. 36B is a perspective view of a structure of a component for a vehicle interior according to an exemplary embodiment.
Figure 36C:
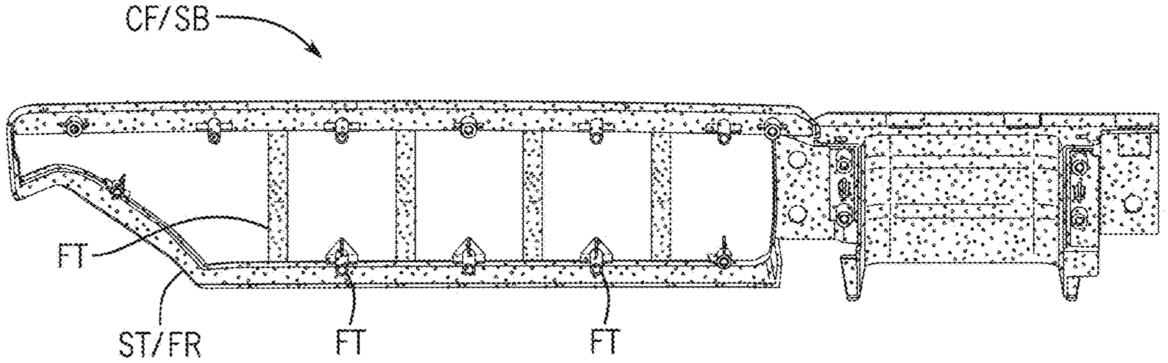
FIG. 36C is a perspective view of a structure of a component for a vehicle interior according to an exemplary embodiment.

According to an exemplary embodiment as shown schematically in FIGS. 2A-2B and 3A-3C, the component C with composite structure comprising the structural substrate SB with fiber panel FP/CF and structure/frame shown as molded structure ST/FR with feature FT may comprise a deformable region configured to deform in response in the event, as indicated in FIGS. 8A-8B (before and during/after event), 9 (during event), 10A-10B (before and during/after event), 11A-11B (before and during/after event), and 12A-12B (before and during/after event).

According to an exemplary embodiment as shown schematically in FIGS. 2A-2B, 3A-3C, 8A-8B, 10A-10B, 11A-11B, 12A-12B, 13A-13B, 14A-14C, 15A-15B, 16A-16D, 17, 18, 19A-19F, 20A-20F, 21A-21B, 22A-22C, 23, 23A-23C, 36A-36C and 38C-38D, the structural substrate SB of the composite structure of the component C may comprise a fiber panel FP/CF; the structure/frame ST/FR of the composite structure of the component C may comprise a molded structure with a feature FT provided on the structural substrate SB at an interface NT; the feature FT of the molded structure ST/FR may comprise a reinforcement RT for the interface NT and/or a projection PR for assembly of the component C into the vehicle interior; the interface NT may comprise resin material from the molded structure ST/FR and resin material from the fiber panel FP/CF of the structural substrate SB; the structure/frame ST/FR may comprise a border formed at the edge along the thickness of the fiber panel FP/CF; the interface NT of the molded structure ST/FR with feature FT/RT and the fiber panel FP/CF may comprise intermixing of resin material from the molded structure ST/FR with feature FT/RT and the fiber panel FP/CF and intermingling of resin material from the molded structure ST/FR with feature FT/RT and fibers from the fiber panel FP/CF (see FIGS. 16A-16D).

According to an exemplary embodiment indicated schematically in FIGS. 2A-2B, 3A-3C, 8A-8B, 10A-10B, 11A-11B, 12A-12B, 13A-13B, 14A-14C, 15A-15B, 30A-30B, 31A-31B, 32A-32B, 33A-33B, 34, 35 and 38C-38D, the component C may comprise a composite structure comprising a structural substrate SB such as a fiber panel FP/CF and forming a structure/frame ST/FR such as a molded structure with a feature FT such as a reinforcement RT or projection PR onto the structural substrate SB at an interface NT and providing a cover T and/or a pad PD onto the structural substrate SB for the composite structure. See also FIGS. 16A-16D, 17, 18, 19A-19F, 20A-20F, 21A-21B, 22A-22C, 23 and 23A-23C. The cover may comprise at least one of (a) cover stock; (b) a woven fabric; (c) a non-woven fabric; (d) an applique; (e) a vinyl layer; (f) a foam layer; (g) a foil layer; (h) a leather covering. The cover may comprise a molded thermoplastic material. The component may comprise a cover; the cover may comprise at least one of (a) a thermoplastic elastomer material; (b) a thermoplastic vulcanizate material; (c) a polyurethane material; (d) rubber within a polypropylene matrix. The composite structure of the component may comprise a cover T such as formed cover and pad PD such as foam pad on the structural substrate SB; the composite structure may comprise a foam core with an integral skin/cover for the structural substrate. See generally FIGS. 3A-3C, 30A-30B, 31A-31B, 32A-32B, 33A-33B, 34 and 35.

According to an exemplary embodiment as shown schematically in FIGS. 13A-13B, 14A-14C, 15A-15B, 16A-16D, 17, 18, 19A-19F, 20A-20F, 21A-21B, 22A-22C, 23, 23A-23C, 24A-24B, 25A-25B, 26A-26C, 27A-27D, 28A-28D, 29A-29C, 35, 36A-36C and 38C-38D, the component comprising a composite structure comprising a structural substrate SB and a structure/frame ST/FR; the structural substrate SB may comprise a fiber panel FP; the structure ST/FR may comprise a molded structure with a feature FT; the molded structure may be provided on the structural substrate; the molded structure may comprise resin material; the fiber panel may comprise resin material; the molded structure may be provided on the structural substrate at an interface; the interface may comprise resin material from the molded structure and resin material from the fiber panel; the fiber panel of the composite structure may be configured to deform to absorb energy in response to the event. See FIGS. 8A-8B, 9, 10A-10B, 11A-11B and 12A-12B.

According to an exemplary embodiment as shown schematically in FIGS. 13A-13B, 14A-14C, 15A-15B, 16A-16D, 17, 18, 19A-19F, 20A-20F, 21A-21B, 22A-22C, 23 and 23A-23C, the structural substrate SB of the composite structure of the component C may comprise a shape and a thickness at an edge; the fiber panel FP/CF of the structural substrate SB may comprise the edge along a periphery; the structure/frame ST/FR shown as molded structure may comprise a border formed at the edge of the fiber panel FP of the structural substrate SB; the fiber panel FP of the structural substrate SB may comprise the edge and the thickness along a periphery; the structure ST/FR may comprise a border formed at the edge along the thickness of the fiber panel FP; the interface NT may be provided at a border formed at the edge along the thickness of the fiber panel FP/CF; the interface NT may be provided at a border of the structure ST/FR formed at the edge of the fiber panel FP/CF; the fiber panel FP/CF may comprise an edge and a thickness; the structure ST/FR may comprise a border; the interface NT may be provided at the border of the structure ST/FR; the fiber panel FP/CF may comprise an edge and a thickness; the structure ST/FR may comprise a border; the interface may be provided at the border of the structure ST/FR at of the edge of the fiber panel FP/CF along the thickness of the fiber panel FP/CF; the interface may comprise mixing of resin material from the molded structure ST/FR and resin material from the fiber panel FP/CF; the interface may comprise intermingling of resin material from the molded structure and resin material from the fiber panel; the interface may comprise intermingling of resin material from the molded structure and fibers from the fiber panel. See also FIGS. 24A-24B, 25A-25B, 26A-26C, 27A-27D, 28A-28D, 29A-29C, 35, 36A-36C and 38C-38D.

According to an exemplary embodiment as shown schematically in FIGS. 13A-13B, 14A-14C, 15A-15B, 16A-16D, 17, 18, 19A-19F, 20A-20F, 21A-21B, 22A-22C, 23, 23A-23C, 24A-24B, 25A-25B, 26A-26C, 27A-27D, 28A-28D, 29A-29C, 35, 36A-36C and 38C-38D, the structure/frame ST/FR of composite structure shown as the molded structure may comprise an injection-molded structure; the molded structure may comprise a feature FT such as a projection PR and/or internal frame/cage structure; the structural substrate SB of the composite structure shown as fiber panel FP/CF may comprise an edge providing a periphery; the molded structure may be formed on the edge of the fiber panel; the molded structure may comprise a frame and/or a border formed on the edge of the fiber panel; the feature of the molded structure may comprise a molded feature formed on the fiber panel; the feature of the molded structure may comprise a set of features formed on the fiber panel; the composite structure may comprise a cover formed on the structural substrate; the structure may comprise a molded frame comprising the molded structure and a molded feature comprising the feature; the molded frame of the structure may be molded onto the fiber panel; the fiber panel may comprise a compression-formed panel configured to provide the structural substrate for the composite structure; the fiber panel may comprise an edge providing a thickness; the thickness of the edge of the fiber panel may comprise a variation of thickness along the periphery; the thickness of the edge of the fiber panel may comprise a first thickness and a second thickness; the molded structure may comprise an edge comprising the first thickness formed at the first thickness of the edge of the fiber panel and the second thickness formed at the second thickness of the edge of the fiber panel; the molded structure may be configured to be formed on the edge of the fiber panel.

According to an exemplary embodiment as shown schematically in FIGS. 15A-15B, 16A-16D, 32A-32B, 35, the fiber panel FP/CF of the structural substrate SB of the composite structure of the component C may comprise a feature such as recess RS; the feature of the fiber panel may comprise a notch and/or a projection; the feature of the fiber panel may comprise at least one of a set of features, a set of recesses, a set of notches, a set of projections, set of recesses and a set of projections; the feature FT of the structure/frame ST/FR shown as the molded structure of the composite structure may be formed at the feature shown as recess/notch RS of the fiber panel FP of the structural substrate SB of the composite structure.

According to an exemplary embodiment as shown schematically in FIGS. 13A-13B, 14A-14C, 15A-15B, 16A-16D, 17, 18, 19A-19F, 20A-20F, 21A-21B, 22A-22C, 23, 23A-23C, 24A-24B, 25A-25B, 26A-26C, 27A-27D, 28A-28D, 29A-29C, 35, 36A-36C and 38C-38D, the structure/frame ST/FR of the composite structure of the component C may comprise a molded structure with a feature FT; feature FT of the molded structure may comprise a set of features; the set of features of the molded structure may be formed at the set of features such as recess RS of the fiber panel FP/CF of the structural substrate SB of the composite structure; the feature FT of the molded structure may comprise a set of features; the set of features of the molded structure may be formed at the set of recesses of the fiber panel; the feature of the structure may comprise a molded feature; the feature FT may comprise a reinforcement FT; the feature FT may comprise a reinforcement frame; the feature may comprise at least one of a gusset, a tab, a flange, a rib, a set of ribs; the feature FT may comprise a projection PR; the feature FT may comprise a frame; the feature may comprise an internal frame; the feature may comprise a framework; the feature may comprise a mounting feature; an attachment feature; and/or a projection for mounting; the feature may be configured to facilitate attachment of the composite structure to a door structure; the feature of the molded structure may comprise a set of projections formed at the set of recesses of the fiber panel; the feature of the molded structure may comprise a projection comprising a base formed into a recess in the fiber panel; the feature of the molded structure may comprise a projection comprising a base formed into a recess at an edge of the fiber panel; the feature of the molded structure may comprise a set of projections formed along an edge of the fiber panel; the feature of the molded structure may comprise a set of projections with a base formed into an edge of the fiber panel; the feature of the molded structure may comprise at least one projection. The feature may comprise a reinforcement; the reinforcement may comprise a gusset; the reinforcement may be configured to strengthen an angle of the component; the reinforcement may be configured to strengthen the interface between the structure and the fiber panel; the reinforcement may be (a) coupled to the fiber panel and (b) coupled to the structure; the reinforcement may comprise the interface; the interface may comprise a composite material; the composite material may comprise material of the fiber panel and material of the structure; the interface may be formed by molding the structure into or onto the fiber panel. See FIGS. 24A-24B, 25A-25B, 26A-26C, 27A-27D, 28A-28C, 29A-29C, 35, 36A-36C and 38C-38D.

According to an exemplary embodiment as shown schematically in FIGS. 24A-24B, 25A-25B, 26A-26C, 27A-27D, 28A-28C, 29A-29C, 35, 36A-36C and 38C-38D, the structure/frame ST/FR of the composite structure may comprise a feature FT such a projection PR or as a cage/frame; the structure may comprise a border for the fiber panel; the structure may comprise a frame and the feature; the structure may be molded on the structural substrate SB shown as fiber panel FP/CF; the structure may be molded into the structural substrate; the structure may be bonded with the structural substrate; the structure may be pressed into the structural substrate; the structure may be configured to compress the structural substrate; the structure may be configured to retain a shape of the structural substrate; the structure may be configured to protect an edge of the structural substrate; the structure may be bonded with the structural substrate to provide a border. See FIGS. 16A-16D.

According to an exemplary embodiment as shown schematically in FIGS. 3A-3C, 30A-30B, 31A-31B, 32A-32B, 33A-33B, 34, 35 and 38D, the composite structure of the component C may comprise a cover T; the cover may be molded onto the structural substrate; the cover may comprise an injection-molded skin. According to an exemplary embodiment as shown schematically in FIGS. 3A-3C, 30A-30B, 31A-31B, 32A-32B, 33A-33B, 34 and 35, the composite structure of the component C may comprise a pad PD; the composite structure may comprise a foam pad formed on the structural substrate; the composite structure may comprise a pad and a cover formed on the fiber panel.

According to an exemplary embodiment as shown schematically in FIGS. 16A-16D, material of the structure and material of the fiber panel intermingle during formation of the structure ST/FR with feature/reinforcement FT/RT on the fiber panel FP/CF of the structural substrate SB; the fiber panel may comprise a first thickness and a second thickness greater than the first thickness; the second thickness may comprise the thickness along the edge; the second thickness may be configured for bonding of the fiber panel and the structure; the structure may comprise a tab configured to fit in a notch of the fiber panel and a protrusion coupled to the tab; the protrusion may be configured to facilitate assembly of the component to a door panel; the structure may comprise a frame for the fiber panel; the fiber panel may comprise a compression-formed component; the structure may be formed on the edge of the fiber panel; the fiber panel may comprise a plurality of fibers and a resin configured to bind the fibers; the structure may comprise a molded resin; the structure may be bonded to the fiber panel; the structure may be formed from a molded resin; the structure may be configured to accommodate at least one variation in at least one edge of the fiber panel. See also FIGS. 24A-24B, 25A-25B, 26A-26C, 27A-27D, 28A-28C, 29A-29C, 35, 36A-36C and 38C-38D.

According to an exemplary embodiment as shown schematically in FIGS. 39A-39D and 40A-40D, a method of producing a component for a vehicle interior configured to deform in response to an event such as a side impact of the vehicle comprising the steps of providing a structural substrate and forming a structure onto the structural substrate at an interface; the step of forming the structure onto the structural substrate may comprise injection molding of the structure onto the structural substrate; the method may comprise the step of providing a cover and/or pad for the structural substrate; the interface may be formed by molding of the resin material of the structure into the resin material of the structural substrate; the interface may be formed by molding of resin material of the structure into a fiber material of the structural substrate; the interface may comprise intermixing of resin material from the molded structure and resin material from the fiber panel; the interface may comprise intermixing of resin material from the molded structure and resin material from the fiber panel; the interface may comprise intermingling of resin material from the molded structure and fibers from the fiber panel. See also FIGS. 3A-3C, 10A-10B, 16A-16D, 37A-37C, 38A-38C, 41A-41B, 42A-42B and 43A-43B.

According to an exemplary embodiment indicated schematically in FIGS. 3A-3C, 30A-30B, 31A-31B, 32A-32B, 33A-33B, 34 and 35, a method of producing the component may comprise providing a composite structure comprising a structural substrate SB such as a fiber panel FP/CF and forming a structure/frame ST/FR such as a molded structure with a feature FT such as a reinforcement RT or projection PR onto the structural substrate SB at an interface NT and providing a cover T and/or a pad PD onto the structural substrate SB for the composite structure. See also FIGS. 16A-16D, 17, 18, 19A-19F, 20A-20F, 21A-21B, 22A-22C, 23 and 23A-23C. The composite structure of the component may be formed with a cover T such as molded/formed cover and pad PD such as foam/formed pad on the structural substrate SB; the composite structure may comprise a foam core with an integral skin/cover for the structural substrate. See generally FIGS. 3A-3C, 30A-30B, 31A-31B, 32A-32B, 33A-33B, 34 and 35.

Figure 39A:
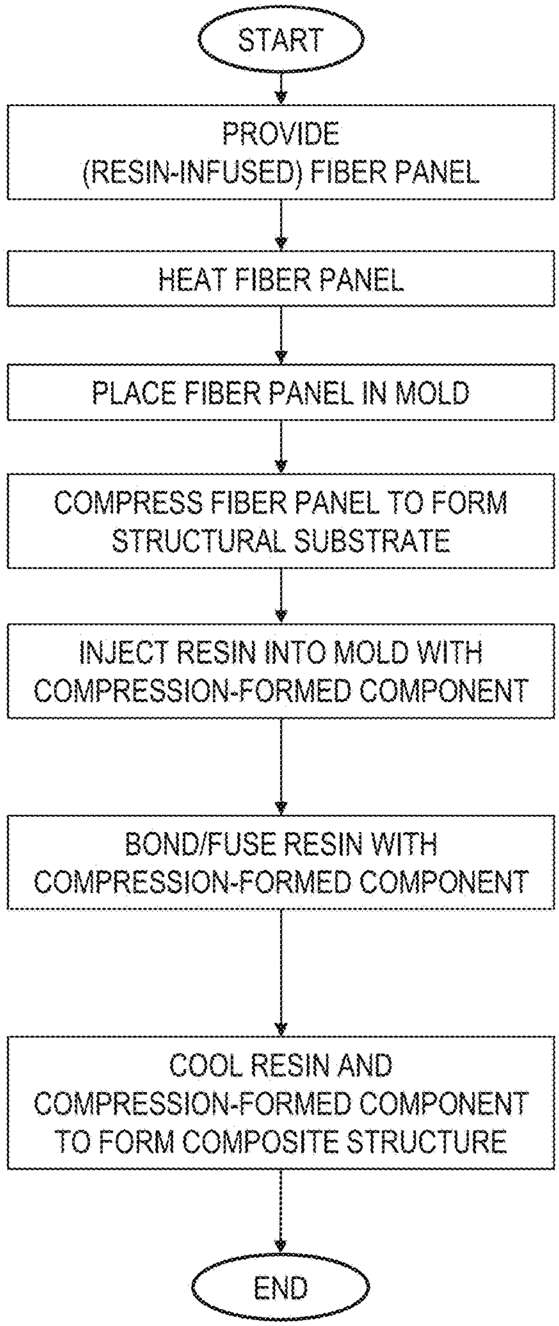
FIG. 39A is a schematic flow diagram of a process to manufacture a component for a vehicle interior according to an exemplary embodiment.

According to an exemplary embodiment as shown schematically in FIG. 39A, a process to manufacture a component for a vehicle interior may comprise providing a (resin-infused) fiber panel, heating the fiber panel, placing the fiber panel in a mold, compressing the fiber panel to form a structural substrate, injecting resin into the mold with the compression-formed component, bonding/fusing the resin with the compression-formed component, and cooling the resin and the compression-formed component to form a composite structure for the component.

Figure 39B:
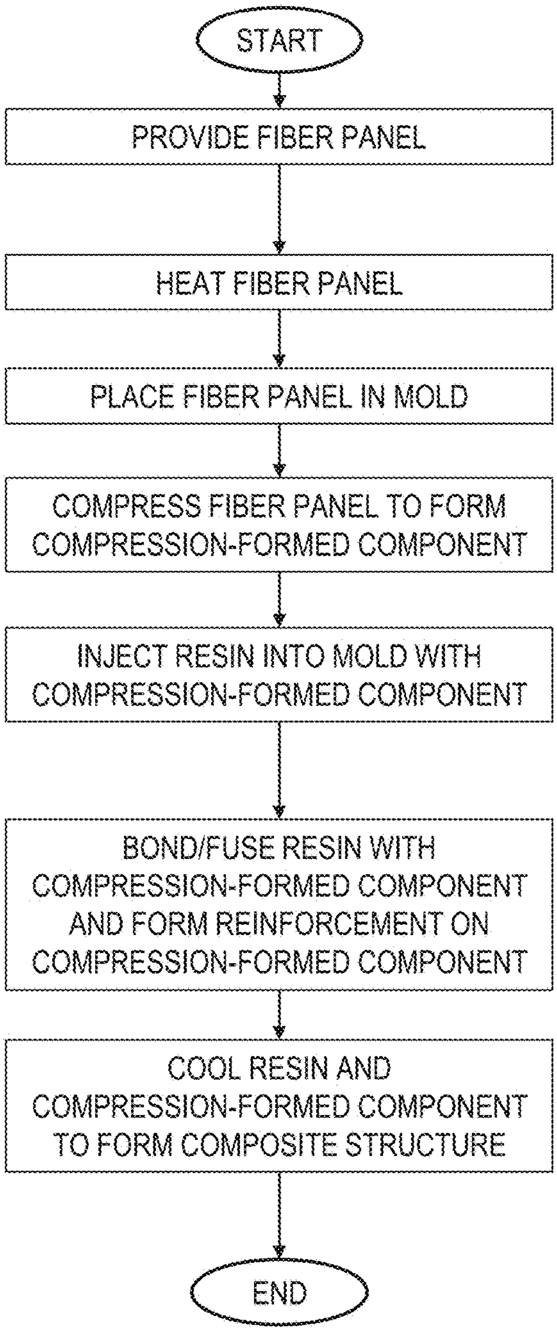
FIG. 39B is a schematic flow diagram of a process to manufacture a component for a vehicle interior according to an exemplary embodiment.

According to an exemplary embodiment as shown schematically in FIG. 39B, a process to manufacture a component for a vehicle interior may comprise providing a fiber panel, heating the fiber panel, placing the fiber panel in a mold, compressing the fiber panel to form a compression-formed component, injecting resin into the mold with the compression-formed component, bonding/fusing the resin with the compression-formed component, forming a reinforcement on the compression-formed component, and cooling the resin and the compression-formed component to form a composite structure for the component.

Figure 39C:
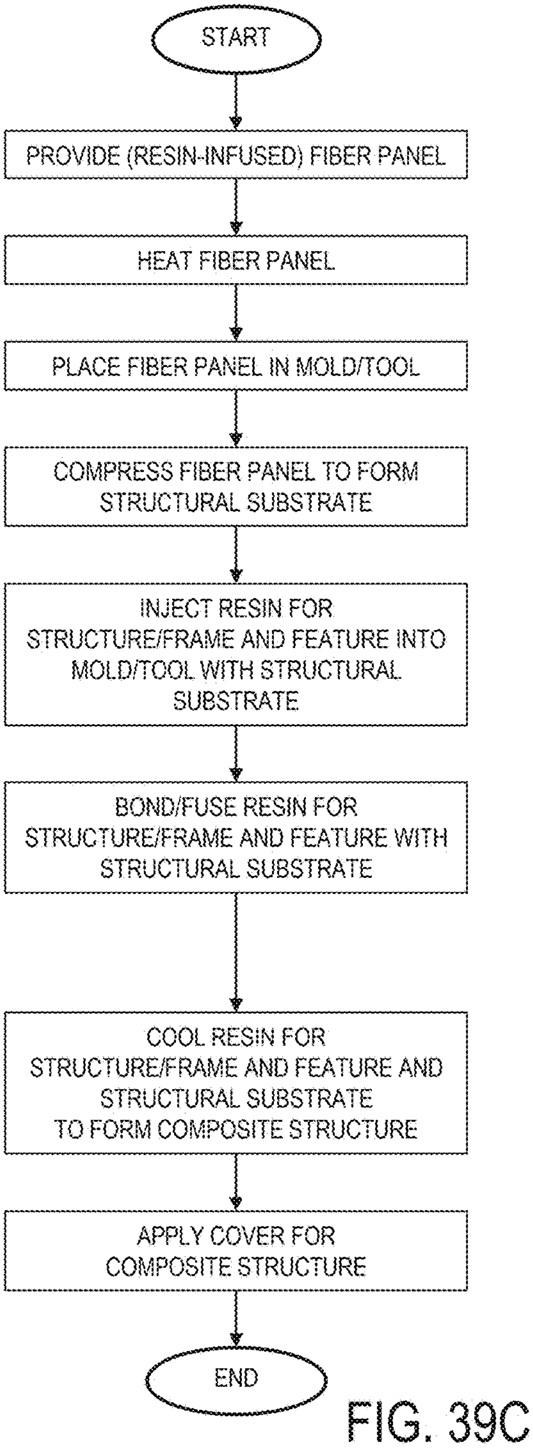
FIG. 39C is a schematic flow diagram of a process to manufacture a component for a vehicle interior according to an exemplary embodiment.

According to an exemplary embodiment as shown schematically in FIG. 39C, a process to manufacture a component for a vehicle interior may comprise providing a (resin-infused) fiber panel, heating the fiber panel, placing the fiber panel in a mold/tool, compressing the fiber panel to form a structural substrate, injecting resin for a structure/frame and a feature into the mold/tool with the structural substrate, bonding/fusing the resin for the structure/frame and the feature with the structural substrate, cooling the resin for the structure/frame and the feature and the structural substrate to form a composite structure, and applying a cover for the composite structure for the component.

Figure 39D:
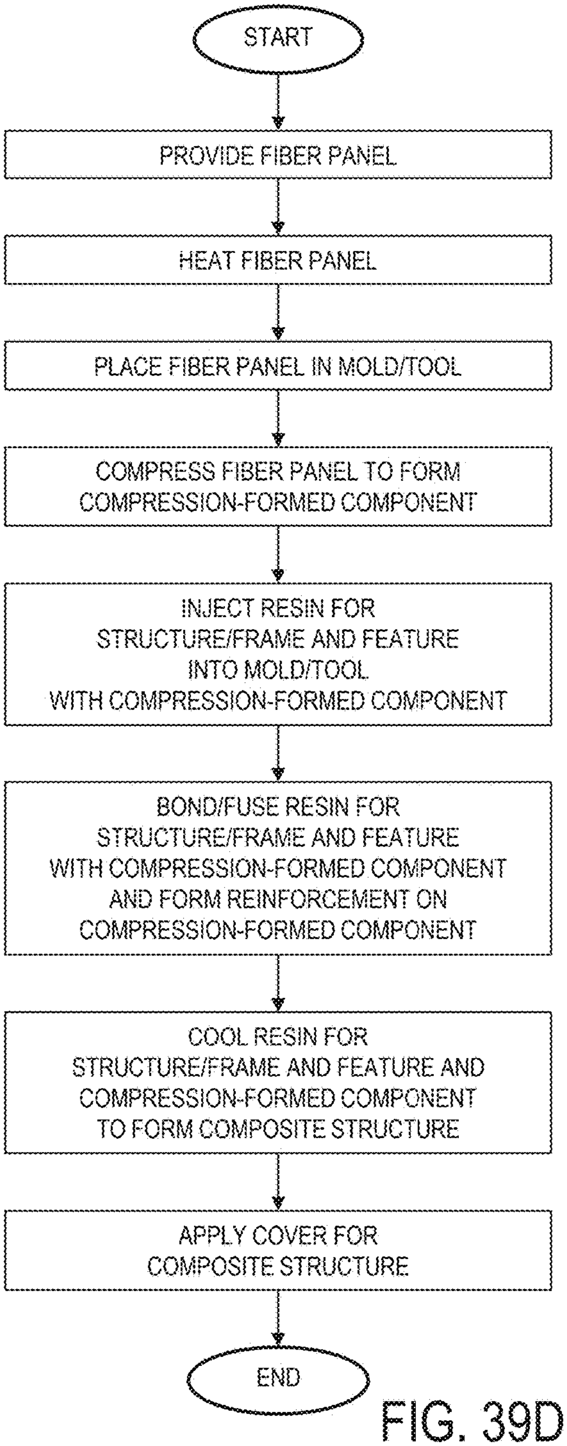
FIG. 39D is a schematic flow diagram of a process to manufacture a component for a vehicle interior according to an exemplary embodiment.

According to an exemplary embodiment as shown schematically in FIG. 39D, a process to manufacture a component for a vehicle interior may comprise providing a fiber panel, heating the fiber panel, placing the fiber panel in a mold/tool, compressing the fiber panel to form a compression-formed component, injecting resin for a structure/frame and a feature into the mold/tool with the compression-formed component, bonding/fusing the resin for the structure/frame and the feature with the compression-formed component, forming a reinforcement on the compression-formed component, cooling the resin for the structure/frame and the feature and the compression-formed component to form a composite structure, and applying a cover for the composite structure for the component.

Figures 40A, 40B:
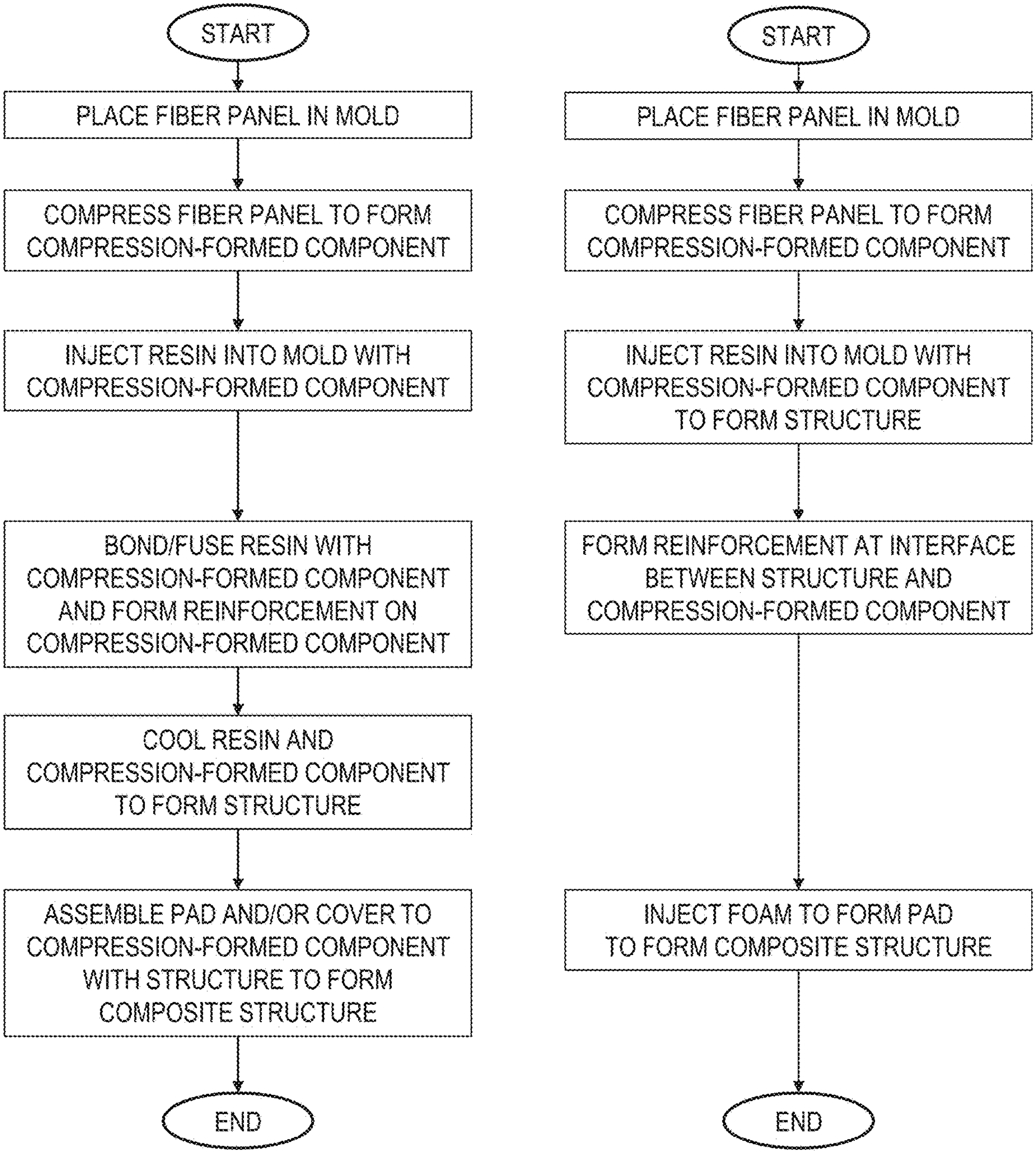
FIG. 40A is a schematic flow diagram of a process to manufacture a component for a vehicle interior according to an exemplary embodiment.
FIG. 40B is a schematic flow diagram of a process to manufacture a component for a vehicle interior according to an exemplary embodiment.

According to an exemplary embodiment as shown schematically in FIG. 40A, a process to manufacture a component for a vehicle interior may comprise placing a fiber panel in a mold, compressing the fiber panel to form a compression-formed component, injecting resin into the mold with the compression-formed component, bonding/fusing the resin with the compression-formed component, forming a reinforcement on the compression-formed component, cooling the resin and the compression-formed component to form a structure, and assembling a pad and/or cover to the compression-formed component with the structure to form a composite structure for the component.

According to an exemplary embodiment as shown schematically in FIG. 40B, a process to manufacture a component for a vehicle interior may comprise placing a fiber panel in a mold, compressing the fiber panel to form a compression-formed component, injecting resin into the mold with the compression-formed component to form a structure, forming a reinforcement at an interface between the structure and the compression-formed component, injecting foam to form a pad to form a composite structure for the component.

Figure 40C:
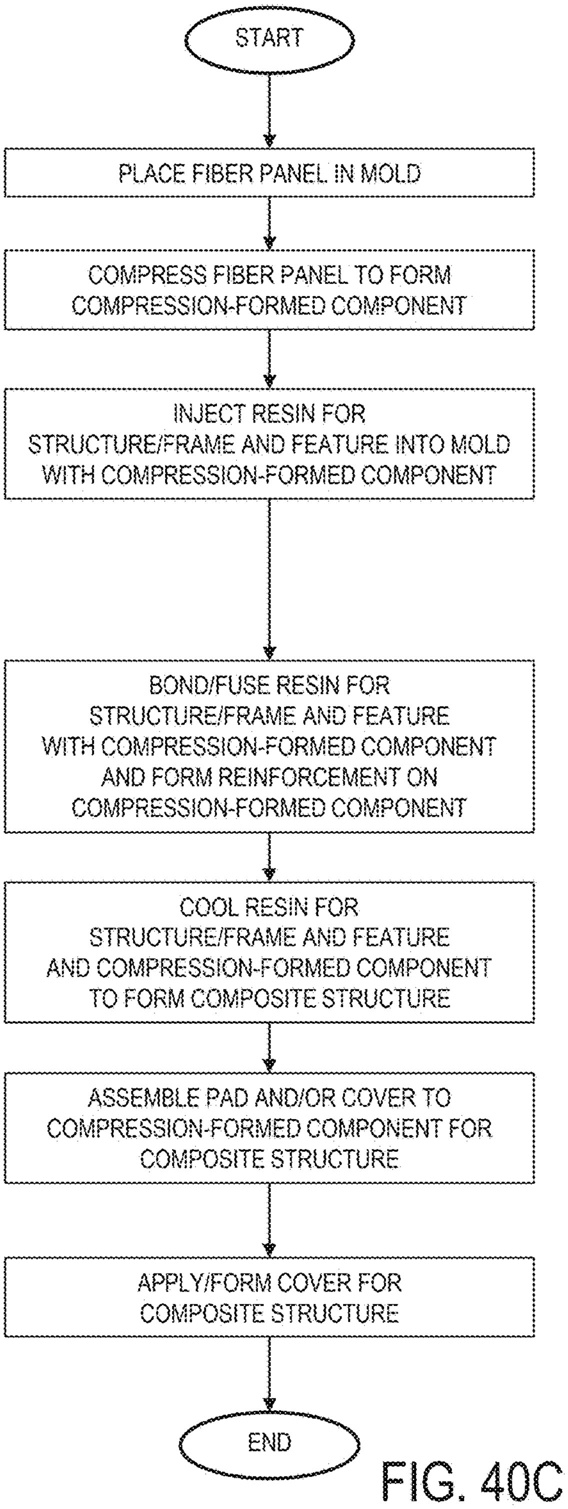
FIG. 40C is a schematic flow diagram of a process to manufacture a component for a vehicle interior according to an exemplary embodiment.

According to an exemplary embodiment as shown schematically in FIG. 40C, a process to manufacture a component for a vehicle interior may comprise placing a fiber panel in a mold, compressing the fiber panel to form a compression-formed component, injecting resin for a structure/frame and a feature into the mold with the compression-formed component, bonding/fusing the resin for the structure/frame and the feature with the compression-formed component, forming a reinforcement on the compression-formed component, cooling the resin for the structure/frame and the feature and the compression-formed component to form a composite structure, assembling a pad and/or cover to the compression-formed component for the composite structure, and applying/forming a cover for the composite structure for the component.

Figure 40D:
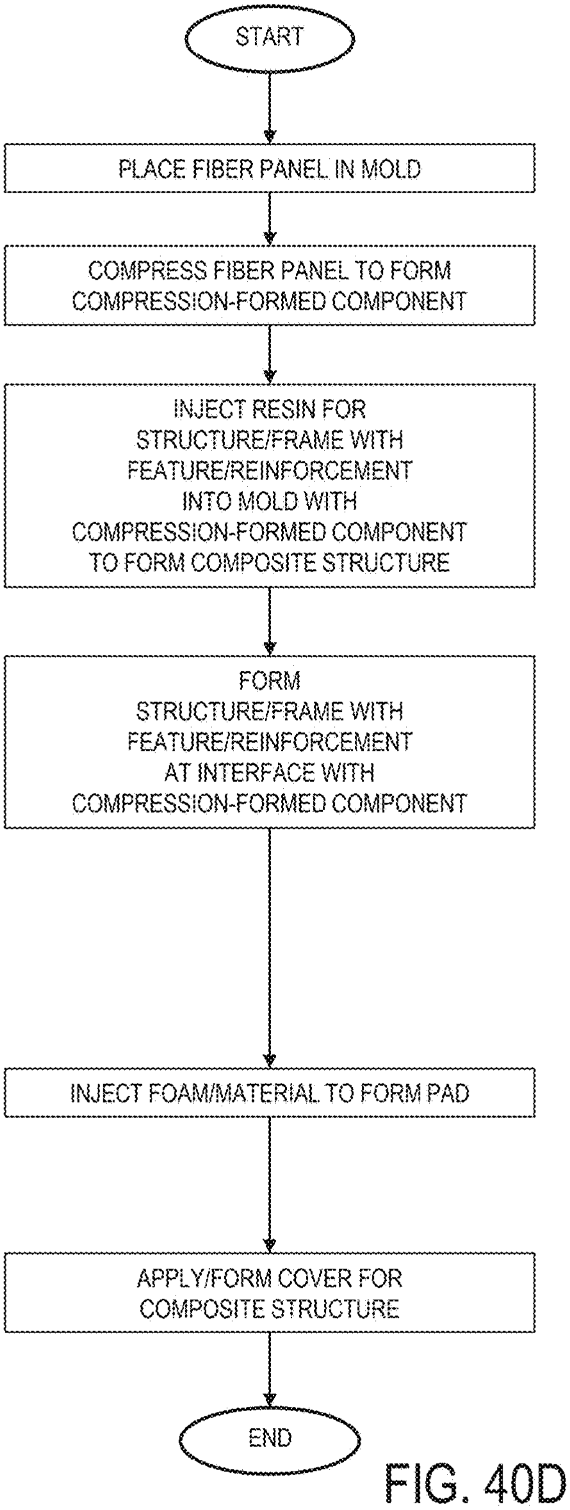
FIG. 40D is a schematic flow diagram of a process to manufacture a component for a vehicle interior according to an exemplary embodiment.

According to an exemplary embodiment as shown schematically in FIG. 40D, a process to manufacture a component for a vehicle interior may comprise placing a fiber panel in a mold, compressing the fiber panel to form a compression-formed component, injecting resin for a structure/frame with a feature/reinforcement into the mold with the compression-formed component to form a composite structure, forming the structure/frame with the feature/reinforcement at an interface with the compression-formed component, injecting foam/material to form a pad, and applying/forming a cover for the composite structure for the component.

According to an exemplary embodiment as shown schematically in FIGS. 1A-1B and 2A-2B, the component with composite structure may be configured to be provided adjacent to a vehicle interior component such as a seat for a vehicle occupant; the component with composite structure may comprise at least one of a panel, a trim panel, a door panel, an armrest, and armrest/assembly on the door panel, etc. According to an exemplary embodiment as shown schematically in FIGS. 2A-2B and 3A-3C, the component C with composite structure comprising the structural substrate SB with fiber panel FP/CF and structure/frame shown as molded structure ST/FR with feature FT may comprise a deformable region configured to deform in response in the event, as indicated in FIGS. 8A-8B (before and during/after event), 9 (during event), 10A-10B (before and during/after event), 11A-11B (before and during/after event), and 12A-12B (before and during/after event).

Exemplary Embodiments A

According to an exemplary embodiment as shown schematically in the FIGURES, a vehicle interior configured to deform in response to an event such as a side impact of the vehicle may comprise a composite structure comprising a structural substrate and a structure; the structural substrate may comprise a fiber panel; the structure may comprise a molded structure with a feature; the molded structure may be provided on the structural substrate; the molded structure may comprise resin material; the fiber panel may comprise resin material; the molded structure may be provided on the structural substrate at an interface; the interface may comprise resin material from the molded structure and resin material from the fiber panel; the fiber panel of the composite structure may be configured to deform to absorb energy in response to the event; the structural substrate may comprise a shape; the structure may comprise a border of the structural substrate; the interface may be provided at a border of the structure at an edge of the fiber panel; the interface may comprise intermixing of resin material from the molded structure and fibers from the fiber panel; the molded structure may comprise a frame and/or a border formed on the edge of the fiber panel; the feature of the molded structure may comprise a molded feature and/or a set of features formed on the fiber panel; the fiber panel may comprise a compression-formed panel configured to provide the structural substrate for the composite structure; the fiber panel may comprise a feature; the feature of the fiber panel may comprise a recess and/or a notch and/or a projection; the feature may comprise a reinforcement; the reinforcement may be configured to strengthen the interface between the structure and the fiber panel; the reinforcement may be coupled to the fiber panel and coupled to the structure; material of the structure and material of the fiber panel may intermingle during formation of the reinforcement; the feature may comprise at least one of a gusset and/or a tab and/or a flange and/or a rib and/or a set of ribs and/or a reinforcement frame; the component may further comprise a cover formed on the composite structure; the composite structure may comprise a pad; the fiber panel may comprise a deformable region configured to deform in response in the event; the interface may be formed by molding the structure into and/or onto the fiber panel; the structure may comprise a frame for the fiber panel; the fiber panel may comprise a plurality of fibers and a resin configured to bind the fibers; the structure may comprise a molded resin; the component may be made by a method comprising the steps of providing a structural substrate and forming a structure onto the structural substrate at an interface; the structural substrate may comprise a fiber panel comprising a resin material; the structure may comprise a molded structure comprising a resin material; the interface may comprise the resin material of the fiber panel and the resin material of the molded structure; the structure may comprise a molded feature; the interface may be formed by molding of the resin material of the structure into the resin material of the structural substrate; the interface may be formed by molding of resin material of the structure into a fiber material of the structural substrate; the fiber panel may comprise an edge and a thickness; the structure may comprise a border; the interface may be provided at the border of the structure at of the edge of the fiber panel along the thickness of the fiber panel; the method may further comprise the step of providing a cover for the structural substrate; the step of forming the structure onto the structural substrate may comprise injection molding of the structure onto the structural substrate.

According to an exemplary embodiment as shown schematically in the FIGURES, a component for a vehicle interior configured to deform in response to an event such as a side impact of the vehicle may comprise a fiber structure and a structure comprising a resin; the fiber structure may comprise an edge along a periphery and may provide a structural substrate having a shape and a thickness along the edge; the structure may comprise a border of the structural substrate along the thickness of the structural substrate; the fiber structure may be configured to deform in response in the event; the fiber structure may comprise a fiber panel configured to be formed into a compression formed structure; the feature may comprise a frame and/or an internal frame and/or a framework and/or a mounting feature and/or an attachment feature and/or a projection for mounting; the feature of the molded structure may comprise a set of features; the cover may be molded onto the structural substrate; the component may further comprise a cover; the cover may comprise at least one of cover stock and/or a woven fabric and/or a non-woven fabric and/or an applique and/or a vinyl layer and/or a foam layer and/or a foil layer and/or a leather covering; the cover may comprise at least one of a thermoplastic elastomer material and/or a thermoplastic vulcanizate material and/or a polyurethane material and/or rubber within a polypropylene matrix and/or a foam core with an integral skin and/or a skin material softer than the fiber panel; the component may comprise at least one of a panel and/or a trim panel and/or a door panel and/or an armrest assembly on the door panel and/or an armrest.

According to an exemplary embodiment as shown schematically in the FIGURES, a component for a vehicle interior configured to deform in response to an event such as a side impact of the vehicle may comprise a composite structure comprising a structural substrate and a structure. The structural substrate may comprise a fiber panel. The structure may comprise a molded structure with a feature. The molded structure may be provided on the structural substrate. The molded structure may comprise resin material. The fiber panel may comprise resin material. The molded structure may be provided on the structural substrate at an interface. The interface may comprise resin material from the molded structure and resin material from the fiber panel. The fiber panel of the composite structure may be configured to deform to absorb energy in response to the event. The structural substrate may comprise a shape and a thickness at an edge. The fiber panel of the structural substrate may comprise the edge along a periphery. The structure may comprise a border formed at the edge of the fiber panel of the structural substrate. The fiber panel of the structural substrate may comprise the edge and the thickness along a periphery. The structure may comprise a border formed at the edge along the thickness of the fiber panel. The interface may be provided at a border formed at the edge of the fiber panel. The interface may be provided at a border formed at the edge along the thickness of the fiber panel. The interface may be provided at a border of the structure formed at the edge of the fiber panel. The interface may be provided at a border of the structure formed at the edge along the thickness of the fiber panel. The fiber panel may comprise an edge and a thickness; the structure may comprise a border; the interface may be provided at the border of the structure. The fiber panel may comprise an edge and a thickness; the structure may comprise a border; the interface may be provided at the border of the structure at of the edge of the fiber panel. The fiber panel may comprise an edge and a thickness; the structure may comprise a border; the interface may be provided at the border of the structure at of the edge of the fiber panel along the thickness of the fiber panel. The interface may comprise mixing of resin material from the molded structure and resin material from the fiber panel. The interface may comprise intermixing of resin material from the molded structure and resin material from the fiber panel. The interface may comprise intermixing of resin material from the molded structure and resin material from the fiber panel; the interface may comprise intermingling of resin material from the molded structure and fibers from the fiber panel. The interface may comprise intermingling of resin material from the molded structure and resin material from the fiber panel. The interface may comprise intermingling of resin material from the molded structure and fibers from the fiber panel. The molded structure may comprise an injection-molded structure. The molded structure may comprise a frame. The molded structure may comprise an injection-molded frame. The fiber panel may comprise an edge providing a periphery. The molded structure may be formed on the edge of the fiber panel. The molded structure may comprise a frame formed on the edge of the fiber panel. The molded structure may comprise a border formed on the edge of the fiber panel. The feature of the molded structure may comprise a molded feature formed on the fiber panel. The feature of the molded structure may comprise a set of features formed on the fiber panel. The composite structure may comprise a cover for the structural substrate. The cover may be formed on the structural substrate. The structure may comprise a molded frame comprising the molded structure and a molded feature comprising the feature. The molded frame of the structure may be molded onto the fiber panel. The fiber panel may comprise a compression-formed panel. The fiber panel may comprise a compression-formed panel configured to provide the structural substrate for the composite structure. The fiber panel may comprise an edge providing a thickness. The thickness of the edge of the fiber panel may comprise a variation of thickness along the periphery. The thickness of the edge of the fiber panel may comprise a first thickness and a second thickness. The molded structure may comprise an edge comprising the first thickness and the second thickness. The molded structure may comprise an edge comprising the first thickness formed at the first thickness of the edge of the fiber panel and the second thickness formed at the second thickness of the edge of the fiber panel. The molded structure may be configured to be formed on the edge of the fiber panel. The fiber panel may comprise a feature. The feature of the fiber panel may comprise a recess. The feature of the fiber panel may comprise a notch. The feature of the fiber panel may comprise a projection. The feature of the fiber panel may comprise a set of features. The feature of the fiber panel may comprise a set of recesses. The feature of the fiber panel may comprise a set of notches. The feature of the fiber panel may comprise a set of projections. The feature of the fiber panel may comprise a set of recesses and a set of projections. The feature of the molded structure may be formed at the feature of the fiber panel. The feature of the molded structure may comprise a set of features; the set of features of the molded structure may be formed at the set of features of the fiber panel. The feature of the molded structure may be formed at the recess of the fiber panel. The feature of the molded structure may comprise a set of features; the set of features of the molded structure may be formed at the set of recesses of the fiber panel. The feature of the structure may comprise a molded feature. The feature may comprise a reinforcement. The feature may comprise a reinforcement feature. The feature may comprise a reinforcement frame. The feature may comprise a gusset. The feature may comprise a tab. The feature may comprise a flange. The feature may comprise a rib. The feature may comprise a set of ribs. The feature may comprise a projection. The feature may comprise a frame. The feature may comprise an internal frame. The feature may comprise a framework. The feature may comprise a mounting feature. The feature may comprise an attachment feature. The feature may comprise a projection for mounting. The feature may be configured to facilitate attachment of the composite structure to a door structure. The feature may be configured to facilitate attachment of the composite structure to a panel. The feature of the molded structure may comprise a set of projections formed at the set of recesses of the fiber panel. The feature of the molded structure may comprise a projection. The feature of the molded structure may comprise a set of projections. The feature of the molded structure may comprise a projection comprising a base formed into a recess in the fiber panel. The feature of the molded structure may comprise a projection comprising a triangle-shaped base formed into a triangle-shaped recess in the fiber panel. The feature of the molded structure may comprise a projection comprising a base formed into a recess at an edge of the fiber panel. The feature of the molded structure may comprise a set of projections formed along an edge of the fiber panel. The feature of the molded structure may comprise a set of projections with a base formed into an edge of the fiber panel. The feature of the molded structure may comprise at least one least one feature. The at least one feature may comprise a projection. The feature may comprise at least one projection. The structure may comprise a frame. The structure may comprise a border for the fiber panel. The structure may provide a housing for the fiber panel. The structure may comprise the frame and the feature. The structure may comprise a molded housing with the feature. The structure may be molded on the structural substrate. The structure may be molded into the structural substrate. The structure may be bonded with the structural substrate. The structure may be pressed into the structural substrate. The structure may be configured to compress the structural substrate. The structure may be configured to retain a shape of the structural substrate. The structure may protect an edge of the structural substrate. The structure may be bonded with the structural substrate to provide a border. The composite structure may comprise a cover. A cover may be provided on the composite structure. The cover may be molded onto the structural substrate. The cover may be overmolded onto the structural substrate. The cover may comprise an injection-molded skin. The composite structure may comprise a pad. The composite structure may comprise a foam pad. The composite structure may comprise a foam pad formed on the structural substrate. The composite structure may comprise a pad and a cover formed on the fiber panel. The fiber panel may comprise an edge along a periphery and may provide a structural substrate having a shape and a thickness along the edge; the structure may comprise a border of the structural substrate along the thickness of the structural substrate. The fiber panel may comprise a compression-formed component; the compression-formed component may comprise an edge along a periphery; the compression-formed component may provide a shape and a thickness along the edge for the structural substrate. The structure may comprise a border of the structural substrate along the thickness of the structural substrate provided by the compression-formed component. In response in the event the fiber panel may be configured to absorb force. In response in the event the fiber panel may be configured for movement relative to the structure. The fiber panel may comprise a deformable region configured to deform in response in the event. The feature may comprise a reinforcement. The reinforcement may comprise a gusset. The reinforcement may be configured to strengthen an angle of the component. The reinforcement may be configured to strengthen the interface between the structure and the fiber panel. The reinforcement may be configured to strengthen a joint between the structure and the fiber panel. The reinforcement may be (a) coupled to the fiber panel and (b) coupled to the structure. The reinforcement may comprise the interface; the interface may comprise a composite material; the composite material may comprise material of the fiber panel and material of the structure. The interface may be formed by molding the structure on the fiber panel. Material of the structure and material of the fiber panel may intermingle during formation of the reinforcement. The fiber panel may comprise a first thickness and a second thickness greater than the first thickness. The second thickness may comprise the thickness along the edge. The second thickness may be configured for bonding of the fiber panel and the structure. The structure may comprise a tab configured to fit in a notch of the fiber panel. The structure may comprise a protrusion coupled to the tab. The protrusion may be configured to facilitate assembly of the component to a door panel. The structure may comprise a frame for the fiber panel. The fiber panel may comprise a compression-formed component. The structure may be formed on the edge of the fiber panel. The fiber panel may comprise a plurality of fibers and a resin configured to bind the fibers; the structure may comprise a molded resin. The structure may be bonded to the fiber panel. The structure may be formed from a molded resin. The structure may be configured to accommodate at least one variation in at least one edge of the fiber panel. The component may comprise at least one of (a) a pad; (b) a cover. The cover may comprise at least one of (a) cover stock; (b) a woven fabric; (c) a non-woven fabric; (d) an applique; (e) a vinyl layer; (f) a foam layer; (g) a foil layer; (h) a leather covering. The component may comprise a cover; the cover may comprise a molded thermoplastic material. The component may comprise a cover; the cover may comprise at least one of (a) a thermoplastic elastomer material; (b) a thermoplastic vulcanizate material; (c) a polyurethane material; (d) rubber within a polypropylene matrix. The component may comprise a cover; the cover may comprise a foam core with an integral skin. The component may comprise a cover; the cover may comprise a skin material softer than the fiber panel. The component may be configured to be provided adjacent to a seat for a vehicle occupant. The component may comprise at least one of (a) door panel; (b) an armrest assembly on the door panel; (c) an armrest.

According to an exemplary embodiment as shown schematically in the FIGURES, a method of producing a component for a vehicle interior configured to deform in response to an event such as a side impact of the vehicle may comprise the steps of (a) providing a structural substrate, and (b) forming a structure onto the structural substrate at an interface. The structural substrate may comprise a fiber panel comprising a resin material. The structure may comprise a molded structure comprising a resin material. The interface may comprise the resin material of the fiber panel and the resin material of the molded structure. The structure may comprise a feature. The structure may comprise a molded feature. The fiber panel may comprise an edge and a thickness; the structure may comprise a border; the interface may be provided at the border of the structure at of the edge of the fiber panel along the thickness of the fiber panel. The method may comprise the step of providing a cover for the structural substrate. The step of forming the structure onto the structural substrate may comprise injection molding of the structure onto the structural substrate. The interface may be formed by molding of the resin material of the structure into the resin material of the structural substrate. The interface may be formed by molding of resin material of the structure into a fiber material of the structural substrate.

According to an exemplary embodiment as shown schematically in the FIGURES, a method of manufacturing a component for a vehicle interior in a mold providing a mold cavity may comprise heating a fiber panel, placing the fiber panel into the mold cavity, compressing the fiber panel in the mold cavity to form a compression-formed component comprising a shape, an edge along a periphery, and a thickness along the edge, injecting resin into the mold cavity with the compression-formed component to form a structure, and forming a reinforcement configured to strengthen a joint between the structure and the compression-formed component. A border of the compression-formed component may be formed along the thickness of the compression-formed component by the resin injected into the mold cavity. The reinforcement may be (a) coupled to the compression-formed component and (b) coupled to the structure. The compression-formed component may comprise a structural substrate. The reinforcement may comprise a gusset. The reinforcement may be configured to strengthen an angle of the component. The reinforcement may comprise an interface; the interface may comprise a composite material; the composite material may comprise material of the fiber panel and the resin. The step of forming the reinforcement may comprise intermingling the resin and material of the fiber panel. The step of compressing the fiber panel in the mold cavity may comprise compressing a first portion of the fiber panel to a first thickness and compressing a second portion of the fiber panel to a second thickness greater than the first thickness; the second thickness may comprise the thickness along the edge of the compression-formed component; the second thickness may be configured for bonding of the compression-formed component and the structure. The method may comprise a step of cutting a notch in the fiber panel; the step of injecting resin into the mold cavity with the structure may comprise forming a tab of the structure; the notch may be configured to couple the compression-formed component to the tab of the structure. The step of injecting resin into the mold cavity with the structure may comprise forming a protrusion coupled to the tab. The method may comprise a step of injecting a material into the mold cavity with the compression-formed component and the structure to form a cover for the compression-formed component. The cover may comprise a foamed cover. The cover may comprise a foam core with an integral skin on the foam core. The material may comprise at least one of (a) a mixture of polyurethane, (b) a combination of a reaction mixture, (c) foam material, (d) polyurethane foam, (e) urethane foam. The material may comprise at least one of (a) a thermoplastic elastomer material; (b) a thermoplastic vulcanizate material; (c) a polyurethane material; (d) rubber within a polypropylene matrix. The method may comprise a step of assembling a cover to the compression-formed component and the structure.

According to an exemplary embodiment as shown schematically in the FIGURES, a component for a vehicle interior configured to deform in response to an event such as a side impact of the vehicle may comprise a fiber panel and a structure comprising a resin. The fiber panel may comprise an edge along a periphery and may provide a structural substrate having a shape and a thickness along the edge. The structure may comprise a border of the structural substrate along the thickness of the structural substrate. The fiber panel may be configured to deform in response in the event.

Exemplary Embodiments B

According to an exemplary embodiment as shown schematically in the FIGURES, a component C for a vehicle interior (shown as an armrest AR) for response in an event such as a side impact of the vehicle may comprise a structural substrate SB, a pad PD and a cover T. Structural substrate SB may comprise a fiber panel configured to deform and/or absorb force in response in the event. Structural substrate SB may comprise a compression-formed component CF.

As indicated schematically in FIGS. 4A-4B, 5A-5B, 6A-6B, 7A-7B, 8A-8B and 9, door panel DP may be subjected to a force such as in the event of side impact of the vehicle; the force may act upon armrest AR and cause a response. According to an exemplary embodiment, an occupant may be seated adjacent to door panel DP and armrest AR.

Referring to FIGS. 4A-4B, 5A-5B, 6A-6B, 7A-7B, 8A-8B and 9, the effect of an event of a side impact on vehicle V at door panel DP with armrest assembly AR is shown schematically using a test fixture such as crash barrier RTA or crash barrier RTB; as indicated schematically, impact of vehicle V with crash barrier RTA/RTB may produce a response at armrest AR.

Figure 37A:
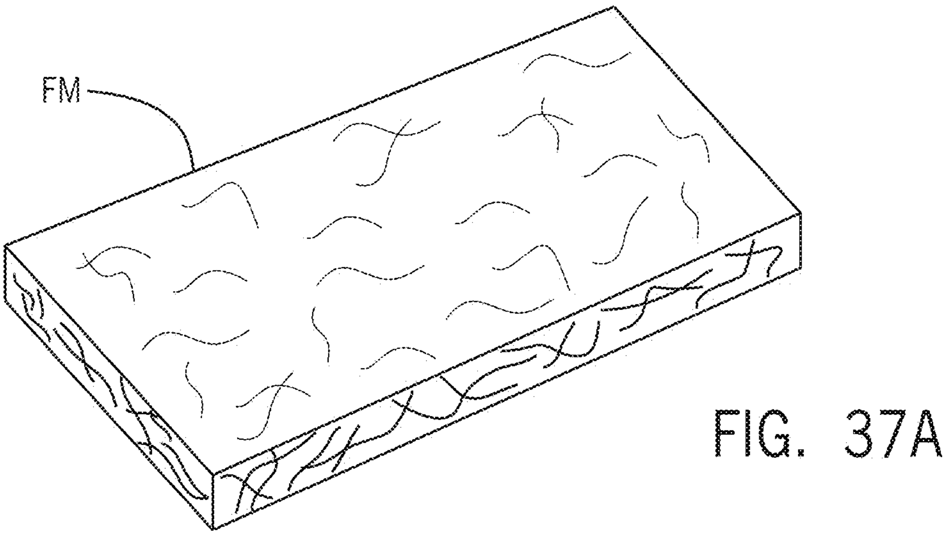
FIGS. 37A to 37C are schematic perspective views of a fiber mat being trimmed and consolidated according to an exemplary embodiment.
Figure 37B:
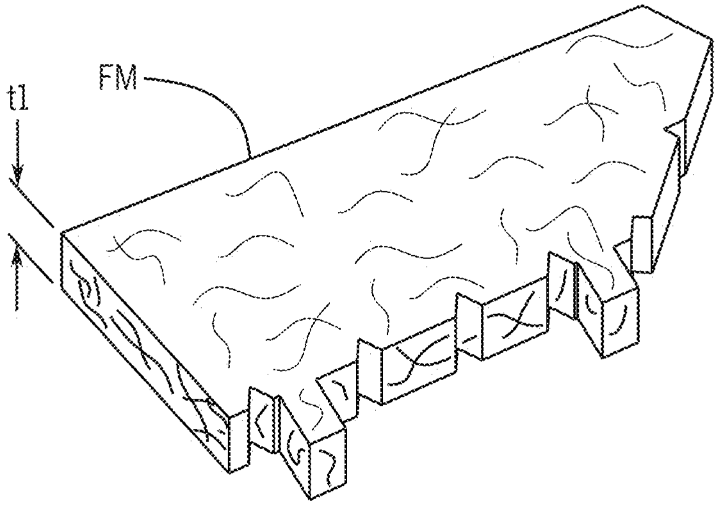
Figure 37C:
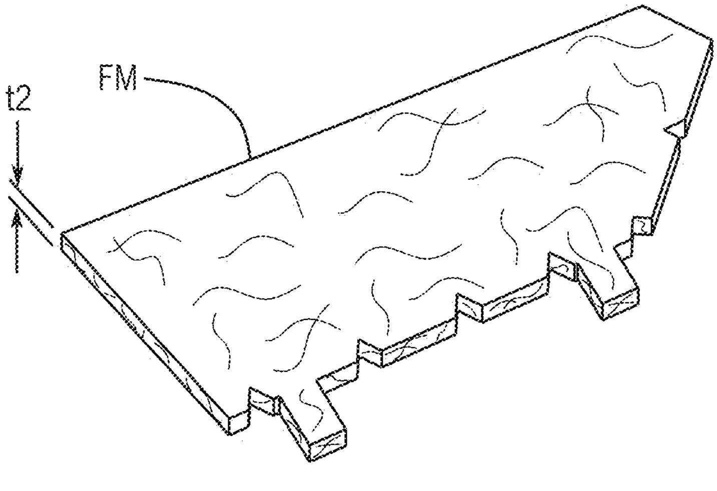

According to an exemplary embodiment as shown schematically in FIG. 37A, a fiber mat FM may include a combination of fibers (e.g. natural and/or synthetic fibers) and thermoplastic resin (e.g. polypropylene (PP), acrylonitrile butadiene styrene (ABS), polycarbonate (PC), etc.). According to an exemplary embodiment as shown schematically in FIG. 37B, fiber mat FM may be trimmed. According to an exemplary embodiment, fiber mat FM may have a thickness t1. According to an exemplary embodiment as shown schematically in FIG. 37C, fiber mat FM may be consolidated (e.g. by compression and at least partial melting, merging, etc.). According to an exemplary embodiment, fiber mat FM may be heated to induce the thermoplastic resin to liquefy. According to an exemplary embodiment, fiber mat FM may be placed into a low-temperature mold and compression molded into a desired shape. According to an exemplary embodiment, as the compressed fiber mat cools, the thermoplastic within the fiber mat may solidify to establish a substantially rigid composite panel. According to an exemplary embodiment, the consolidated fiber mat may have a thickness t2, which may be smaller than thickness t1.

According to an exemplary embodiment, fiber mat FM may comprise a combination of structural fibers and thermoset resin (e.g. epoxy, polyester, etc.). According to an exemplary embodiment, fiber mat FM may be compressed within a heated mold to form a partially compressed fiber mat with a desired shape and to induce curing of the thermoset resin. According to an exemplary embodiment, a substantially rigid composite panel may be formed after the thermoset resin is cured.

Figure 38A:
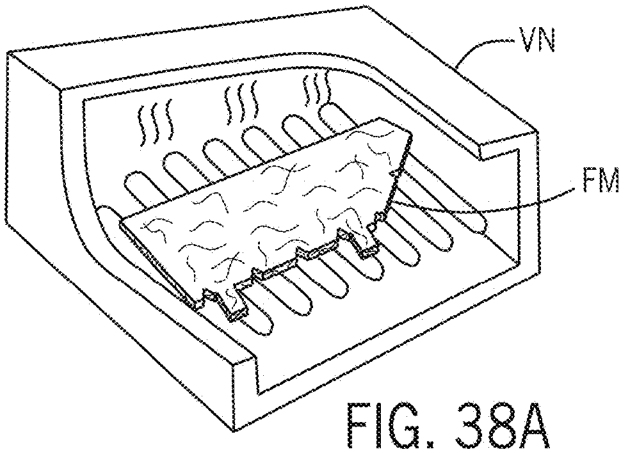
FIGS. 38A to 38B are schematic perspective views of a process to form a component for a vehicle interior shown as an armrest according to an exemplary embodiment.

According to an exemplary embodiment as shown schematically in FIG. 38A, a consolidated fiber mat may be heated in an oven VN. As shown schematically in FIG. 38B, the heated consolidated fiber mat may be transferred into a mold having a mold top MT and a mold bottom MB. According to an exemplary embodiment as shown schematically in FIG. 38C, a compression-formed component CF shown as a structural substrate SB may be produced by a process of compression forming. The process may comprise compression forming and injection molding. According to an exemplary embodiment, the heated consolidated fiber mat may be compressed into a fiber panel. According to an exemplary embodiment as shown schematically in FIGS. 38C, compression-formed component CF may comprise a structure ST providing a frame FR for fiber panel FP. According to an exemplary embodiment as shown schematically in FIG. 38C, compression-formed component CF may comprise a reinforcement RT.

According to an exemplary embodiment as shown schematically in FIG. 38A, a process to manufacture a component for a vehicle interior may comprise providing a (resin infused) fiber panel, heating the fiber panel, placing the fiber panel in a mold, compressing the fiber panel to form a structural substrate, injecting resin into the mold with the compression-formed component, bonding/fusing resin with the compression-formed component, and cooling the resin and the compression-formed component to form a structure.

Figure 38B:
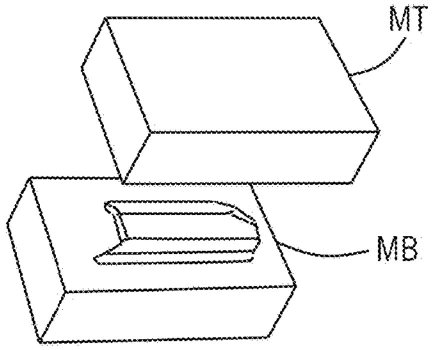
Figure 38C:
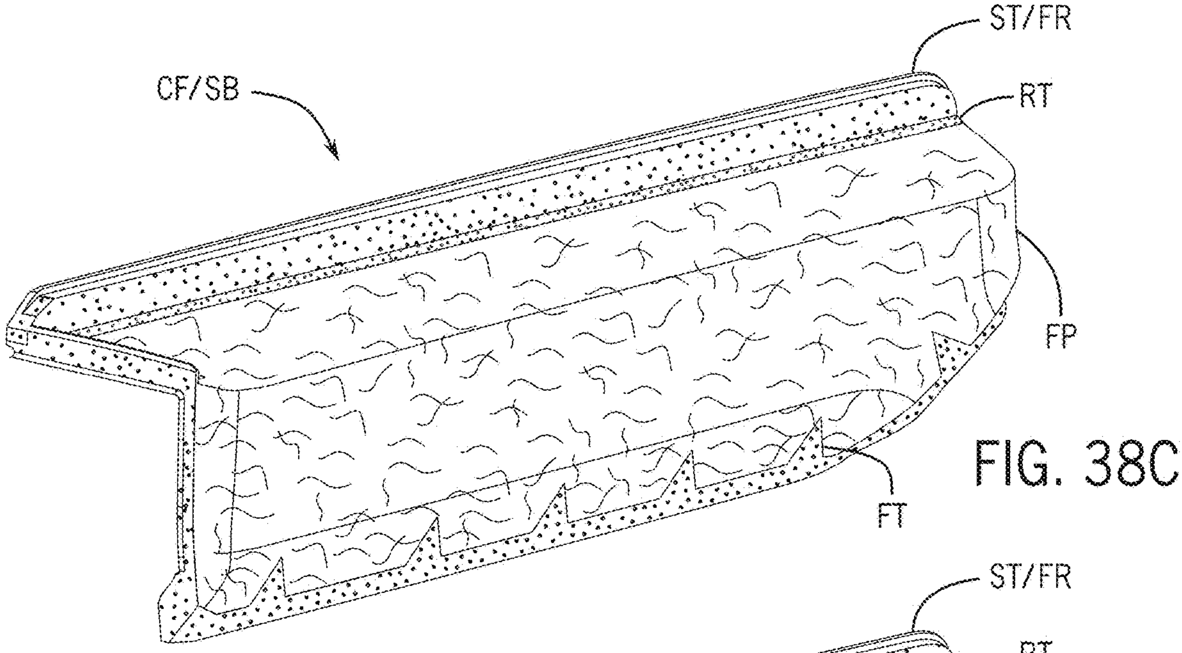
FIGS. 38C and 38D are a schematic perspective cutaway views of a component for a vehicle interior shown as an armrest according to an exemplary embodiment.
Figure 38D:
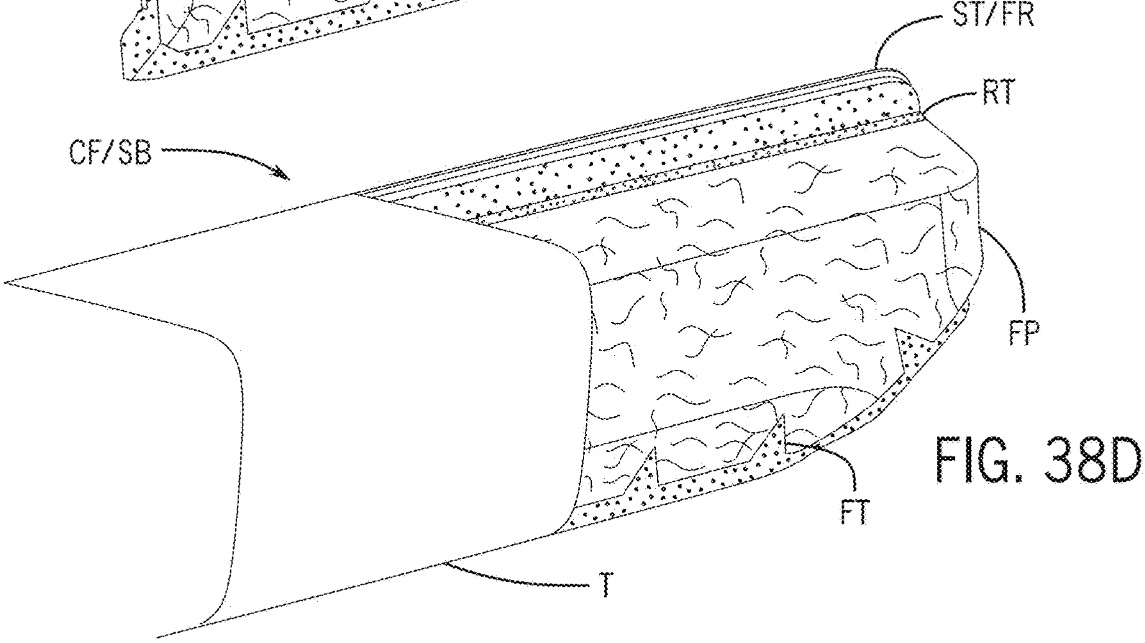

According to an exemplary embodiment as shown schematically in FIG. 38B, a process to manufacture a component for a vehicle interior may comprise providing a fiber panel, heating the fiber panel, placing the fiber panel in a mold, compressing the fiber panel to form a compression-formed component, injecting resin into the mold with the compression-formed component, bonding/fusing resin with the compression-formed component and forming a reinforcement on the compression-formed component, cooling the resin and the compression-formed component to form a structure.

According to an exemplary embodiment as shown schematically in FIG. 39A, a process to manufacture a component for a vehicle interior may comprise providing a (resin-infused) fiber panel, heating the fiber panel, placing the fiber panel in a mold, compressing the fiber panel to form a structural substrate, injecting resin into the mold with the compression-formed component, bonding/fusing the resin with the compression-formed component, and cooling the resin and the compression-formed component to form a composite structure.

According to an exemplary embodiment as shown schematically in FIG. 39B, a process to manufacture a component for a vehicle interior may comprise providing a fiber panel, heating the fiber panel, placing the fiber panel in a mold, compressing the fiber panel to form a compression-formed component, injecting resin into the mold with the compression-formed component, bonding/fusing the resin with the compression-formed component, forming a reinforcement on the compression-formed component, and cooling the resin and the compression-formed component to form a composite structure.

According to an exemplary embodiment as shown schematically in FIG. 39C, a process to manufacture a component for a vehicle interior may comprise providing a (resin-infused) fiber panel, heating the fiber panel, placing the fiber panel in a mold/tool, compressing the fiber panel to form a structural substrate, injecting resin for a structure/frame and a feature into the mold/tool with the structural substrate, bonding/fusing the resin for the structure/frame and the feature with the structural substrate, cooling the resin for the structure/frame and the feature and the structural substrate to form a composite structure, and applying a cover for the composite structure.

According to an exemplary embodiment as shown schematically in FIG. 39D, a process to manufacture a component for a vehicle interior may comprise providing a fiber panel, heating the fiber panel, placing the fiber panel in a mold/tool, compressing the fiber panel to form a compression-formed component, injecting resin for a structure/frame and a feature into the mold/tool with the compression-formed component, bonding/fusing the resin for the structure/frame and the feature with the compression-formed component, forming a reinforcement on the compression-formed component, cooling the resin for the structure/frame and the feature and the compression-formed component to form a composite structure, and applying a cover for the composite structure.

According to an exemplary embodiment as shown schematically in FIG. 40A, a process to manufacture a component for a vehicle interior may comprise placing a fiber panel in a mold, compressing the fiber panel to form a compression-formed component, injecting resin into the mold with the compression-formed component, bonding/fusing the resin with the compression-formed component, forming a reinforcement on the compression-formed component, cooling the resin and the compression-formed component to form a structure, and assembling a pad and/or cover to the compression-formed component with the structure to form a composite structure.

According to an exemplary embodiment as shown schematically in FIG. 40B, a process to manufacture a component for a vehicle interior may comprise placing a fiber panel in a mold, compressing the fiber panel to form a compression-formed component, injecting resin into the mold with the compression-formed component to form a structure, forming a reinforcement at an interface between the structure and the compression-formed component, injecting foam to form a pad to form a composite structure.

According to an exemplary embodiment as shown schematically in FIG. 40C, a process to manufacture a component for a vehicle interior may comprise placing a fiber panel in a mold, compressing the fiber panel to form a compression-formed component, injecting resin for a structure/frame and a feature into the mold with the compression-formed component, bonding/fusing the resin for the structure/frame and the feature with the compression-formed component, forming a reinforcement on the compression-formed component, cooling the resin for the structure/frame and the feature and the compression-formed component to form a composite structure, assembling a pad and/or cover to the compression-formed component for the composite structure, and applying/forming a cover for the composite structure.

According to an exemplary embodiment as shown schematically in FIG. 40D, a process to manufacture a component for a vehicle interior may comprise placing a fiber panel in a mold, compressing the fiber panel to form a compression-formed component, injecting resin for a structure/frame with a feature/reinforcement into the mold with the compression-formed component to form a composite structure, forming the structure/frame with the feature/reinforcement at an interface with the compression-formed component, injecting foam/material to form a pad, and applying/forming a cover for the composite structure.

Figure 41A:
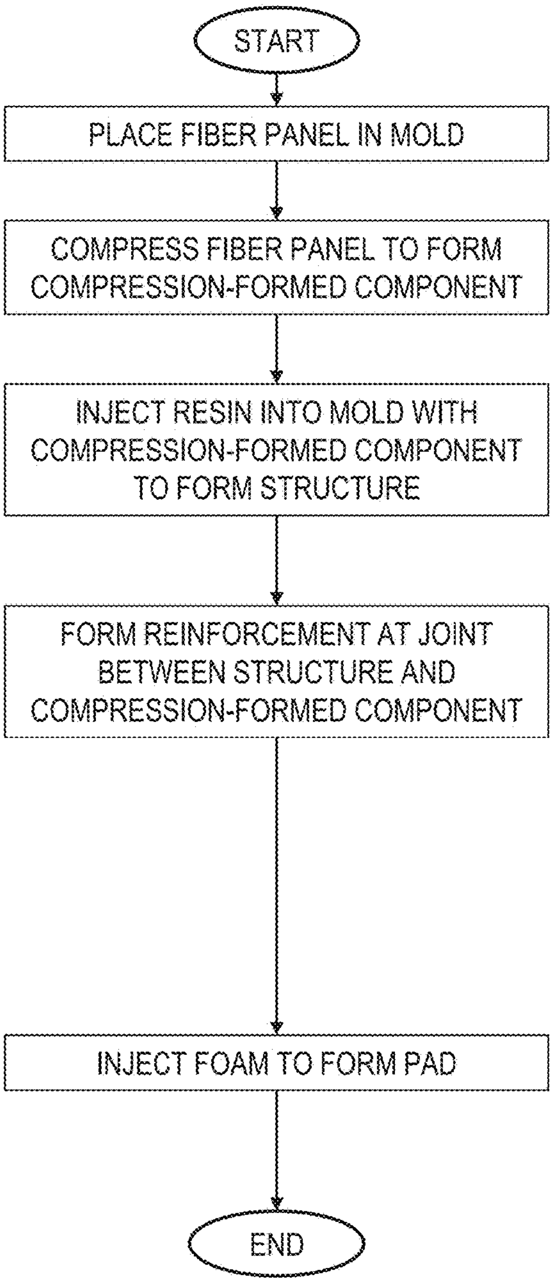
FIG. 41A is a schematic flow diagram of a process to manufacture a component for a vehicle interior according to an exemplary embodiment.

According to an exemplary embodiment as shown schematically in FIG. 41A, a process to manufacture a component for a vehicle interior may comprise placing a fiber panel in a mold, compressing the fiber panel to form a compression-formed component, injecting resin into the mold with the compression-formed component to form a structure, forming a reinforcement at a joint between the structure and the compression-formed component, and injecting foam to form a pad.

Figure 41B:
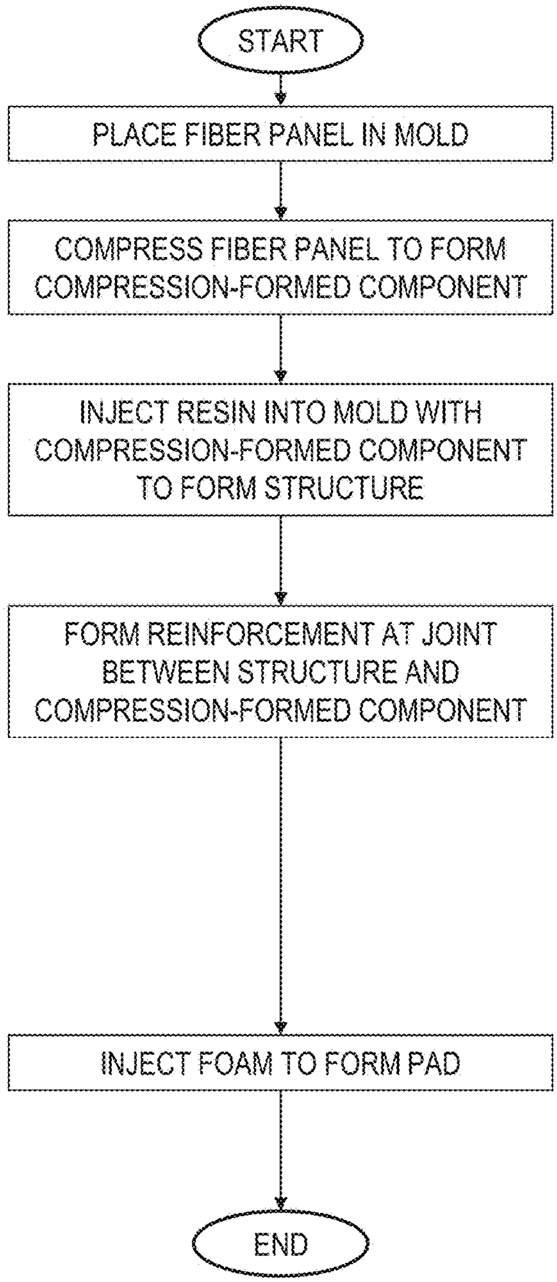
FIG. 41B is a schematic flow diagram of a process to manufacture a component for a vehicle interior according to an exemplary embodiment.

According to an exemplary embodiment as shown schematically in FIG. 41B, a process to manufacture a component for a vehicle interior may comprise placing a fiber panel in a mold, compressing the fiber panel to form a compression-formed component, injecting resin into the mold with the compression-formed component to form a structure, forming a reinforcement at a joint between the structure and the compression-formed component, and injecting foam to form a pad.

Figure 42A:
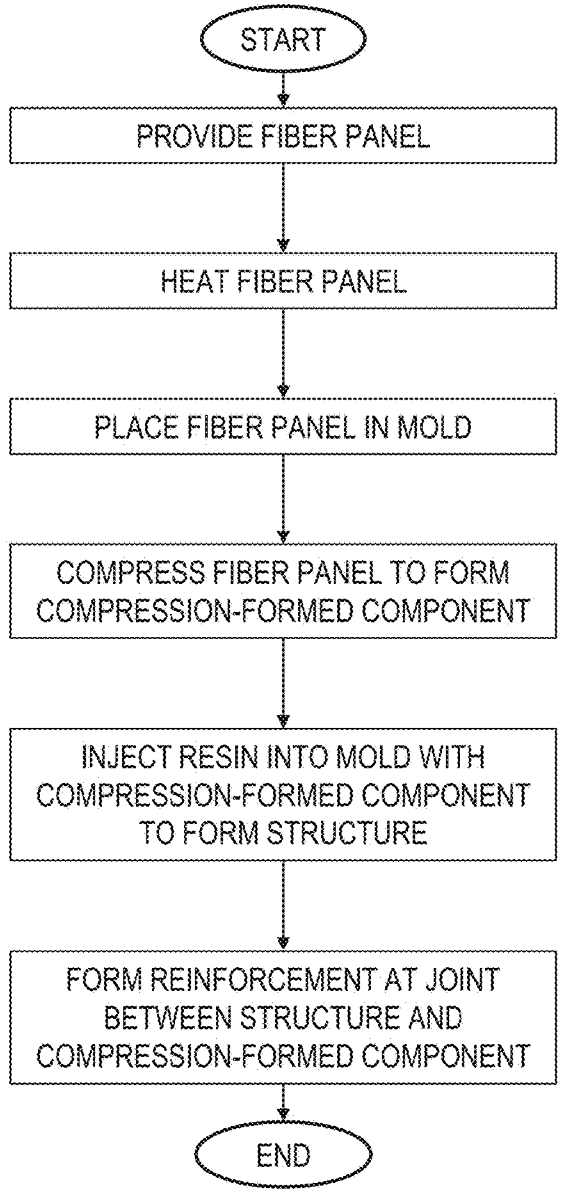
FIG. 42A is a schematic flow diagram of a process to manufacture a component for a vehicle interior according to an exemplary embodiment.

According to an exemplary embodiment as shown schematically in FIG. 42A, a process to manufacture a component for a vehicle interior may comprise providing a fiber panel, heating the fiber panel, placing the fiber panel in a mold, compressing the fiber panel to form a compression-formed component, injecting resin into the mold with the compression-formed component to form a structure, and forming a reinforcement at a joint between the structure and the compression-formed component.

Figure 42B:
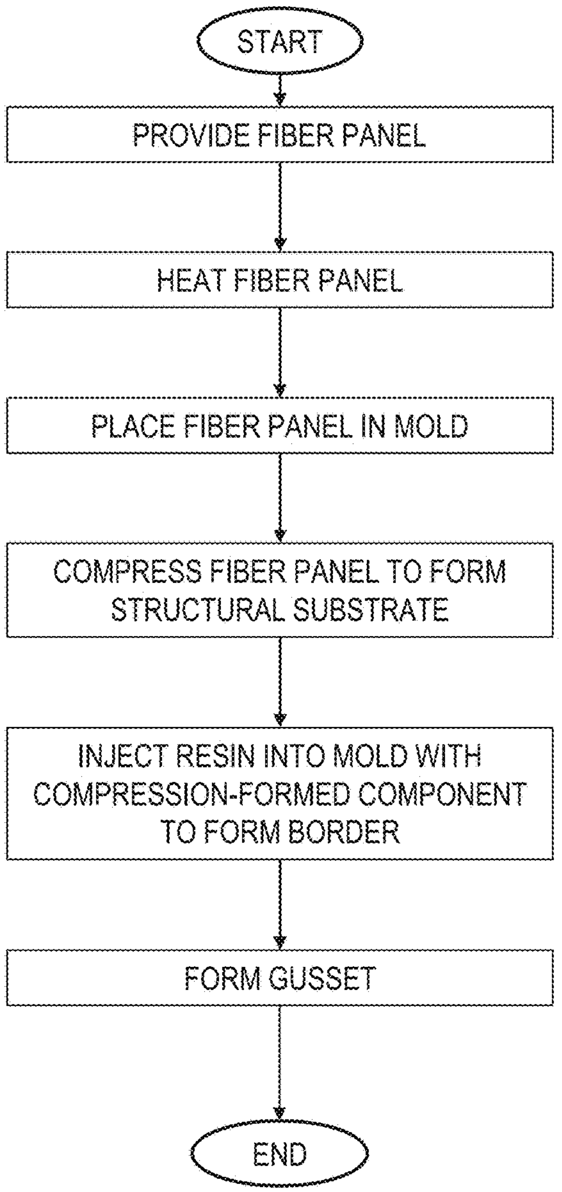
FIG. 42B is a schematic flow diagram of a process to manufacture a component for a vehicle interior according to an exemplary embodiment.

According to an exemplary embodiment as shown schematically in FIG. 42B, a process to manufacture a component for a vehicle interior may comprise providing a fiber panel, heating the fiber panel, placing the fiber panel in a mold, compressing the fiber panel to form a structural substrate, injecting resin into the mold with the compression-formed component to form a border, and forming a gusset.

Figure 43A:
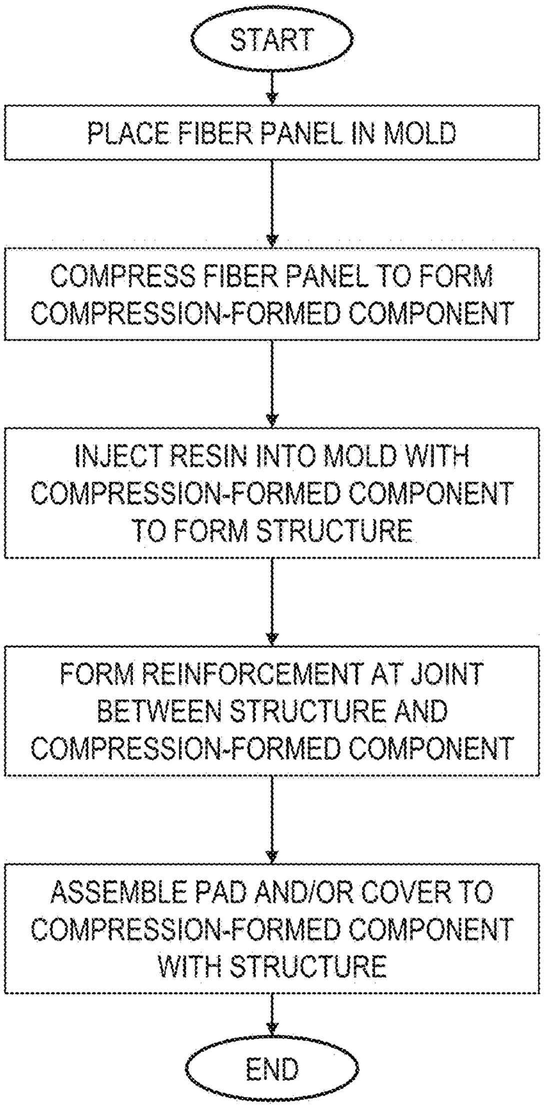
FIG. 43A is a schematic flow diagram of a process to manufacture a component for a vehicle interior according to an exemplary embodiment.

According to an exemplary embodiment as shown schematically in FIG. 43A, a process to manufacture a component for a vehicle interior may comprise placing a fiber panel in mold, compressing the fiber panel to form a compression-formed component, injecting resin into the mold with the compression-formed component to form a structure, forming a reinforcement at a joint between the structure and the compression-formed component, and assembling a pad and/or cover to the compression-formed component with the structure.

Figure 43B:
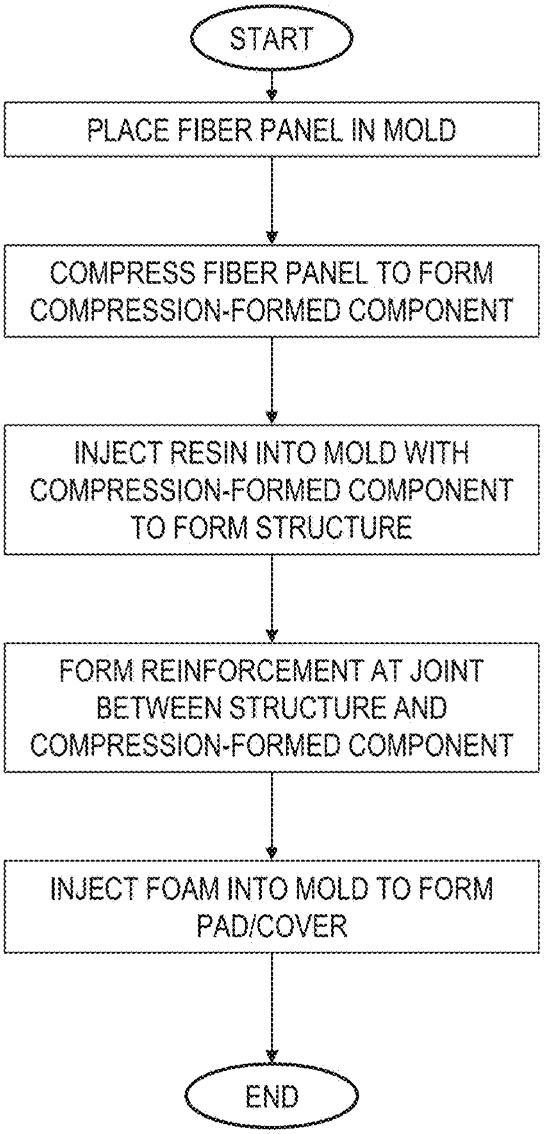
FIG. 43B is a schematic flow diagram of a process to manufacture a component for a vehicle interior according to an exemplary embodiment.

According to an exemplary embodiment as shown schematically in FIG. 43B, a process to manufacture a component for a vehicle interior may comprise placing a fiber panel in a mold, compressing the fiber panel to form a compression-formed component, injecting resin into the mold with the compression-formed component to form a structure, forming a reinforcement at a joint between the structure and the compression-formed component, and injecting foam into the mold to form a pad/cover.

According to an exemplary embodiment as shown schematically in the FIGURES, a component for a vehicle interior for response in an event such as a side impact of the vehicle may comprise a fiber panel and a structure comprising a resin. The fiber panel may comprise an edge along a periphery and provides a structural substrate having a shape and a thickness along the edge. The structure may comprise a border of the structural substrate along the thickness of the structural substrate. The fiber panel may be configured to deform in response in the event. The fiber panel may be configured to absorb force in response in the event. The event the fiber panel may be configured for movement relative to the structure in response in the event. The fiber panel may comprise a deformable region configured to deform in response in the event. The component may comprise a reinforcement. The reinforcement may comprise a gusset. The reinforcement may be configured to strengthen an angle of the component. The reinforcement may be configured to strengthen a joint between the structure and fiber panel. The reinforcement may be (a) coupled to the fiber panel and (b) coupled to the structure. The reinforcement may comprise an interface; the interface may comprise a composite material; the composite material may comprise material of the fiber panel and material of the structure. The interface may be formed by molding the structure on the fiber panel. Material of the structure and material of the fiber panel may intermingle during formation of the reinforcement. The fiber panel may comprise a first thickness and a second thickness greater than the first thickness. The second thickness may comprise the thickness along the edge. The second thickness may be configured for bonding of the fiber panel and the structure. The structure may comprise a tab configured to fit in a notch of the fiber panel. The structure may comprise a protrusion coupled to the tab. The protrusion may be configured to facilitate assembly of the component to a door panel. The structure may comprise a frame for the fiber panel. The fiber panel may comprise a compression-formed component. The structure may be formed on the edge of the fiber panel. The fiber panel may comprise a plurality of fibers and a resin configured to bind the fibers; the structure may comprise a molded resin. The structure may be bonded to the fiber panel. The structure may be formed from a molded resin. The structure may be configured to accommodate at least one variation in at least one edge of the fiber panel. The component may comprise at least one of (a) a pad; (b) a cover. The cover may comprise at least one of (a) cover stock; (b) a woven fabric; (c) a non-woven fabric; (d) an applique; (e) a vinyl layer; (f) a foam layer; (g) a foil layer; (h) a leather covering. The component may be configured to be provided adjacent to a seat for a vehicle occupant. The component may comprise at least one of (a) door panel; (b) an armrest assembly on the door panel; (c) an armrest.

According to an exemplary embodiment as shown schematically in the FIGURES, a method of manufacturing a component for a vehicle interior in a mold providing a mold cavity may comprise heating a fiber panel; placing the fiber panel into the mold cavity; compressing the fiber panel in the mold cavity to form a compression-formed component comprising a shape, an edge along a periphery, and a thickness along the edge; injecting resin into the mold cavity with the compression-formed component to form a structure; and forming a reinforcement configured to strengthen a joint between the structure and the compression-formed component. A border of the compression-formed component may be formed along the thickness of the compression-formed component by the resin injected into the mold cavity. The reinforcement may be (a) coupled to the compression-formed component and (b) coupled to the structure. The compression-formed component may comprise a structural substrate. The reinforcement may comprise a gusset. The reinforcement may be configured to strengthen an angle of the component. The reinforcement may comprise an interface; the interface may comprise a composite material; the composite material may comprise material of the fiber panel and the resin. The step of forming the reinforcement may comprise intermingling the resin and material of the fiber panel. The step of compressing the fiber panel in the mold cavity may comprise compressing a first portion of the fiber panel to a first thickness and compressing a second portion of the fiber panel to a second thickness greater than the first thickness; the second thickness may comprise the thickness along the edge of the compression-formed component; the second thickness may be configured for bonding of the compression-formed component and the structure. The method may comprise a step of cutting a notch in the fiber panel; the step of injecting resin into the mold cavity with the structure may comprise forming a tab of the structure; the notch may be configured to couple the compression-formed component to the tab of the structure. The step of injecting resin into the mold cavity with the structure may comprise forming a protrusion coupled to the tab.

According to an exemplary embodiment, a component for a vehicle interior configured to deform in an event such as a side impact of the vehicle may comprise a composite structure comprising a structural substrate and a structure/frame. The structural substrate may comprise a fiber panel; the structure may comprise a molded structure with a feature provided on the structural substrate at an interface. The feature may comprise a reinforcement for the interface and/or a projection for assembly of the component. The interface may comprise resin material from the molded structure and resin material from the fiber panel. The structure may comprise a border formed at the edge along the thickness of the fiber panel. The interface may comprise intermixing of resin material from the molded structure and the fiber panel and intermingling of resin material from the molded structure and fibers from the fiber panel. A method of producing the component may comprise providing a structural substrate and forming a structure onto the structural substrate at an interface and providing a cover and/or a pad for the composite structure. The component may comprise a trim panel, armrest, etc.

TABLE A

REFERENCE SYMBOL LIST

| ELEMENT, PART OR COMPONENT | REFERENCE SYMBOL |
|---|---|
| Vehicle (with interior) | V |
| Component | C |
| Door | D |
| Door panel | DP |
| Armrest | AR |
| Instrument panel | IP |
| Substrate/structural substrate | SB |
| Fiber panel | FP |
| Feature (recess/notch, projection, etc.) (fiber panel) | RS |

TABLE A-continued

| REFERENCE SYMBOL LIST | |
|---|---|
| ELEMENT, PART OR COMPONENT | REFERENCE SYMBOL |
| Compression-formed component | CF |
| Interface | NT |
| Structure | ST |
| Frame | FR |
| Feature (structure/frame) | FT |
| Reinforcement | RT |
| Cover | T |
| Pad | PD |
| Fiber mat | FM |
| Thickness | t1 |
| Thickness | t2 |
| Oven | VN |
| Mold top | MT |
| Mold bottom | MB |
| Crash barrier | RTA |
| Crash barrier | RTB |

It is important to note that the present inventions (e.g. inventive concepts, etc.) have been described in the specification and/or illustrated in the FIGURES of the present patent document according to exemplary embodiments; the embodiments of the present inventions are presented by way of example only and are not intended as a limitation on the scope of the present inventions. The construction and/or arrangement of the elements of the inventive concepts embodied in the present inventions as described in the specification and/or illustrated in the FIGURES is illustrative only. Although exemplary embodiments of the present inventions have been described in detail in the present patent document, a person of ordinary skill in the art will readily appreciate that equivalents, modifications, variations, etc. of the subject matter of the exemplary embodiments and alternative embodiments are possible and contemplated as being within the scope of the present inventions; all such subject matter (e.g. modifications, variations, embodiments, combinations, equivalents, etc.) is intended to be included within the scope of the present inventions. It should also be noted that various/other modifications, variations, substitutions, equivalents, changes, omissions, etc. may be made in the configuration and/or arrangement of the exemplary embodiments (e.g. in concept, design, structure, apparatus, form, assembly, construction, means, function, system, process/method, steps, sequence of process/method steps, operation, operating conditions, performance, materials, composition, combination, etc.) without departing from the scope of the present inventions; all such subject matter (e.g. modifications, variations, embodiments, combinations, equivalents, etc.) is intended to be included within the scope of the present inventions. The scope of the present inventions is not intended to be limited to the subject matter (e.g. details, structure, functions, materials, acts, steps, sequence, system, result, etc.) described in the specification and/or illustrated in the FIGURES of the present patent document. It is contemplated that the claims of the present patent document will be construed properly to cover the complete scope of the subject matter of the present inventions (e.g. including any and all such modifications, variations, embodiments, combinations, equivalents, etc.); it is to be understood that the terminology used in the present patent document is for the purpose of providing a description of the subject matter of the exemplary embodiments rather than as a limitation on the scope of the present inventions.

It is also important to note that according to exemplary embodiments the present inventions may comprise conventional technology (e.g. as implemented and/or integrated in exemplary embodiments, modifications, variations, combinations, equivalents, etc.) or may comprise any other applicable technology (present and/or future) with suitability and/or capability to perform the functions and processes/operations described in the specification and/or illustrated in the FIGURES. All such technology (e.g. as implemented in embodiments, modifications, variations, combinations, equivalents, etc.) is considered to be within the scope of the present inventions of the present patent document.

The invention claimed is:

1. A component for a vehicle interior configured to deform in response to an event comprising a side impact of the vehicle comprising:

- a composite structure comprising a structural substrate and a structure;
- wherein the structural substrate comprises a fiber panel;
- wherein the structure comprises a molded structure with a feature;
- wherein the molded structure is provided on the structural substrate;
- wherein the molded structure comprises resin material;
- wherein the fiber panel comprises resin material;
- wherein the molded structure is provided on the structural substrate at an interface;
- wherein the interface comprises resin material from the molded structure and resin material from the fiber panel;
- wherein the fiber panel of the composite structure is configured to deform to absorb energy in response to the event.

2. The component of claim 1 wherein the structural substrate comprises a shape; wherein the structure comprises a border of the structural substrate; wherein the interface is provided at a border of the structure at an edge of the fiber panel.

3. The component of claim 1 wherein the interface comprises intermixing of resin material from the molded structure and fibers from the fiber panel.

4. The component of claim 1 wherein the molded structure comprises a frame and/or a border formed on the edge of the fiber panel.

5. The component of claim 1 wherein the feature of the molded structure comprises a molded feature and/or a set of features formed on the fiber panel.

6. The component of claim 1 wherein the fiber panel comprises a compression-formed panel configured to provide the structural substrate for the composite structure.

7. The component of claim 1 wherein the fiber panel comprises a feature.

8. The component of claim 7 wherein the feature of the fiber panel comprises a recess and/or a notch and/or a projection.

9. The component of claim 7 wherein the feature comprises a reinforcement; wherein the reinforcement is configured to strengthen the interface between the structure and the fiber panel; wherein the reinforcement is coupled to the fiber panel and coupled to the structure.

10. The component of claim 9 wherein material of the structure and material of the fiber panel intermingle during formation of the reinforcement.

11. The component of claim 7 wherein the feature comprises at least one of (a) a gusset; (b) a tab; (c) a flange; (d) a rib; (e) a set of ribs; (f) a reinforcement frame.

12. The component of claim 1 further comprising a cover formed on the composite structure.

13. The component of claim 1 wherein the composite structure comprises a pad.

14. The component of claim 1 wherein the fiber panel comprises a deformable region configured to deform in response to the event.

15. The component of claim 1 wherein the interface is formed by molding the structure into and/or onto the fiber panel.

16. The component of claim 1 wherein the structure comprises a frame for the fiber panel.

17. The component of claim 1 wherein the fiber panel comprises a plurality of fibers and a resin configured to bind the fibers; wherein the structure comprises a molded resin.

18. The component of claim 1 made by a method comprising the steps of:

(a) providing a structural substrate;

(b) forming a structure onto the structural substrate at an interface;

wherein the structural substrate comprises a fiber panel comprising a resin material;

wherein the structure comprises a molded structure comprising a resin material;

wherein the interface comprises the resin material of the fiber panel and the resin material of the molded structure.

19. The component of claim 18 wherein the structure comprises a molded feature.

20. The component of claim 18 wherein the interface is formed by molding of the resin material of the structure into the resin material of the structural substrate; wherein the interface is formed by molding of resin material of the structure into a fiber material of the structural substrate.

* * * * *